US012771981B2

(12) United States Patent
Chen et al.

(10) Patent No.: US 12,771,981 B2
(45) Date of Patent: Oct. 20, 2026

(54) MODE CONTROL METHOD AND APPARATUS, AND TERMINAL DEVICE

(71) Applicant: Huawei Technologies Co., Ltd., Shenzhen (CN)

(72) Inventors: Weibin Chen, Shenzhen (CN); Tizheng Wang, Shenzhen (CN); Yulong Li, Shenzhen (CN); Fan Fan, Shenzhen (CN); Cunshou Qiu, Shanghai (CN); Wei Xiong, Shanghai (CN); Tianxiang Cao, Hangzhou (CN); Zhenxia Gui, Hangzhou (CN); Zhipeng Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 932 days.

(21) Appl. No.: 18/148,080

(22) Filed: Dec. 29, 2022

(65) Prior Publication Data

US 2023/0164475 A1 May 25, 2023

Related U.S. Application Data

(63) Continuation of application No. PCT/CN2021/103435, filed on Jun. 30, 2021.

(30) Foreign Application Priority Data

Jun. 30, 2020 (CN) ......................... 202010616084.7
Sep. 10, 2020 (CN) ......................... 202010949885.5

(51) Int. Cl.
*H04R 1/00* (2006.01)
*G06F 3/0482* (2013.01)
(Continued)

(52) U.S. Cl.
CPC ......... *H04R 1/1041* (2013.01); *G06F 3/0482* (2013.01); *G10K 11/17823* (2018.01)

(58) Field of Classification Search
CPC ........ H04R 3/00; H04R 1/1041; H04R 1/345; H04R 3/005; H04R 2201/30;
(Continued)

(56) References Cited

U.S. PATENT DOCUMENTS

2014/0126734 A1 5/2014 Gauger, Jr. et al.
2015/0195641 A1 7/2015 Di Censo et al.
(Continued)

FOREIGN PATENT DOCUMENTS

CN 105554610 A 5/2016
CN 106303839 A 1/2017
(Continued)

*Primary Examiner* — Rasha S Al Aubaidi
(74) *Attorney, Agent, or Firm* — Conley Rose, P.C.

(57) ABSTRACT

A mode control method includes determining, by a terminal device based on a scene type of an external environment, that a processing mode used by a headset is a target mode. The target mode is one of a plurality of processing modes supported by the headset, where different processing modes correspond to different scene types, and the processing modes supported by the headset include at least two of the following modes: an active noise control (ANC) mode, a hear-through (HT) mode, or an augmented hearing (AH) mode. Processing intensity in the target mode is automatically adjusted based on an event in a current external environment. The terminal device further provides a control interface for the headset to provide selection controls for the user to select a processing mode and processing intensity. The user controls a processing mode and processing intensity of the headset based on a requirement.

20 Claims, 38 Drawing Sheets

(51) Int. Cl.
*G10K 11/178* (2006.01)
*H04R 1/10* (2006.01)

(58) Field of Classification Search
CPC .................. H04R 2201/40; H04R 1/32; G10K 11/17823; G06F 3/0482; G06F 3/01; H04M 1/725; G10L 25/89; G10L 25/51; G10L 25/48; G10L 21/0208; G10L 25/63; H04S 7/00
See application file for complete search history.

(56) References Cited

U.S. PATENT DOCUMENTS

| | | | |
|---|---|---|---|
| 2018/0077482 | A1 | 3/2018 | Yuan et al. |
| 2019/0278556 | A1 | 9/2019 | Usher et al. |
| 2019/0361666 | A1 | 11/2019 | Oide et al. |
| 2020/0296500 | A1 | 9/2020 | Wang |

FOREIGN PATENT DOCUMENTS

| | | | |
|---|---|---|---|
| CN | 106572411 | A | 4/2017 |
| CN | 108429963 | A | 8/2018 |
| CN | 110049403 | A | 7/2019 |
| CN | 110825446 | A | 2/2020 |
| CN | 111107461 | A | 5/2020 |
| EP | 3253070 | A1 | 12/2017 |
| KR | 20170118909 | A | 10/2017 |
| WO | 2017101067 | A1 | 6/2017 |

MODE CONTROL METHOD AND APPARATUS, AND TERMINAL DEVICE

CROSS-REFERENCE TO RELATED APPLICATIONS

This is a continuation of International Patent Application No. PCT/CN2021/103435 filed on Jun. 30, 2021, which claims priority to Chinese Patent Application No. 202010616084.7 filed on Jun. 30, 2020 and Chinese Patent Application No. 202010949885.5 filed on Sep. 10, 2020. The disclosures of the aforementioned applications are hereby incorporated by reference in their entireties.

TECHNICAL FIELD

Embodiments of this disclosure relate to the field of audio processing technologies, and in particular, to a mode control method and apparatus, and a terminal device.

BACKGROUND

In recent years, there have been more headset users, and the users have increasingly differentiated requirements for headset functions. For example, if a user does not want to hear external noise when wearing a headset, the user can use an active noise control (ANC) function to cancel out noise in ears. If a user wants to hear a sound outside a headset, the user needs to use a hear-through (HT) function to hear the sound as if the user does not wear a headset. Some users may have hearing impairments. An augmented hearing (AH) function may be used to transmit external signals wanted by a user and filter out unwanted signals.

However, currently a headset cannot implement desired effect based on a user requirement.

SUMMARY

Embodiments of this disclosure provide a headset noise processing method and apparatus, and a headset, to implement desired effect based on a user requirement.

According to a first aspect, an embodiment of this disclosure provides a noise processing method for a headset. The headset has at least two of the following functions: an ANC function, an HT function, or an AH function. The headset includes a first microphone and a second microphone. The first microphone is configured to collect a first signal, where the first signal is used to represent a sound in a current external environment. The second microphone is configured to collect a second signal, where the second signal is used to represent an ambient sound in an ear canal of a user wearing the headset. The headset may be a left earphone or a right earphone. Processing modes used by the left earphone and the right earphone may be the same or different. The headset receives a first audio signal from a terminal device, and obtains a target mode. The target mode is determined based on a scene type of the current external environment, the target mode indicates the headset to perform a target processing function, and the target processing function is one of the following functions: the ANC function, the HT function, or the AH function. The headset obtains a second audio signal based on the target mode, the first audio signal, the first signal, and the second signal.

According to the foregoing method, the target mode is determined based on the scene type of the external environment. This can optimize auditory perception of the user in real time.

In a possible design, the headset further includes a speaker. The speaker is configured to play the second audio signal.

In a possible design, the target processing function is the ANC function, and the second audio signal played by the speaker can weaken perception of the user on the sound in the environment in which the user is currently located and on the ambient sound in the ear canal of the user. Alternatively, the target processing function is the HT function, and the second audio signal played by the speaker can enhance perception of the user on a sound in an environment in which the user is currently located. Alternatively, the target processing function is the AH function, the second audio signal played by the speaker can enhance perception of the user on an event sound, and the event sound meets a preset spectrum.

It should be understood that, when an ANC mode is used for the left earphone, an audio signal played by a speaker of the left earphone can weaken perception of the left earphone of the user on the sound in the environment in which the user is currently located (that is, the sound in the current external environment) and on the ambient sound in the ear canal of the left earphone of the user. When the ANC mode is used for the right earphone, an audio signal played by a speaker of the right earphone can weaken perception of the right earphone of the user on the sound in the environment in which the user is currently located (that is, the sound in the current external environment) and on the ambient sound in the ear canal of the right earphone of the user. Similarly, for an HT mode and an AH mode, a feeling of the left ear follows the processing mode used by the left earphone, and a feeling of the right ear follows the processing mode used by the right earphone.

In a possible design, when the target processing function is the ANC function, the second audio signal is obtained based on the first audio signal, a third signal, and a fourth signal, where the third signal is an antiphase signal of the first signal, and the fourth signal is an antiphase signal of the second signal, when the target processing function is the HT function, the second audio signal is obtained based on the first audio signal, the first signal, and the second signal, or when the target processing function is the AH function, the second audio signal is obtained based on the first audio signal, a fifth signal, and a fourth signal, where the fifth signal is an event signal in the first signal, the event signal is used to represent a specific sound in the current external environment, and the event signal meets a preset spectrum.

The foregoing design provides a manner of obtaining, in different processing modes, a signal output by the speaker, which is simple and effective.

In a possible design, obtaining a target mode includes receiving a first control instruction from the terminal device, where the first control instruction carries the target mode, and the target mode is determined by the terminal device based on the scene type of the current external environment.

In the foregoing design, the terminal device determines the target mode based on the scene type of the external environment, and indicates the target mode to the headset. This can optimize auditory perception of the user in real time.

In a possible design, a second control instruction from the terminal device is received, where the second control instruction carries target processing intensity, and the target processing intensity indicates processing intensity at which the headset performs the target processing function. Obtaining a second audio signal based on the target mode, the first audio signal, the first signal, and the second signal includes obtaining the second audio signal based on the target mode, the target processing intensity, the first audio signal, the first signal, and the second signal.

According to the foregoing design, the terminal device indicates processing intensity in a corresponding processing mode of the headset. The processing intensity is adjusted based on the processing mode to further improve auditory perception of the user.

In a possible design, a target event corresponding to an event sound in the current external environment is determined based on the first signal, and target processing intensity in the target mode is determined based on the target event, where the target processing intensity indicates processing intensity at which the headset performs the target processing function. Obtaining a second audio signal based on the target mode, the first audio signal, the first signal, and the second signal includes obtaining the second audio signal based on the target mode, the target processing intensity, the first audio signal, the first signal, and the second signal. Different processing intensity corresponds to different events. Processing intensity may one-to-one correspond to events, or one processing intensity corresponds to a plurality of events. For example, same processing intensity may be used for two events, and different processing intensity cannot be used for a same event.

According to the foregoing design, the headset determines the processing intensity based on the event sound in the external environment, to implement different auditory perception in different external environments. This can reduce noise floor effect, and enhance denoising intensity.

In a possible design, the headset further includes a bone conduction sensor, and the bone conduction sensor is configured to collect a bone-conducted signal generated when the vocal cord of the user vibrates. Identifying, based on the first signal, a first scene in which the user is currently located includes identifying, based on the first signal and the bone-conducted signal, the first scene in which the user is currently located.

In a possible design, the target event is a howling event, a wind noise event, an emergency event, or a human voice event.

In a possible design, obtaining a target mode includes identifying, based on the first signal, that the scene type of the current external environment is a target scene type (a target scene or a target type), and determining, based on the target scene, the target mode used by the headset, where the target mode is a processing mode corresponding to the target scene. Different processing modes correspond to different scene types. Processing modes may one-to-one correspond to scene types, or one processing mode may correspond to a plurality of scene types. For example, a same processing mode may be used for two scene types.

In the foregoing design, the headset determines, based on the identified scene type, the processing mode used by the headset, to reduce a delay and optimize auditory perception of the user in real time.

In a possible design, the target scene is one of the following scenes: a walking scene, a running scene, a quiet scene, a multi-person speaking scene, a cafe scene, a subway scene, a train scene, a waiting-hall scene, a dialog scene, an office scene, an outdoor scene, a driving scene, a strong-wind scene, an airplane scene, an alarm-sound scene, a horn sound scene, or a crying sound scene.

In a possible design, the method further includes sending indication information to the terminal device, where the indication information carries the target mode, and receiving third control signaling from the terminal device, where the third control signaling includes target processing intensity in the target mode, and the target processing intensity indicates processing intensity at which the headset performs the target processing function. Obtaining a second audio signal based on the target mode, the first audio signal, the first signal, and the second signal includes obtaining the second audio signal based on the target mode, the target processing intensity, the first audio signal, the first signal, and the second signal.

In the foregoing design, the headset determines the used processing mode, and indicates the processing mode to the terminal device, and the terminal device adjusts the processing intensity. This reduces processing resources occupied by the headset.

In a possible design, when the target processing function is the ANC function, larger target processing intensity indicates a weaker ambient sound in an ear canal of the user, and a weaker sound that is perceived by the user and that is in an environment in which the user is currently located, when the target processing function is the HT function, larger target processing intensity indicates larger intensity of a sound that is perceived by the user and that is in an environment in which the user is currently located, or when the target processing function is the AH function, higher target processing intensity indicates a stronger event sound included in a sound that is perceived by the user and that is in an environment in which the user is currently located.

In a possible design, the target mode indicates the headset to perform the ANC function. Obtaining a second audio signal based on the target mode, the first audio signal, the first signal, and the second signal includes performing first filtering processing (for example, feedforward (FF) filtering) on the first signal to obtain a first filtering signal, filtering out the first audio signal included in the second signal to obtain a first filtered signal, performing mixing processing on the first filtering signal and the filtered signal to obtain a third audio signal, performing third filtering processing (for example, feedback (FB) filtering) on the third audio signal to obtain a fourth audio signal, and performing mixing processing on the fourth audio signal and the first audio signal to obtain the second audio signal.

In the foregoing design, ANC processing is performed in a manner of FF filtering and FB serial processing, to obtain a better denoised signal and enhance noise control effect.

In a possible design, a filtering coefficient used for first filtering processing is a filtering coefficient associated with the target processing intensity for first filtering processing in the case of the ANC function, or a filtering coefficient used for third filtering processing is a filtering coefficient associated with the target processing intensity for third filtering processing in the case of the ANC function.

In the foregoing design, different filtering coefficients are used for different processing intensity. Compared with using a fixed filtering coefficient, this design achieves better ANC effect, and improves auditory perception of the user.

In a possible design, the target mode indicates the headset to perform the HT function. Obtaining a second audio signal based on the target mode, the first audio signal, the first signal, and the second signal includes performing first signal processing on the first signal to obtain a first processed signal, where first signal processing includes second filtering processing (for example, HT filtering), performing mixing processing on the first processed signal and the first audio signal to obtain a fifth audio signal, performing filtering on the fifth audio signal included in the second signal to obtain a second filtered signal, performing third filtering processing (for example, FB filtering) on the second filtered signal to obtain a third filtered signal, and performing mixing processing on the third filtered signal and the fifth audio signal to obtain the second audio signal.

Before filtering is performed on the fifth audio signal included in the second signal, filtering compensation processing may be further performed on the fifth audio signal to reduce auditory perception loss. In the foregoing design, downlink mixing processing is performed during HT filtering, and filtering compensation processing is performed, to further reduce auditory perception loss.

In a possible design, performing first signal processing on the first signal to obtain a first processed ambient signal includes performing second filtering processing on the first signal to obtain a second filtering signal, and performing second signal processing on the second filtering signal to obtain a second processed signal.

Second signal processing includes occlusion effect reduction processing.

In the foregoing design, occlusion effect reduction processing is performed on a signal obtained through HT filtering, so that an ambient sound heard by the user can be clearer.

In a possible design, second signal processing further includes at least one of the following: noise floor reduction processing, wind noise reduction processing, gain adjustment processing, or frequency response adjustment processing.

After second signal processing, a noise floor and an abnormal sound are reduced, and auditory perception of the user is improved.

In a possible design, a filtering coefficient used for second filtering processing is a filtering coefficient associated with the target processing intensity for second filtering processing in the case of the HT function, or a filtering coefficient used for third filtering processing is a filtering coefficient associated with the target processing intensity for third filtering processing in the case of the HT function.

In a possible design, the target mode indicates the headset to perform the AH function. Obtaining a second audio signal based on the target mode, the first audio signal, the first signal, and the second signal includes performing second filtering processing (for example, HT filtering) on the first signal to obtain a second filtering signal, and performing enhancement processing on the second filtering signal to obtain a filtering enhanced signal, performing first filtering processing (for example, FF filtering) on the first signal to obtain a first filtering signal, performing mixing processing on the filtering enhanced signal and the first audio signal to obtain a sixth audio signal, performing filtering on the sixth audio signal included in the second signal to obtain a fourth filtered signal, performing third filtering processing (for example, FB filtering) on the fourth filtered signal to obtain a fifth filtered signal, and performing mixing processing on the fifth filtered signal, the sixth audio signal, and the first filtering signal to obtain the second audio signal.

In the foregoing design, ANC and ambient sound hear-through are performed simultaneously. Hear-through filtering processing and enhancement processing are performed on a hear-through signal, so that the hear-through signal is clearer.

Optionally, filtering compensation processing is performed on the sixth audio signal before filtering is performed on the sixth audio signal included in the second signal to obtain the fourth filtered signal. This can avoid loss caused by FB filtering, and ensure no distortion of the hear-through signal to a maximum extent.

In a possible design, performing enhancement processing on the second filtering signal to obtain a filtering enhanced signal includes performing occlusion effect reduction processing on the second filtering signal, and performing denoising processing on a signal obtained through occlusion effect reduction processing, where denoising processing includes artificial intelligence AI denoising processing and/or wind noise reduction processing, and performing gain amplification processing and frequency response adjustment on a signal obtained through denoising processing, to obtain the filtering enhanced signal.

In the foregoing design, enhancement processing is performed on the hear-through signal. This improves auditory perception of a user on a required external sound.

In a possible design, the headset includes a bone conduction sensor, and the bone conduction sensor is configured to collect a bone-conducted signal of the headset user. Performing gain amplification processing on a signal obtained through denoising processing includes performing harmonic extension on the bone-conducted signal to obtain a harmonic extended signal, performing, by using a first gain coefficient, amplification processing on the signal obtained through denoising processing, and filtering out, by using a fourth filtering coefficient, the harmonic extended signal included in the signal obtained through amplification processing. The fourth filtering coefficient is determined based on the first gain coefficient.

In the foregoing design, an amplification manner is provided to amplify only a particular sound other than a voice of the wearing user. This improves effect of the particular sound in a hear-through ambient sound.

In a possible design, the first gain coefficient is a gain coefficient associated with the target processing intensity in the target mode.

In a possible design, performing enhancement processing on the second filtering signal to obtain a filtering enhanced signal includes performing occlusion effect reduction processing on the second filtering signal to obtain an occlusion effect reduced signal, performing audio event detection on the occlusion effect reduced signal to obtain an audio event signal in the occlusion effect reduced signal, and performing gain amplification processing and frequency response adjustment on the audio event signal in the occlusion effect reduced signal to obtain a filtering enhanced signal.

In a possible design, the headset further includes a bone conduction sensor, and the bone conduction sensor is configured to collect a bone-conducted signal of the headset user. Performing gain amplification processing on the audio event signal in the occlusion effect reduced signal includes performing harmonic extension on the bone-conducted signal to obtain a harmonic extended signal, amplifying, by using a second gain coefficient, the audio event signal in the occlusion effect reduced signal to obtain an amplified signal, and filtering out, by using a second filtering coefficient, the harmonic extended signal included in the amplified signal. The second filtering coefficient is determined based on the second gain coefficient.

In a possible design, the second gain coefficient is a gain coefficient associated with the target processing intensity for first filtering processing when first noise processing is performed, or the second gain coefficient is a gain coefficient associated with the first scene identifier for first filtering processing when first noise processing is performed.

In a possible design, a filtering coefficient used for first filtering processing is a filtering coefficient associated with the target processing intensity for first filtering processing in the case of the AH function, a filtering coefficient used for second filtering processing is a filtering coefficient associated with the target processing intensity for second filtering processing in the case of the AH function, or a filtering coefficient used for third filtering processing is a filtering coefficient associated with the target processing intensity for third filtering processing in the case of the AH function.

In a possible design, the headset further includes a bone conduction sensor, and the bone conduction sensor is configured to collect a bone-conducted signal of the headset user. Performing occlusion effect reduction processing on the second filtering signal includes determining, from a speech harmonic set, a first speech harmonic signal matching the bone-conducted signal, where the speech harmonic set includes a plurality of speech harmonic signals, and removing the first speech harmonic signal from the second filtering signal, and amplifying a high-frequency component in the second filtering signal from which the first speech harmonic signal is removed, or performing adaptive filtering processing on the second filtering signal to remove a low-frequency component from the second filtering signal to obtain a third filtering signal, and amplifying a high-frequency component from the third filtering signal from which the low-frequency component is removed.

According to a second aspect, an embodiment of the present disclosure provides a mode control method. The method is applied to a terminal device. The method includes determining a target mode based on a target scene when it is identified that a scene type of a current external environment is the target scene, where the target mode is one of processing modes supported by a headset, and the processing modes supported by the headset include at least two of the following modes: an ANC mode, an HT mode, or an AH mode, and sending the target mode to the headset, where the target mode indicates the headset to perform a processing function corresponding to the target mode. Different processing modes correspond to different scene types. Processing modes may one-to-one correspond to scene types, or one processing mode may correspond to a plurality of scene types. For example, a same processing mode may be used for two scene types.

In the foregoing design, the terminal device performs scene-based identification to control a processing mode of the headset in real time, so as to optimize auditory perception of a user in real time.

In a possible design, when the target mode that corresponds to the target scene and that is in the processing modes of the headset is determined, the method further includes displaying result prompt information, where the result prompt information is used to prompt a user that the headset performs the processing function corresponding to the target mode. The foregoing design enables the user to determine a current processing mode of the headset in real time.

In a possible design, before first control signaling is sent to the headset, the method further includes displaying selection prompt information, where the selection prompt information indicates a user whether to adjust the processing mode of the headset to the target mode, and detecting an operation of selecting, by the user, the processing mode of the headset as the target mode.

In the foregoing design, the user may determine, based on a requirement, whether to adjust the processing mode of the headset, to improve user experience.

In a possible design, a first control and a second control are displayed, where different positions of the second control on the first control indicate different processing intensity in the target mode. Before the first control signaling is sent to the headset, the method further includes responding to touching and controlling, by the user, the second control to move to a first position on the first control, where the first position of the second control on the first control indicates target processing intensity in the target mode, and sending the target processing intensity to the headset, where the target processing intensity indicates processing intensity at which the headset performs the processing function corresponding to the target mode. In the foregoing design, the user may select processing intensity of the headset based on a requirement, to meet different requirements of the user.

In a possible design, the first control is of a ring shape, and the user touches and controls the second control to move on the first control in a clockwise direction, and the processing intensity in the target mode changes in ascending order, or the user touches and controls the second control to move on the first control in an anticlockwise direction, and the processing intensity in the target mode changes in ascending order.

In a possible design, the first control is of a bar shape, and the user touches and controls the second control to move on the first control from top to bottom, and the processing intensity in the target mode changes in ascending order, the user touches and controls the second control to move on the first control from bottom to top, and the processing intensity in the target mode changes in ascending order, the user touches and controls the second control to move on the first control from left to right, and the processing intensity in the target mode changes in ascending order, or the user touches and controls the second control to move on the first control from right to left, and the processing intensity in the target mode changes in ascending order.

In a possible design, when the target processing function is an ANC function, larger target processing intensity indicates a weaker ambient sound in an ear canal of the user, and a weaker sound that is perceived by the user and that is in an environment in which the user is currently located, when the target processing function is an HT function, larger target processing intensity indicates larger intensity of a sound that is perceived by the user and that is in an environment in which the user is currently located, or when the target processing function is an AH function, higher target processing intensity indicates a stronger event sound included in a sound that is perceived by the user and that is in an environment in which the user is currently located.

It should be noted that perception of the left ear and the right ear of the user may be the same if a same processing mode and same processing intensity may be used for the left earphone and the right earphone, or perception of the left ear and the right ear is different if different processing modes or different processing intensity may be used for the left earphone and the right earphone.

According to a third aspect, an embodiment of the present disclosure provides a mode control method. The method is applied to a terminal device. The method includes obtaining a target mode, where the target mode is one of processing modes supported by a headset, and the processing modes supported by the headset include at least two of the following modes: an ANC mode, an HT mode, or an AH mode, determining target processing intensity in the target mode based on a scene type of a current external environment, where different scene types correspond to different processing intensity in the target mode, and sending the target processing intensity to the headset, where the target processing intensity indicates processing intensity at which the headset performs a processing function corresponding to the target mode.

In a possible design, obtaining a target mode includes receiving the target mode sent by the headset, or displaying a selection control, where the selection control includes the processing modes supported by the headset, and detecting an operation of selecting, by a user, the target mode from the processing modes of the headset by using the selection control. The selection control includes the processing modes supported by the headset, the selection control is used to provide an option for the processing modes supported by the headset, or the processing modes supported by the headset are displayed on the selection control, and the user may perform selection from the processing modes supported by the headset.

In a possible design, before determining target processing intensity in the target mode based on a scene type of a current external environment, the method further includes displaying selection prompt information when the target mode sent by the headset is received, where the selection prompt information indicates the user whether to adjust a processing mode of the headset to the target mode, and detecting an operation of choosing, by the user, to adjust the processing mode of the headset to the target mode.

In a possible design, when the target processing function is an ANC function, larger target processing intensity indicates a weaker ambient sound in an ear canal of the user, and a weaker sound that is perceived by the user and that is in an environment in which the user is currently located, when the target processing function is an HT function, larger target processing intensity indicates larger intensity of a sound that is perceived by the user and that is in an environment in which the user is currently located, or when the target processing function is an AH function, higher target processing intensity indicates a stronger event sound included in a sound that is perceived by the user and that is in an environment in which the user is currently located.

According to a fourth aspect, an embodiment of this disclosure provides a mode control method. The method is applied to a terminal device. The method includes displaying a first interface, where the first interface includes a first selection control, the first selection control includes processing modes supported by a first target earphone and processing intensity corresponding to the processing modes supported by the first target earphone, and the processing modes of the first target earphone include at least two of the following modes: an ANC mode, an HT mode, or an AH mode, responding to a first operation performed by a user in the first interface, where the first operation is generated when the user selects, by using the first selection control, a first target mode from the processing modes supported by the first target earphone and selects processing intensity in the first target mode as first target processing intensity, and sending the first target mode and the first target processing intensity to the first target earphone, where the first target mode indicates the first target earphone to perform a processing function corresponding to the first target mode, and the first target processing intensity indicates processing intensity at which the first target earphone performs the processing function corresponding to the first target mode.

That the first selection control includes processing modes supported by a first target earphone and processing intensity corresponding to the processing modes supported by the first target earphone may be explained as follows. The first selection control provides the user with an option for a plurality of processing modes (which are all supported by the first target earphone) and adjustment items of processing intensity in all the processing modes.

In the foregoing design, the user may freely switch, on a user interface (UI), a processing mode and intensity that correspond to an effect that needs to be achieved by the headset, to meet different requirements of the user.

In a possible design, before displaying a first interface, the method further includes displaying selection prompt information, where the selection prompt information is used by the user to choose whether to adjust a processing mode of the first target earphone, and detecting an operation of choosing, by the user, to adjust the processing mode of the first target earphone.

In the foregoing design, the user may determine, based on a requirement, whether to adjust a current processing mode.

In a possible design, before displaying a first interface, the method further includes identifying that a scene type of a current external environment is a target scene, where the target scene adapts to a scene type in which the processing mode of the first target earphone needs to be adjusted.

The foregoing design provides a process of actively popping up the first interface in a particular scenario, to reduce manual operations of the user.

In a possible design, before displaying a first interface, the method further includes identifying that the terminal device triggers the first target earphone to play audio. Identifying that the terminal device triggers the first target earphone to play audio may be explained as identifying that the terminal device starts to send an audio signal to the first target earphone.

The foregoing design provides a process of actively popping up the first interface, to reduce manual operations of the user.

In a possible design, before displaying a first interface, the method further includes detecting that the terminal device establishes a connection to the first target earphone.

The foregoing design provides a process of actively popping up the first interface, to reduce manual operations of the user.

In a possible design, before displaying a first interface, the method further includes, when detecting that the terminal device establishes a connection to the first target earphone, detecting a second operation performed by the user on a home screen, where the home screen includes an icon of a first application, the second operation is generated when the user touches and controls the icon of the first application, and the first interface is a display interface of the first application.

In a possible design, the first selection control includes a first control and a second control, and any two different positions of the second control on the first control indicate two different processing modes of the first target earphone, or any two different positions of the second control on the first control indicate different processing intensity of the first target earphone in a same processing mode, and the first operation is generated when the user moves the second control to a first position in a region that corresponds to the first target mode and that is on the first control, where the first position corresponds to first target processing intensity in the first target mode.

In a possible design, the first control is of a ring shape or a bar shape.

For example, the first control is of a ring shape, a ring includes at least two arc segments, and the second control is located in different arc segments to indicate different processing modes of the first target earphone, or the second control is located in different positions of a same arc segment to indicate different processing intensity of the first target earphone in a same processing mode.

For another example, the first control is of a bar shape, a bar includes at least two bar-shaped segments, and the second control is located in different bar-shaped segments to indicate different processing modes of the first target earphone, or the second control is located in different positions of a same bar-shaped segment to indicate different processing intensity of the first target earphone in a same processing mode.

In a possible design, the method further includes responding to a third operation performed by the user in the first interface, where the first interface further includes a second selection control, the second selection control includes processing modes supported by a second target earphone and processing intensity corresponding to the processing modes supported by the second target earphone, the processing modes supported by the first target earphone include at least two of the following modes: an ANC mode, an HT mode, or an AH mode, the third operation is generated when the user selects a second target mode from the processing modes of the second target earphone by using the second selection control, and selects processing intensity in the second target mode as second target processing intensity, and the second target earphone is a right earphone when the first target earphone is a left earphone, or the first target earphone is a right earphone and the second target earphone is a left earphone, and sending the second target mode and the second target processing intensity to the second target earphone, where the second target mode indicates the second target earphone to perform a processing function corresponding to the second target mode, and the second target processing intensity indicates processing intensity at which the second target earphone performs the processing function corresponding to the second target mode.

In the foregoing design, the user may separately operate the processing modes and the processing intensity of the left earphone and the right earphone, to meet differentiated requirements of the user for auditory perception of the left ear and the right ear.

According to a fifth aspect, an embodiment of this disclosure further provides a headset control method. The method is applied to a terminal device. The method includes establishing, by the terminal device, a communication connection to a headset, displaying a first interface, where the first interface is used to set functions of the headset, the first interface includes an option for an event sound enhancement function, and an event sound is a sound that meets a preset event condition and that is in an external environment, and when the option for the event sound enhancement function is enabled, controlling both the ANC function and the HT function of the headset to be in an enabled state.

According to a sixth aspect, an embodiment of this disclosure further provides a headset control apparatus. The apparatus is used in a terminal device. The apparatus includes a display module configured to display a first interface, where the first interface is used to set functions of a headset, the first interface includes an option for an event sound enhancement function, and an event sound is a sound that meets a preset event condition and that is in an external environment, and a processing module configured to, when the option for the event sound enhancement function is enabled, control both an ANC function and an HT function of the headset to be in an enabled state.

According to the fifth aspect or the sixth aspect, in a possible design, the first interface includes an option for controlling the HT function of the headset. The HT function of the headset is activated when the option for the HT function is enabled, and the option for enhancing the event sound is added to the first interface. Further, optionally, target intensity of the HT function may be further obtained, and the HT function of the headset is controlled based on the target intensity of the HT function. This step may be performed by the display module and the processing module through cooperation.

According to the fifth aspect or the sixth aspect, in a possible design, the controlling both an ANC function and an HT function of the headset to be in an enabled state includes maintaining the HT function to be in the enabled state, and activating the ANC function of the headset. This step may be performed by the processing module.

According to the fifth aspect or the sixth aspect, in a possible design, the first interface includes an option for controlling the ANC function of the headset, and the ANC function of the headset is activated when the option for the ANC function is enabled. Further, optionally, an intensity option of the ANC function is added to the first interface. This step may be performed by the processing module.

According to the fifth aspect or the sixth aspect, in a possible design, the first interface further includes an option for disabling the ANC function and/or an option for disabling the HT function.

According to the fifth aspect or the sixth aspect, in a possible design, the intensity option of the ANC function includes at least a first steady-state ANC intensity option, a second steady-state ANC intensity option, and an adaptive ANC intensity option, the first steady-state ANC intensity option and the second steady-state ANC intensity option correspond to a first scene and a second scene respectively, and correspond to different ANC function intensity, ANC function intensity corresponding to the adaptive ANC intensity option is related to a scene type of a current environment in which the terminal device or the headset is located, and different scene types of the current environment correspond to different ANC intensity.

According to the fifth aspect or the sixth aspect, in a possible design, the scene type of the current environment in which the terminal or the headset is located is obtained when the adaptive ANC intensity option is enabled, target intensity of the ANC function is obtained through matching based on the scene type, and the ANC function of the headset is obtained based on the target intensity. The different scene types of the current environment include a first scene and a second scene.

According to the fifth aspect or the sixth aspect, in a possible design, the event sound includes a human voice or another sound that meets a preset spectral characteristic.

According to the fifth aspect or the sixth aspect, in a possible design, enabling the option for the event sound enhancement function, enabling the option for the HT function, or enabling the option for the ANC function includes responding to a tap-to-select operation performed for a corresponding function option by the user, adaptive switching performed for a corresponding function, or shortcut triggering performed for a corresponding function.

According to a seventh aspect, an embodiment of this disclosure further provides a denoising method. The method is applied to a headset. The headset supports at least an ANC function, and may further support an HT function. The headset includes a first microphone, a second microphone, and a speaker. The method includes collecting a first signal by using the first microphone, where the first signal is used to represent a sound in a current external environment, collecting a second signal by using the second microphone, where the second signal is used to represent an ambient sound in an ear canal of a user wearing the headset, receiving an instruction for enhancing an event sound, where the event sound is a sound that meets a preset event condition and that is in the external environment, controlling the ANC function to be enabled, that is, the ANC function is enabled, and performing target processing on the first signal and the second signal by using at least the ANC function, to obtain a target signal, where a signal-to-noise ratio of an event sound in the target signal is greater than a signal-to-noise ratio of an event sound in the first signal, and playing the target signal by using the speaker.

According to an eighth aspect, an embodiment of this disclosure further provides a denoising apparatus. The apparatus is used in a headset. The headset supports at least an ANC function, and may further support an HT function. The headset includes a first microphone, a second microphone, and a speaker. The apparatus includes a collection module configured to collect a first signal by using the first microphone, where the first signal is used to represent a sound in a current external environment, and further configured to collect a second signal by using the second microphone, where the second signal is used to represent an ambient sound in an ear canal of a user wearing the headset, a receiving module configured to receive an instruction for enhancing an event sound, where the event sound is a sound that meets a preset event condition and that is in the external environment, a processing module configured to enable the ANC function, and perform target processing on the first signal and the second signal by using at least the ANC function, to obtain a target signal, where a signal-to-noise ratio of an event sound in the target signal is greater than a signal-to-noise ratio of an event sound in the first signal, and a playing module configured to play the target signal by using the speaker.

According to the seventh aspect or the eighth aspect, in a possible design, both the ANC function and the HT function are controlled to be in the enabled state, the first signal is transmitted via hearing through by using the HT function, to obtain a restored signal, an event sound signal in the restored signal is enhanced, and a non event sound signal in the restored signal is weakened, to obtain an event sound enhanced signal, and the first signal, the second signal, and the event sound enhanced signal are processed by using the ANC function, to obtain the target signal.

According to the seventh aspect or the eighth aspect, in a possible design, the first signal, the second signal, and the event sound enhanced signal are processed by using the ANC function, to obtain the target signal.

According to the seventh aspect or the eighth aspect, in a possible design, the headset supports at least the ANC function, the HT function, and an AH function. The headset includes an HT filter bank, a feedback filter bank, and a feedforward filter bank. The method includes obtaining an operating mode of the headset, and when the operating mode is the ANC function, invoking the feedback filter bank and the feedforward filter bank to perform the ANC function, when the operating mode is the HT function, invoking the HT filter bank and the feedback filter bank to perform the HT function, or when the operating mode is the AH function, invoking the HT filter bank, the feedforward filter bank, and the feedback filter bank to perform the AH function.

According to a ninth aspect, an embodiment of this disclosure further provides a denoising method. The method is applied to a headset. The headset supports at least an ANC function, the headset includes a first microphone and a third microphone, the first microphone focuses more on collection of a sound in a current external environment, and the third microphone focuses more on sound pickup. When the headset enables the ANC function, a first signal is collected for the current environment by using the first microphone, a second signal is collected for the current environment by using the third microphone, a noise level of a current scene is determined based on the first signal and the second signal, where different noise levels correspond to different ANC intensity, and the ANC function is controlled based on a current noise level.

According to a tenth aspect, an embodiment of this disclosure further provides a denoising apparatus. The apparatus is used in a headset. The headset supports at least an ANC function, the headset includes a first microphone and a third microphone, the first microphone focuses more on collection of a sound in a current external environment, and the third microphone focuses more on sound pickup. A collection module is configured to, when the ANC function of the headset is in an enabled state, collect a first signal for the current environment by using the first microphone, and collect a second signal for the current environment by using the third microphone. An identification module is configured to determine a noise level of a current scene based on the first signal and the second signal. Different noise levels correspond to different ANC intensity. A processing module is configured to control the ANC function based on a current noise level.

According to the ninth aspect or the tenth aspect, in a possible design, voice activity detection is performed by using a feature of correlation between the first signal and the second signal, and noise of a non voice signal is tracked, and the current scene is determined as a quiet scene if energy of the noise is less than a first threshold, the current scene is determined as a heavy-noise scene if spectra of the noise are mainly in a low frequency band and energy of the noise is greater than a second threshold, or the current scene is determined as a common scene if the current scene is neither the quiet scene nor the heavy-noise scene, where the second threshold is greater than the first threshold. ANC intensity corresponding to the quiet scene, the common scene, and the heavy-noise scene increases successively.

According to the ninth aspect or the tenth aspect, in a possible design, if it is detected that the current scene is at a new noise level and lasts for preset duration, ANC intensity corresponding to the new noise level is obtained, and the ANC function is controlled based on the ANC intensity corresponding to the new noise level.

According to an eleventh aspect, an embodiment of this disclosure further provides a headset control method. The method is applied to a terminal device. The method includes establishing, by the terminal device, a communication connection to a headset, where the headset supports at least an ANC function, displaying a first interface, where the first interface is used to set functions of the headset, and the first interface includes an option for controlling an ANC function of the headset, activating the ANC function of the headset when the option for the ANC function is enabled, adding an intensity option of the ANC function to the first interface, and performing ANC based on a result of enabling the intensity option of the ANC function, where the intensity option of the ANC function includes at least a first steady-state ANC intensity option, a second steady-state ANC intensity option, and an adaptive ANC intensity option, the first steady-state ANC intensity option and the second steady-state ANC intensity option correspond to a first scene and a second scene respectively, and correspond to different steady ANC function intensity, ANC function intensity corresponding to the adaptive ANC intensity option is related to a scene type of a current environment in which the terminal device or the headset is located, and different scene types of the current environment correspond to different ANC intensity. Optionally, the different scene types of the current environment include a first scene and a second scene.

According to a twelfth aspect, an embodiment of this disclosure further provides a headset control apparatus. The terminal device establishes a communication connection to a headset. The headset supports at least an ANC function. The apparatus includes a display module configured to display a first interface, where the first interface is used to set functions of the headset, and the first interface includes an option for controlling the ANC function of the headset, and a processing module configured to activate the ANC function of the headset when the option for the ANC function is enabled. The display module is further configured to add an intensity option of the ANC function to the first interface after the option for the ANC function is enabled. The processing module is further configured to perform ANC based on a result of enabling the intensity option of the ANC function. The intensity option of the ANC function includes at least a first steady-state ANC intensity option, a second steady-state ANC intensity option, and an adaptive ANC intensity option, the first steady-state ANC intensity option and the second steady-state ANC intensity option correspond to a first scene and a second scene respectively, and correspond to different steady ANC function intensity, ANC function intensity corresponding to the adaptive ANC intensity option is related to a scene type of a current environment in which the terminal device or the headset is located, and different scene types of the current environment correspond to different ANC intensity.

According to the eleventh aspect or the twelfth aspect, in a possible design, the processing module is further configured to, when the first steady-state ANC intensity option is enabled, obtain first ANC function intensity corresponding to the first steady-state ANC intensity option, and control the ANC function based on the first ANC function intensity, when the second steady-state ANC intensity option is enabled, obtain second ANC function intensity corresponding to the second steady-state ANC intensity option, and control the ANC function based on the second ANC function intensity, or when the adaptive ANC intensity option is enabled, obtain the scene type of the current environment in which the terminal device or the headset is located, determine ANC intensity based on the scene type of the current environment, and control the ANC function based on the determined ANC intensity.

According to a thirteenth aspect, an embodiment of this disclosure further provides a headset control method. The method is applied to a terminal device. The method includes establishing, by the terminal device, a communication connection to a headset, where the headset supports at least an HT function, displaying a first interface, where the first interface is used to set functions of the headset, and the first interface includes an option for controlling the HT function of the headset, activating the HT function of the headset when the option for the HT function is enabled, adding an option for enhancing the event sound to the first interface, where the event sound is a sound that meets a preset event condition and that is in an external environment, and when the option for an event sound enhancement function is enabled, controlling the headset to increase a signal-to-noise ratio of the event sound in a signal collected by the headset, where a higher signal-to-noise ratio of the event sound indicates a higher energy ratio of the event sound in the signal.

According to a fourteenth aspect, an embodiment of this disclosure further provides a headset control apparatus. The apparatus is used in a terminal device, the terminal device establishes a communication connection to a headset, and the headset supports at least an HT function. The apparatus includes a display module configured to display a first interface, where the first interface is used to set functions of the headset, and the first interface includes an option for controlling the HT function of the headset, and a processing module configured to activate the HT function of the headset when the option for the HT function is enabled. The display module is further configured to, after the option for the HT function is enabled, add an option for enhancing the event sound to the first interface, where the event sound is a sound that meets a preset event condition and that is in an external environment. The processing module is further configured to, when the option for an event sound enhancement function is enabled, control the headset to increase a signal-to-noise ratio of the event sound in a signal collected by the headset, where a higher signal-to-noise ratio of the event sound indicates a higher energy ratio of the event sound in the signal.

According to the thirteenth aspect or the fourteenth aspect, in a possible design, the event sound includes a human voice or another sound that meets a preset spectral characteristic. Optionally, the first interface includes an option for controlling an ANC function of the headset, an option for disabling the ANC function, and/or the option for disabling the HT function.

According to the thirteenth aspect or the fourteenth aspect, in a possible design, the processing module is further configured to obtain first intensity of the ANC function, and control the ANC function of the headset based on the first intensity, obtain second intensity of the HT function, and control the HT function of the headset based on the second intensity, or obtain third intensity of event sound enhancement, and control the event sound enhancement function of the headset based on the third intensity.

According to a fifteenth aspect, an embodiment of this disclosure further provides a noise processing apparatus. The apparatus is used in a headset. The headset has at least two of the following functions: an ANC function, an HT function, or an AH function. The headset includes a first microphone and a second microphone. The first microphone is configured to collect a first signal, where the first signal is used to represent a sound in a current external environment. The second microphone is configured to collect a second signal, where the second signal is used to represent an ambient sound in an ear canal of a user wearing the headset.

The noise processing apparatus includes corresponding functional modules configured to implement the steps in the method in the first aspect. For details, refer to detailed descriptions in the method example. Details are not described herein again. Functions may be implemented by hardware, or may be implemented by executing corresponding software by hardware. The hardware or software includes one or more modules corresponding to the foregoing functions. For example, the noise processing apparatus includes a communication module configured to receive a first audio signal from the terminal device, an obtaining module configured to obtain a target mode, where the target mode is determined based on a scene type of a current external environment, the target mode indicates the headset to perform a target processing function, and the target processing function is one of the following functions: the ANC function, the HT function, or the AH function, and a first processing module configured to obtain a second audio signal based on the target mode, the first audio signal, the first signal, and the second signal.

According to a sixteenth aspect, an embodiment of this disclosure provides a target headset, including a left earphone and a right earphone. The left earphone is used to implement any one of the foregoing possible headset-related design methods, or the right earphone is used to implement any one of the foregoing possible headset-related design methods.

In a possible design, different processing modes are used for the left earphone and the right earphone.

According to a seventeenth aspect, an embodiment of this disclosure provides a target headset. The target headset includes a left earphone and a right earphone. The left earphone or the right earphone includes a first microphone, a second microphone, a processor, a memory, and a speaker. The first microphone is configured to collect a first signal, where the first signal is used to represent a sound in a current external environment. The second microphone is configured to collect a second signal, where the second signal is used to represent an ambient sound in an ear canal of a user wearing the headset. The memory is configured to store a program or instructions. The processor is configured to invoke the program or the instructions, to enable the target headset to perform any one of the possible headset-related methods to obtain a second audio signal or a target signal. The speaker is configured to play the second audio signal or the target signal.

According to an eighteenth aspect, an embodiment of this disclosure provides a mode control apparatus. The apparatus is used in a terminal device. The apparatus includes corresponding functional modules configured to implement any one of the foregoing possible terminal-related steps. For details, refer to detailed descriptions in the method example. Details are not described herein again. Functions may be implemented by hardware, or may be implemented by executing corresponding software by hardware. The hardware or software includes one or more modules corresponding to the foregoing functions.

According to a nineteenth aspect, an embodiment of this disclosure provides a terminal device, including a memory, a processor, and a display. The display is configured to display an interface. The memory is configured to store a program or instructions. The processor is configured to invoke the program or the instructions, to enable the terminal device to perform the steps in any one of the possible terminal-related methods.

According to a twentieth aspect, this disclosure provides a computer-readable storage medium. The computer-readable storage medium stores a computer program or instructions. When the computer program or the instructions are executed by a headset, the headset is enabled to perform any one of the foregoing possible related headset design methods.

According to a twenty-first aspect, this disclosure provides a computer-readable storage medium. The computer-readable storage medium stores a computer program or instructions. When the computer program or the instructions are executed by a terminal device, a headset is enabled to perform the method in any one of the foregoing possible terminal-related designs.

According to a twenty-second aspect, this disclosure provides a computer program product. The computer program product includes a computer program or instructions. When the computer program or the instructions are executed by a headset, the method in any one of the foregoing possible headset implementations is performed.

According to a twenty-third aspect, this disclosure provides a computer program product. The computer program product includes a computer program or instructions. When the computer program or the instructions are executed by a headset, the method in any one of the foregoing possible headset implementations is performed.

It should be understood that any one of the foregoing possible designs may be freely combined without violating a law of nature.

DESCRIPTION OF EMBODIMENTS

Figure 1:
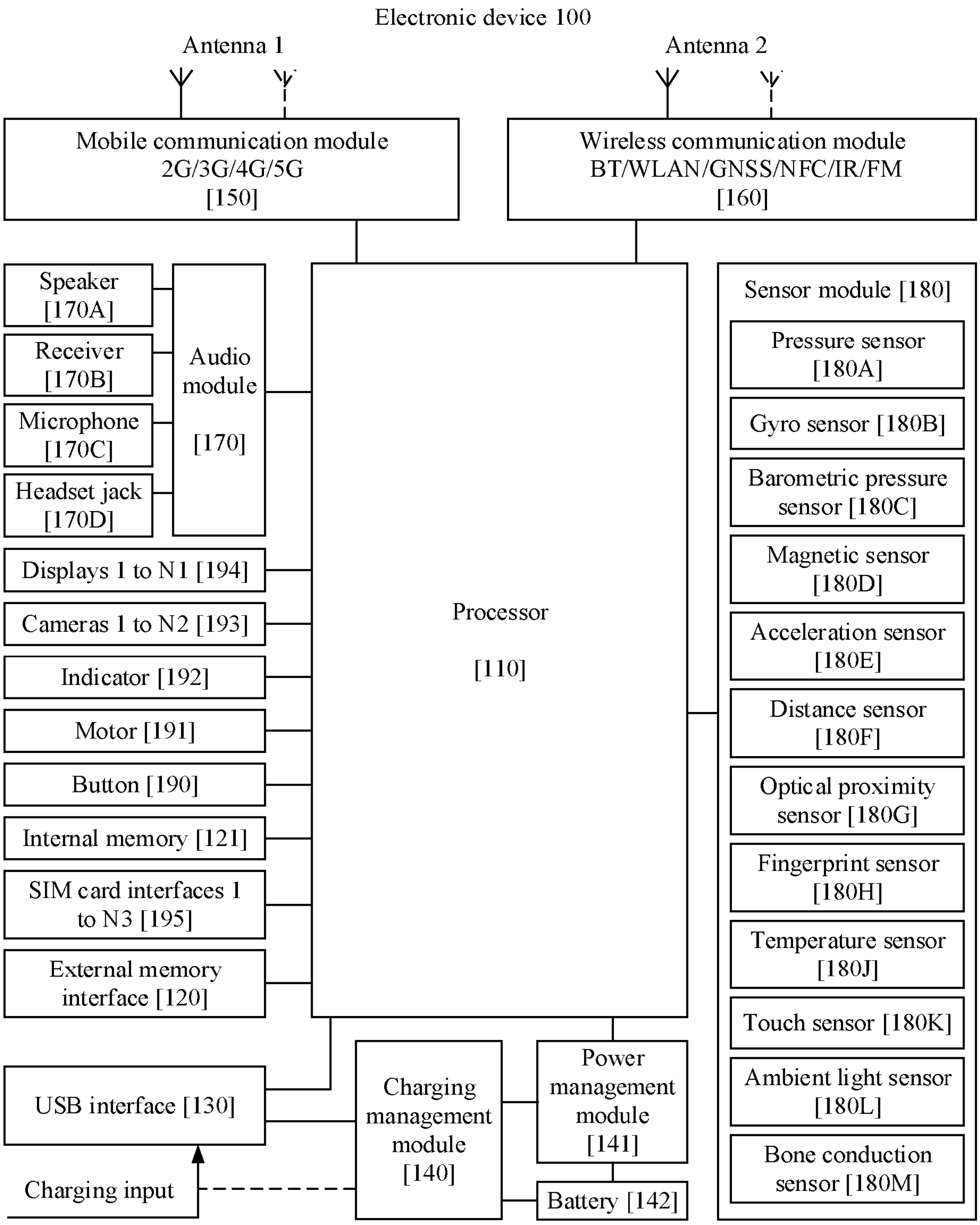
FIG. 1 is a schematic diagram of a hardware structure of a terminal device according to an embodiment of this disclosure.

The following describes in detail embodiments of this disclosure with reference to accompanying drawings. Terms used in embodiments of this disclosure are only used to explain specific embodiments of this disclosure, but are not intended to limit this disclosure. It is clear that the described embodiments are merely some rather than all of embodiments of this disclosure. All other embodiments obtained by a person of ordinary skill in the art based on embodiments of this disclosure without creative efforts shall fall within the protection scope of this disclosure.

The following first explains and describes some terms in embodiments of this disclosure, to facilitate understanding by a person skilled in the art.

(1) An application (app) in embodiments of this disclosure is a software program that can implement one or more particular functions. Generally, a plurality of applications may be installed on a terminal device, for example, a camera application, a mailbox application, and a headset control application. An application mentioned below may be a system application installed on the terminal device before delivery, or may be a third-party application downloaded from a network or obtained from another terminal device by a user when using the terminal device.

(2) Bark subband:

The human auditory system has masking effect, that is, a strong frequency sound hinders human perception of a weak frequency sound that simultaneously occurs near the strong frequency sound, and a basilar membrane of a cochlea has frequency selection and tuning effect on an external sound signal. Therefore, a concept of a critical frequency band is introduced, to measure a sound frequency in terms of perception. It is generally considered that there are 24 critical frequency bands in the absolute threshold of hearing of 22 hertz (Hz) to 22 kilohertz (kHz), which may cause vibration in different positions of the basilar membrane. Each critical frequency band is referred to as a bark subband.

(3) Voice activity detection (VAD) is to accurately locate start and end points of a voice with noise. Because a voice includes a long mute part, separating the mute part from an actual voice is original processing on voice data.

(4) In embodiments of this disclosure, "at least one piece (item)" means one piece (item) or more pieces (items), and "a plurality of pieces (items)" means two pieces (items) or more pieces (items). The term "and/or" describes an association relationship for describing associated objects and represents that three relationships may exist. For example, A and/or B may represent the following cases: only A exists, both A and B exist, and only B exists, where A and B may be singular or plural. In addition, the character "/" in this specification generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, or c may represent a, b, c, a-b, a-c, b-c, or a-b-c, where a, b, and c may be singular or plural. In this disclosure, a symbol "(a, b)" represents an open interval with a range greater than a and less than b, "[a, b]" represents a closed interval with a range greater than or equal to a and less than or equal to b, "(a, b]" represents a half-open and half-closed interval with a range greater than a and less than or equal to b, and "(a, b]" represents a half-open and half-closed interval with a range greater than a and less than or equal to b. In addition, unless otherwise stated, in embodiments of this disclosure, ordinal numbers such as "first" and "second" are intended to distinguish between a plurality of objects, but are not intended to limit sizes, content, orders, time sequences, priorities, importance, or the like of the plurality of objects. For example, a first microphone and a second microphone are merely used to distinguish between different microphones, but do not indicate different sizes, priorities, importance degrees, or the like of the two microphones.

An embodiment of this disclosure provides a system. The system includes a terminal device 100 and a headset 200. The terminal device 100 is connected to the headset 200, and the connection may be a wireless connection or a wired connection. For the wireless connection, for example, the terminal device may be connected to the headset by using a BLUETOOTH technology, a WI-FI technology, an infrared (IR) technology, or an ultra-wideband technology.

In this embodiment of this disclosure, the terminal device 100 is a device having an interface display function. The terminal device 100 may be, for example, a product having a display interface, for example, a mobile phone, a display, a tablet computer, or an in-vehicle device, or an intelligent display wearable product, for example, a smartwatch or a smart band. A specific form of the terminal device is not particularly limited in this embodiment of this disclosure.

The headset 200 includes two sound production units that may be hung on ear edges. A voice unit adapted to the left ear may be referred to as a left earphone, and a voice unit adapted to the right ear may be referred to as a right earphone. From a perspective of wearing, the headset 200 in this embodiment of this disclosure may be an over-the-head headset, an over-the-ear headset, a behind-the-neck headset, an earplug headset, or the like. The earplug headset further includes an in-ear headset (or an ear canal headset) or semi-open earbuds. The headset 200 has at least two of the following functions: an ANC function, an HT function, or an AH function. For ease of description, ANC, HT, and AH are collectively referred to as AHA in this embodiment of this disclosure, and certainly may have another name. This is not limited in this disclosure.

In an example, an in-ear headset is used as an example. A structure used for the left earphone is similar to that used for the right earphone. An earphone structure described below may be used for both the left earphone and the right earphone. The earphone structure (the left earphone or the right earphone) includes a rubber sleeve that can be inserted into an ear canal, an earbag close to an ear, and an earphone rod hung on the earbag. The rubber sleeve directs a sound to the ear canal. Components such as a battery, a speaker, and a sensor are included in the earbag. A microphone, a physical button, and the like can be deployed on the earphone rod. The earphone rod may be of a shape of a cylinder, a cuboid, an ellipse, or the like. A microphone arranged in an ear may be referred to as an error microphone, and a microphone arranged outside the earphone is referred to as a reference microphone. The error microphone is configured to collect a sound in an external environment. When a user wears the earphone, the reference microphone collects an ambient sound in the ear canal of the user wearing the headset. The two microphones may be analog microphones or digital microphones. After the user wears the earphone, a placement relationship between the speaker and the two microphones is as follows. The error microphone is in the ear and close to the earphone rubber. The speaker is located between the error microphone and the reference microphone. The reference microphone is close to an external structure of the ear, and may be arranged on the upper part of the earphone rod. A pipe of the error microphone may face the speaker, or may face the inside of the ear canal. There is an earphone opening near the reference microphone, to transmit the sound in the external environment to the reference microphone via hearing through.

In this embodiment of this disclosure, the terminal device 100 is configured to send a downlink audio signal and/or control signaling to the headset 200. For example, the control signaling is used to control a processing mode used for the headset 200. The processing mode used for the headset 200 may include at least two of the following modes: a null mode indicating to perform no processing, an ANC mode indicating to perform an ANC function, an HT mode indicating to implement an HT function, or an AH mode indicating to perform an AH function.

When the ANC mode is used for the headset, perception of the headset user on a sound in a current external environment and perception of the ambient sound in the ear canal of the user wearing the headset can be weakened. When the HT mode is used for the headset, perception of the user on the sound in the current external environment can be enhanced. When the AH mode is used for the headset, perception of the user on an event sound included in the sound in the current external environment can be enhanced. The event sound is a preset sound in an external environment, or the event sound meets a preset spectrum. For example, the event sound includes a station announcement sound or a horn in a railway station, in this case, the event sound meets a spectrum of the station announcement sound or the horn in the railway station. For another example, the event sound may include a notification sound in an airplane terminal, a broadcast sound on an airplane, a queue calling sound in a restaurant. It should be understood that both a terminal and a headset can identify an event sound.

It should be understood that the headset 200 includes the left earphone and the right earphone, and a same processing mode or different processing modes may be used for the left earphone and the right earphone. When a same processing mode is used for the left earphone and the right earphone, auditory perception of the left ear on which the user wears the left earphone may be the same as that of the right ear on which the user wears the right earphone. When different processing modes are used for the left earphone and the right earphone, auditory perception of the left ear on which the user wears the left earphone is different from that of the right ear on which the user wears the right earphone. For example, ANC is used for the left earphone and AH is used for the right earphone. When the ANC mode is used for the left earphone, perception of the left ear of the headset user on the sound in the current external environment and perception of the ambient sound in the left ear canal of the user wearing the headset can be weakened. When the AH mode is used for the right earphone, perception of the right ear of the user on the event sound included in the sound in the current external environment can be enhanced.

The processing mode of the headset may be determined in any one of the following possible manners.

In a first possible manner, the terminal device 100 provides a control interface used for the user to select the processing mode of the headset 200 based on a requirement. For example, the terminal device 100 is instructed by a user operation to send control signaling to the headset 200. The control signaling indicates the processing mode used for the headset 200.

It should be noted that processing modes used for the left earphone and the right earphone in the headset 200 may be the same or may be different. For example, a selection control in the control interface is used to select a same processing mode for the left earphone and the right earphone. For another example, the control interface may include two selection controls, where one selection control is used to select a processing mode for the left earphone, and the other selection control is used to select a processing mode for the right earphone. The control interface and the selection control are described below in detail. Details are not described herein.

In a second possible manner, the terminal device identifies a scene type of the current external environment of the user. In different scenes, processing modes used for the headset 200 are different, that is, processing functions implemented by the headset are different.

In a third possible manner, the headset 200 identifies an operation of the user, to determine the ANC mode, the HT mode, or the AH mode that is used for the headset 200 and that is selected by the user. For example, the operation of the user may be an operation of tapping the headset by the user, or buttons are disposed on the headset, and different buttons indicate different processing modes.

In a fourth possible manner, the headset identifies a scene type of an external environment of the headset, and processing modes used for the headset vary with scenes.

The first possible manner to the fourth possible manner are described in detail subsequently, and details are not described herein again.

FIG. 1 is a schematic diagram of an optional hardware structure of a terminal device 100.

The terminal device 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the terminal device 100. In some other embodiments of this disclosure, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has just been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a two-way synchronous serial bus, including a serial data line (SDL) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface to implement a touch function of the terminal device 100.

The I2S interface may be used for audio communication. In some embodiments, the processor 110 may include a plurality of groups of I2S buses. The processor 110 may be coupled to the audio module 170 through an I2S bus, to implement communication between the processor 110 and the audio module 170. In some embodiments, the audio module 170 may transmit an audio signal to the wireless communication module 160 through the I2S interface, to implement a function of answering a call through a headset 200 (for example, a BLUETOOTH headset).

The PCM interface may also be used for audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a BLUETOOTH headset 200. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a BLUETOOTH module in the wireless communication module 160 through the UART interface, to implement a BLUETOOTH function. In some embodiments, the audio module 170 may transmit an audio signal to the wireless communication module 160 through the UART interface, to implement a function of playing music through a BLUETOOTH headset 200.

The MIPI interface may be used to connect the processor 110 to a peripheral component, for example, the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal device

100. The processor 110 communicates with the display 194 through the DSI interface, to implement a display function of the terminal device 100.

The GPIO interface may be configured by software. The GPIO interface may be configured as a control signal or a data signal. In some embodiments, the GPIO interface may be used to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be a mini USB interface, a micro USB interface, a USB type-C interface, or the like. The USB interface 130 may be used to connect to the charger to charge the terminal device 100, or may be used to transmit data between the terminal device 100 and a peripheral device, or may be used to connect to the headset 200, and play audio through the headset 200. The interface may alternatively be used to connect to another terminal device, for example, an AR device.

It may be understood that an interface connection relationship between the modules in this embodiment of the present disclosure is merely an example for description, and does not constitute a limitation on the structure of the terminal device 100. In some other embodiments of this disclosure, the terminal device 100 may alternatively use an interface connection manner different from that in the foregoing embodiments, or may use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive wireless charging input by using a wireless charging coil of the terminal device 100. When charging the battery 142, the charging management module 140 may further supply power to the terminal device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery status of health (electric leakage and impedance). In some other embodiments, the power management module 141 may alternatively be disposed in the processor 110. In some other embodiments, the power management module 141 and the charging management module 140 may alternatively be disposed in a same component.

A wireless communication function of the terminal device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be further reused, to improve antenna utilization. For example, the antenna 1 may be reused as a diversity antenna of a wireless local area network. In some other embodiments, the antenna may be used in combination with a tuning switch.

The mobile communication module 150 may provide a wireless communication solution that includes second generation (2G)/third generation (3G)/fourth generation (4G)/fifth generation (5G) or the like and that is applied to the terminal device 100. The mobile communication module 150 may include at least one filter, a switch, a power amplifier, a low-noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution, applied to the terminal device 100, to wireless communication including a wireless local area network (WLAN) (for example, a WI-FI network), BLUETOOTH (BT), a global navigation satellite system (GNSS), frequency modulation (FM), near-field communication (NFC) technology, an IR technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. For example, the wireless communication module 160 includes a BLUETOOTH module, and the terminal device 100 establishes a wireless connection to the headset 200 through BLUETOOTH. For another example, the wireless communication module 160 includes an infrared module, and the terminal device 100 may establish a wireless connection to the headset 200 by using the infrared module.

In some embodiments, in the terminal device 100, the antenna 1 and the mobile communication module 150 are coupled, and the antenna 2 and the wireless communication module 160 are coupled, so that the terminal device 100 can communicate with a network and another device by using a wireless communication technology. The wireless communication technology may include a Global System for Mobile Communications (GSM), a General Packet Radio Service (GPRS), code-division multiple access (CDMA), wideband CDMA (WCDMA), time-division synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The terminal device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the terminal device 100 may include one or N1 displays 194, where N1 is a positive integer greater than 1.

The terminal device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a still image or a video. An optical image of an object is generated through the lens, and is projected onto the photosensitive element. The photosensitive element may be a charge-coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format for example, red, green, and blue (RGB) or luma, blue projection, and red projection (YUV). In some embodiments, the processor 110 may trigger, according to a program or an instruction in the internal memory 121, the camera 193 to be started, so that the camera 193 captures at least one image, and performs corresponding processing on the at least one image according to a program or an instruction. In some embodiments, the terminal device 100 may include one camera 193 or N2 cameras 193, where N2 is a positive integer greater than 1.

The digital signal processor is configured to process a digital signal, and may process another digital signal in addition to the digital image signal. For example, when the terminal device 100 selects a frequency bin, the digital signal processor is configured to perform Fourier transform on frequency bin energy.

The video codec is configured to compress or decompress a digital video. The terminal device 100 may support one or more video codecs. In this way, the terminal device 100 can play or record videos in a plurality of coding formats, for example, Moving Picture Experts Group (MPEG)-1, MPEG-2, MPEG-3, and MPEG-4.

The NPU is a neural-network (NN) processing unit. The NPU quickly processes input information with reference to a structure of a biological neural network, for example, a transfer mode between human brain neurons, and may further continuously perform self-learning. The NPU can implement applications such as intelligent cognition of the terminal device 100, for example, image recognition, facial recognition, speech recognition, and text understanding.

The external memory interface 120 may be used to connect to an external memory card, for example, a micro SD card, to extend a storage capability of the terminal device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application (for example, a camera application) required by at least one function, and the like. The data storage area may store data (such as an image captured by a camera) created during use of the terminal device 100, and the like. In addition, the internal memory 121 may include a high-speed random-access memory (RAM), and may further include a nonvolatile memory, for example, at least one magnetic disk storage device, a flash memory device, or a Universal Flash Storage (UFS). The processor 110 runs instructions stored in the internal memory 121 and/or instructions stored in the memory disposed in the processor, to perform various function applications of the terminal device 100 and process data. The internal memory 121 may further store a downlink audio signal provided in this embodiment of this disclosure. The internal memory 121 may further store code used to implement a function of controlling the headset 200. When the code that is stored in the internal memory 121 and that is used to perform the function of controlling the headset 200 is run by the processor 110, the headset 200 is controlled to implement a corresponding function, for example, an ANC function, an HT function, or an AH function. Certainly, the code that is provided in this embodiment of this disclosure and that is used to perform the function of controlling the headset 200 may be further stored in an external memory. In this case, the processor 110 may run, through the external memory interface 120, corresponding data that is stored in the external memory and that implements the function of controlling the headset 200, to control the headset 200 to implement the corresponding function.

The terminal device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The terminal device 100 may listen to music or answer a call in a hands-free mode by using the speaker 170A.

The receiver 170B, also referred to as an "earpiece", is configured to convert an audio electrical signal into a sound signal. When a call is answered or voice information is received by using the terminal device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to collect a sound signal and implement a denoising function. In some other embodiments, three, four, or more microphones 170C may alternatively be disposed in the terminal device 100, to collect a sound signal, implement denoising, identify a sound source, implement a directional recording function, and the like.

The headset jack 170D is configured to connect to a wired headset. When the headset 200 provided in this embodiment of this disclosure is a wired headset, the terminal device 100 is connected to the headset through the headset jack 170D. The headset jack 170D may be the USB interface 130, a 3.5 millimeter (mm) Open Mobile Terminal Platform (OMTP) standard interface, or a Cellular Telecommunications Industry Association of the USA) (CTIA) standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines pressure intensity based on the change of the capacitance. When a touch operation is performed on the display 194, the terminal device 100 detects intensity of the touch operation by using the pressure sensor 180A. The terminal device 100 may also calculate a touch location based on a detection signal of the pressure sensor 180A. In some embodiments, touch operations that are performed in a same touch position but have different touch operation intensity may correspond to different operation instructions. For example, an instruction for viewing a Short Message Services (SMS) message is performed when a touch operation with touch operation intensity less than a first pressure threshold is performed on an SMS message application icon, or an instruction for creating a new SMS message is performed when a touch operation with touch operation intensity greater than or equal to a first pressure threshold is performed on an SMS message application icon.

The gyroscope sensor 180B may be configured to determine a motion posture of the terminal device 100. In some embodiments, angular velocities of the terminal device 100 around three axes (namely, x, y, and z axes) may be determined by using the gyro sensor 180B. The gyro sensor 180B may be configured to implement image stabilization during photographing. For example, when the shutter is pressed, the gyroscope sensor 180B detects an angle at which the terminal device 100 jitters, calculates, based on the angle, a distance for which a lens module needs to compensate, and allows the lens to cancel out the jitter of the terminal device 100 through reverse motion, to implement image stabilization. The gyro sensor 180B may also be used in a navigation scene and a somatic game scene.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip cover by using the magnetic sensor 180D. In some embodiments, when the terminal device 100 is a flip phone, the terminal device 100 may detect opening and closing of a flip cover based on the magnetic sensor 180D. Further, a characteristic of the flip cover, for example, automatic unlocking is set based on a detected opening or closing state of the leather case or a detected opening or closing state of the flip cover.

The acceleration sensor 180E may detect values of accelerations of the terminal device 100 in various directions (usually on three axes). A magnitude and a direction of gravity may be detected when the terminal device 100 is still. The acceleration sensor 180E may further be configured to identify a posture of the terminal device, and is used for an application such as switching between a landscape mode and a portrait mode or a pedometer.

The distance sensor 180F is configured to measure a distance. The terminal device 100 may measure a distance in an infrared manner or a laser manner. In some embodiments, in a photographing scene, the terminal device 100 may measure a distance by using the distance sensor 180F, to implement quick focusing.

The optical proximity sensor 180G may include, for example, an LED, and an optical detector, for example, a photodiode. The light-emitting diode may be an infrared light-emitting diode. The terminal device 100 emits infrared light outward by using the light-emitting diode. The terminal device 100 detects infrared reflected light from a nearby object by using the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. In some embodiments, the terminal device 100 may determine exposure time of an image based on brightness of ambient light sensed by the ambient optical sensor 180L. In some embodiments, the terminal device 100 may adaptively adjust brightness of the display 194 based on the brightness of the sensed ambient light. The ambient light sensor 180L may also be configured to automatically adjust white balance during photographing. The ambient light sensor 180L may further cooperate with the optical proximity sensor 180G to detect whether the terminal device 100 is in a pocket, to prevent accidental touch.

The fingerprint sensor 180H is configured to collect a fingerprint. The terminal device 100 may use a characteristic of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of the processor located near the temperature sensor 180J, to reduce power consumption and implement heat protection. In some other embodiments, when the temperature is lower than another threshold, the terminal device 100 heats the battery 142, to avoid abnormal shutdown of the terminal device 100 caused by a low temperature. In some other embodiments, when the temperature is lower than still another threshold, the terminal device 100 boosts an output voltage of the battery 142, to avoid abnormal shutdown caused by a low temperature.

The touch sensor 180K is also referred to as a "touch device". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal device 100 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive button input, and generate button signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different regions of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may indicate a charging status and a power change, or may indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal device 100. The terminal device 100 may support one or N3 SIM card interfaces, where N3 is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external storage card. The terminal device 100 interacts with a network by using the SIM card, to implement functions such as calling and data communication. In some embodiments, the terminal device 100 uses an eSIM card, namely, an embedded SIM card. The eSIM card may be embedded into the terminal device 100, and cannot be separated from the terminal device 100.

A software system of the terminal device 100 may use a layered architecture, an event-driven architecture, a micro-kernel architecture, a microservice architecture, or a cloud architecture. In embodiments of the present disclosure, an ANDROID system with a layered architecture is used as an example to describe a software structure of the terminal device 100.

Figure 2:
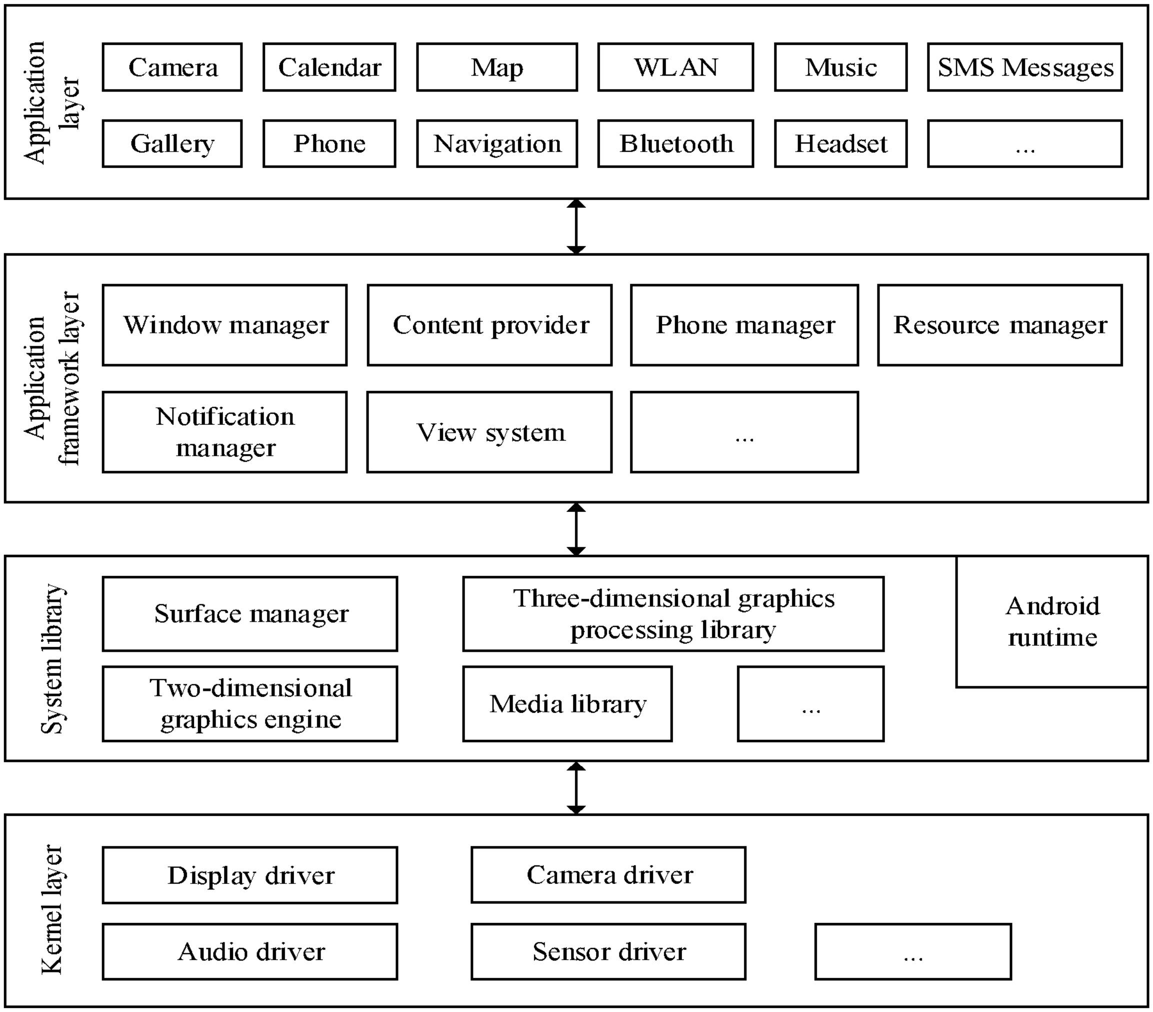
FIG. 2 is a schematic diagram of a software structure of a terminal device according to an embodiment of this disclosure.

FIG. 2 is a block diagram of a software structure of the terminal device 100 according to this embodiment of the present disclosure.

In a layered architecture, software is divided into several layers, and each layer has a clear role and task. The layers communicate with each other through software interfaces. In some embodiments, the ANDROID system is divided into four layers from top to bottom: an application layer, an application framework layer, an ANDROID runtime and a system library, and a kernel layer. The application layer may include a series of application packages.

As shown in FIG. 2, the application packages may include applications such as camera, gallery, calendar, phone, map, navigation, WLAN, BLUETOOTH, music, videos, and messages.

The application framework layer provides an application programming interface (API) and a programming framework to an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the terminal device 100, for example, management of call statuses (including answering, declining, and the like).

The resource manager provides various resources such as a localized character string, an icon, an image, a layout file, and a video file to an application.

The notification manager enables an application to display notification information in a status bar, and may be configured to convey a notification message. The notification manager may automatically disappear after a short pause without requiring user interaction. For example, the notification manager is used to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the terminal device vibrates, or an indicator light blinks.

The ANDROID runtime includes a kernel library and a virtual machine. The ANDROID runtime is responsible for scheduling and managing the ANDROID system.

The kernel library includes two parts: a function that needs to be invoked in java language and a kernel library of ANDROID.

The application layer and the application framework layer run on the virtual machine. The virtual machine executes java files of the application layer and the application framework layer as binary files. The virtual machine is used to implement functions such as object lifecycle management, stack management, thread management, security and exception management, and garbage collection.

The system library may include a plurality of functional modules, for example, a surface manager, a media library, a three-dimensional (3D) graphics processing library (for example, OpenGL Embedded System (ES)), and a two-dimensional (2D) graphics engine (for example, Scala Game Library (SGL)).

The surface manager is used to manage a display subsystem and provide fusion of 2D and 3D layers to a plurality of applications.

The media library supports playback and recording in a plurality of commonly used audio and video formats, and static image files. The media library may support a plurality of audio and video coding formats such as MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a headset driver, and a sensor driver.

For example, the following describes a working process of software and hardware of the terminal device 100 with reference to a scenario of capturing and playing audio.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch and tap operation, and a control corresponding to the tap operation is a control of an audio application icon. The audio application invokes an interface of the application framework layer to start a headset control application, and further invokes the kernel layer to start the headset driver and send an audio signal to the headset, and an audio signal is played by using the headset 200.

Figure 3:
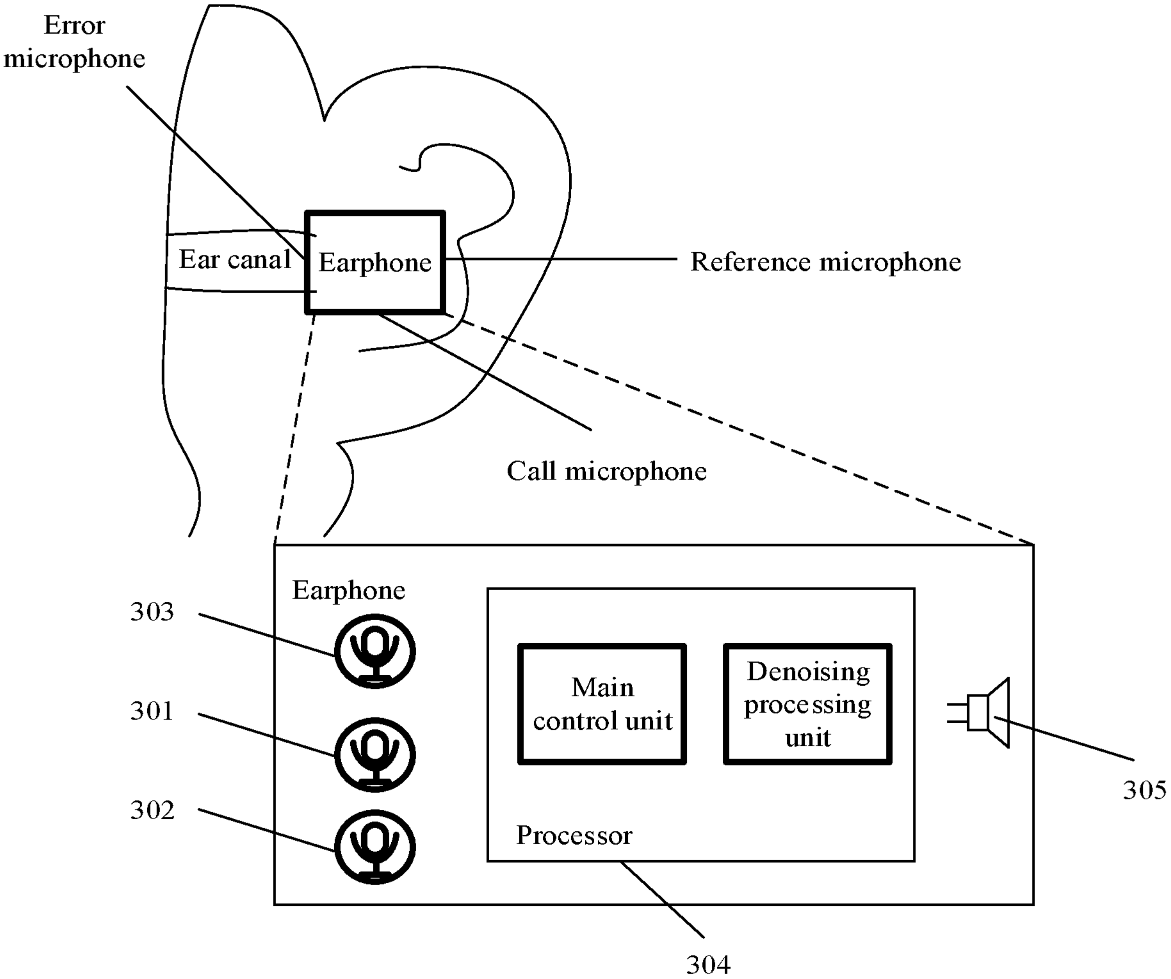
FIG. 3 is a schematic diagram of a structure of a headset according to an embodiment of this disclosure.

FIG. 3 is a schematic diagram of an optional hardware structure of the headset 200. The headset 200 includes the left earphone and the right earphone. A structure used for the left earphone is similar to that used for the right earphone. A structure of each of the earphones (including the left earphone and the right earphone) includes a first microphone 301, a second microphone 302, and a third microphone 303. A processor 304 and a speaker 305 may be further included in the earphone. It should be understood that the earphone described below may be interpreted as the left earphone, or may be interpreted as the right earphone.

The first microphone 301 is configured to collect a sound in a current external environment, and the first microphone 301 may also be referred to as a reference microphone. When the user wears the earphone, the first microphone 301 is located outside the earphone, or the first microphone 301 is located outside the ear. When the user wears the earphone, the second microphone 302 collects an ambient sound in an ear canal of the user. The second microphone 302 may also be referred to as an error microphone. When the user wears the earphone, the second microphone 302 is located inside the earphone and close to the ear canal. The third microphone 303 is configured to collect a call signal. The third microphone 303 may be located outside the earphone. When the user wears the earphone, the third microphone 303 is closer to the mouth of the user than the first microphone 301.

It should be noted that, that the first microphone 301 is configured to collect a sound in a current external environment may be interpreted as follows. A sound in an external environment in which the headset user wears the headset, for example, on a train, is a sound in an ambient environment of the user wearing the headset. The first microphone 301 in the left earphone collects a sound in an external environment of the left earphone. The first microphone 301 in the right earphone collects a sound in an external environment of the right earphone.

For ease of distinguishing, a signal collected by the first microphone 301 (reference microphone) is referred to as a first signal, and a signal collected by the second microphone 302 (error microphone) is referred to as a second signal. The microphone in this embodiment of this disclosure may be an analog microphone, or may be a digital microphone. When the microphone is an analog microphone, an analog signal collected by the microphone may be converted into a digital signal before undergoing filtering processing. In this embodiment of this disclosure, descriptions are provided by using an example in which both the first microphone and the second microphone are digital microphones. In this case, both the first signal and the second signal are digital signals.

The processor 304 is configured to perform processing, for example, ANC processing, HT processing, or AH processing, on a downlink audio signal and/or signals collected by the microphones (including the first microphone 301, the second microphone 302, and the third microphone 303). For example, the processor 304 may include a main control unit and a denoising processing unit. The main control unit is configured to generate a control command for performing an operation on the earphone by the user, receive a control command from a terminal device, or the like. The denoising processing unit is configured to perform, according to the control command, ANC processing, HT processing, or AH processing on the downlink audio signal and the signals collected by the microphones (including the first microphone 301, the second microphone 302, and the third microphone 303).

The left earphone and the right earphone each may further include a memory, and the memory is configured to store a program or instructions executed by the processor 304. The processor 304 performs ANC processing, HT processing, or AH processing according to the program or the instructions stored in the memory. The memory may include one or more of the following: a RAM, a flash memory, a read-only memory (ROM), a programmable ROM (PROM), an erasable PROM (EPROM), an electrically EPROM (EEPROM), a register, a hard disk, a removable hard disk, a compact disc (CD) ROM (CD-ROM), or any other form of storage medium well known in the art.

For example, the main control unit may be implemented by one or more of the following: an Advanced reduced instruction set computer (RISC) Machines (ARM) processing chip, a central processing unit (CPU), a system on chip (SoC), a digital signal processor (DSP), or a micro controller unit (MCU). The denoising processing unit may include, for example, a coder-decoder (CODEC) chip or a high-fidelity (HiFi) chip. For example, the denoising processing unit includes a codec chip. A filter, an equalizer (EQ), a dynamic range controller (DRC), a limiter, a gain adjuster (gain), a mixer, and the like are hardened in the codec, and are mainly configured to perform processing on signals, for example, filtering, mixing, and gain adjustment. The denoising processing unit may further include a DSP, and the DSP may be configured to perform processing such as scene detection, voice enhancement, and occlusion effect reduction.

The earphone may further include a wireless communication unit configured to establish a communication connection to a terminal device 100 by using the wireless communication module 160 in the terminal device 100. The wireless communication unit may provide a wireless communication solution that is applied to the earphone and that includes WLAN (such as a WI-FI network), BLUETOOTH (BT), NFC, and IR. The wireless communication unit may be one or more components integrating at least one communication processing module. For example, the wireless communication module 160 may be BLUETOOTH, the wireless communication unit is also BLUETOOTH, and the headset 200 is connected to the terminal device 100 through BLUETOOTH.

Figure 4:
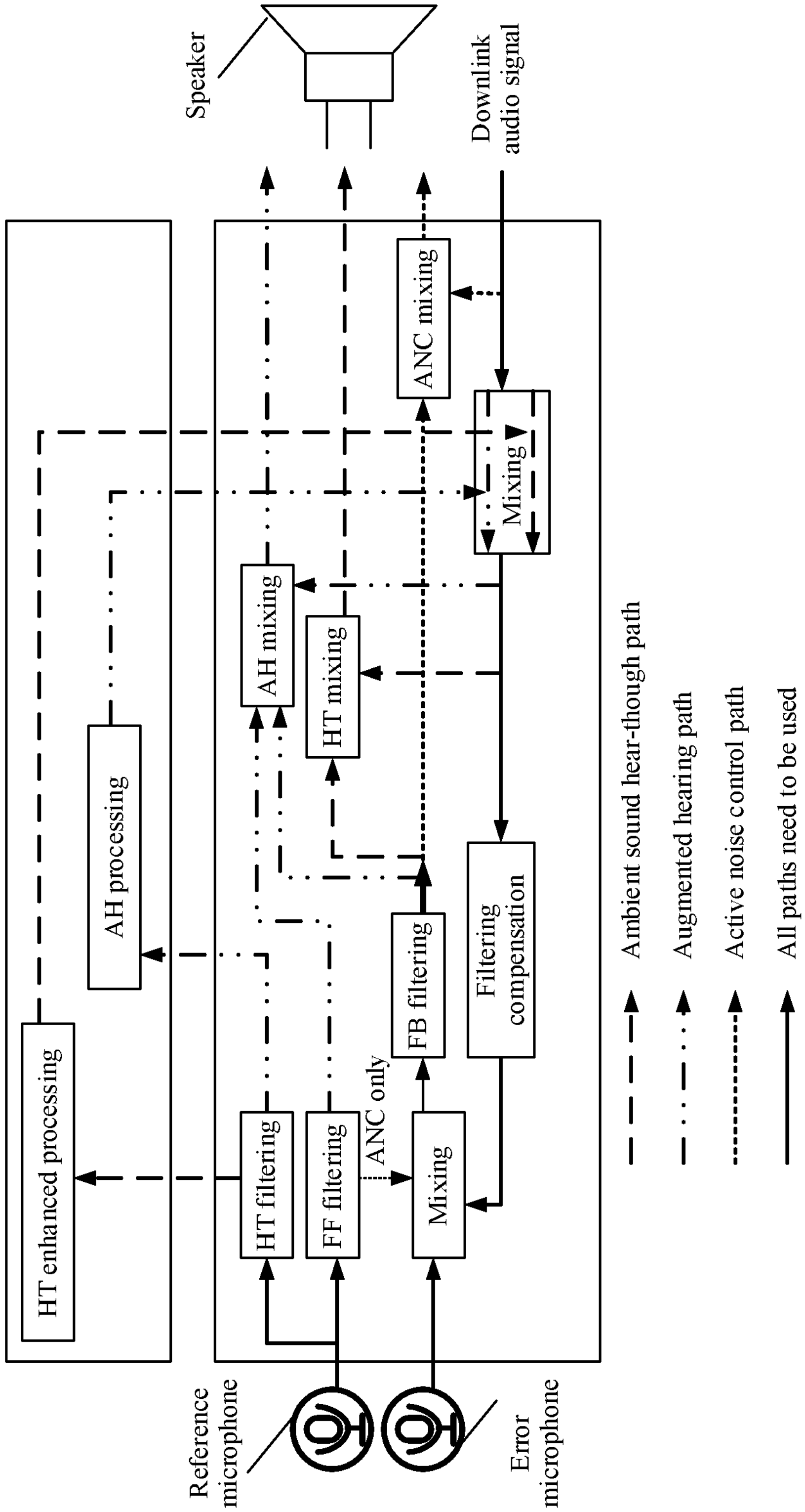
FIG. 4 is a schematic diagram of an AHA channel according to an embodiment of this disclosure.

In a possible example, for three different operating modes, output is performed through three different signal paths: an ANC output path, a hear-through output path, and an augmented hearing output path. For example, different processing manners are used for different output paths, as shown in FIG. 4.

A person skilled in the art should understand that enabling an ANC function means that a signal path for the ANC function is in an activated state, and correspondingly, each functional module on the ANC path is also in an activated state. Enabling an HT function means that a signal path for the HT function is in an activated state, and correspondingly, each functional module on the HT path is also in an activated state. Similarly, when both the ANC function and the HT function of the earphone are in an enabled state, it indicates that the signal path for the ANC function is in an activated state, and the signal path for the HT function is also in an activated state. That is, this may indicate an operating status of the headset, but is not limited to a specific operation or a change of a function control at a moment.

ANC processing of the ANC output path may include but is not limited to performing noise suppression by using an antiphase signal of the first signal collected by the reference microphone and an antiphase signal of the second signal collected by the error microphone. The ANC output path includes the antiphase signal of the first signal and the antiphase signal of the second signal. It should be noted that a phase difference between the first signal and the antiphase signal of the first signal is 180°. The speaker outputs a signal obtained by adding the antiphase signal of the first signal and the antiphase signal of the second signal. In this case, the sound in the current external environment played by the speaker cancels out a sound in the external environment actually heard by the ear, to achieve ANC effect. Therefore, when an ANC mode is used for the headset, perception of the headset user on the sound in the current environment and perception of the ambient sound in the ear canal of the user can be weakened.

Optionally, when there is a downlink audio signal, filtering compensation may be performed on the downlink audio signal. In addition, impact of the downlink audio signal may be removed when an antiphase signal of the ambient sound is obtained.

First filtering processing and third filtering processing may be performed when the antiphase signal of the first signal and the antiphase signal of the second signal are obtained. For example, first filtering processing may be feedforward (FF) filtering processing, and may be implemented by a feedforward filter. Third filtering processing may be feedback (FB) filtering processing, and may be implemented by a feedback filter. Refer to FIG. 4. A parallel processing architecture is used for FF filtering and FB filtering, to enhance noise control effect. An ANC processing procedure is described below in detail. Details are not described herein.

Ambient sound hear-through processing in the hear-through output path may include but is not limited to performing third filtering processing on the first signal collected by the error microphone, to implement a part of ANC functions, and performing second filtering processing and HT enhancement processing on the signal collected by the reference microphone. For example, second filtering processing may be HT filtering processing, and may be implemented by a hear-through filter. The audio signal played by the speaker is obtained based on the first signal and the second signal. In this way, compared with the sound in the external environment heard when HT processing is not performed, the sound in the external environment that can be heard by the user by using the earphone after the audio signal is played by the speaker has higher intensity and better effect. Therefore, when an HT mode is used for the earphone, perception of the user on intensity of the sound in the environment in which the user is currently located can be enhanced. An HT processing procedure is described below in detail. Details are not described herein.

Ambient sound hear-through processing in the augmented hearing output path may include but is not limited to implementing a part of ANC functions by using the signal collected by the error microphone, performing first filtering processing and augmented hearing processing on the signal collected by the reference microphone, to enhance an event sound in the sound in the environment in which the user is located, and performing second filtering processing on the signal collected by the reference microphone. The output signal of the speaker is obtained based on a signal that is obtained by mixing an event signal in the first signal and the antiphase signal of the second signal. It should be noted that a phase difference between the second signal and the antiphase signal of the second signal is 180°. The speaker outputs a signal obtained by adding the antiphase signal of the second signal, the antiphase signal of the first signal, the event signal in the first signal, so that the signal output by the speaker cancels out the sound in the environment actually heard by the ear, to achieve ANC effect. In addition, the speaker outputs an event sound in the environment, so that the user can clearly hear a preset signal required by the user in the environment. Therefore, when the AH mode is used for the earphone, perception of the headset user on the event sound included in the sound in the current external environment can be enhanced. An AH processing procedure is described below in detail. Details are not described herein.

It should be understood that the downlink audio signal, the first signal, and the second signal may be a frame of signal or a signal in a period of time. For example, when each of the downlink audio signal, the first signal, and the second signal is a frame of signal, the downlink audio signal, the first signal, and the second signal respectively belong to three signal streams, and a signal frame of the downlink audio signal, a signal frame of the first signal, and a signal frame of the second signal overlap in a same time period or in time. In this embodiment of this disclosure, when function processing (for example, ANC, HT, or AH) is performed, function processing is continuously performed on a signal stream in which the downlink audio signal is located, a signal stream in which the first signal is located, and a signal stream in which the second signal is located.

First, the following describes in detail a processing procedure of an ANC path.

Figure 5A:
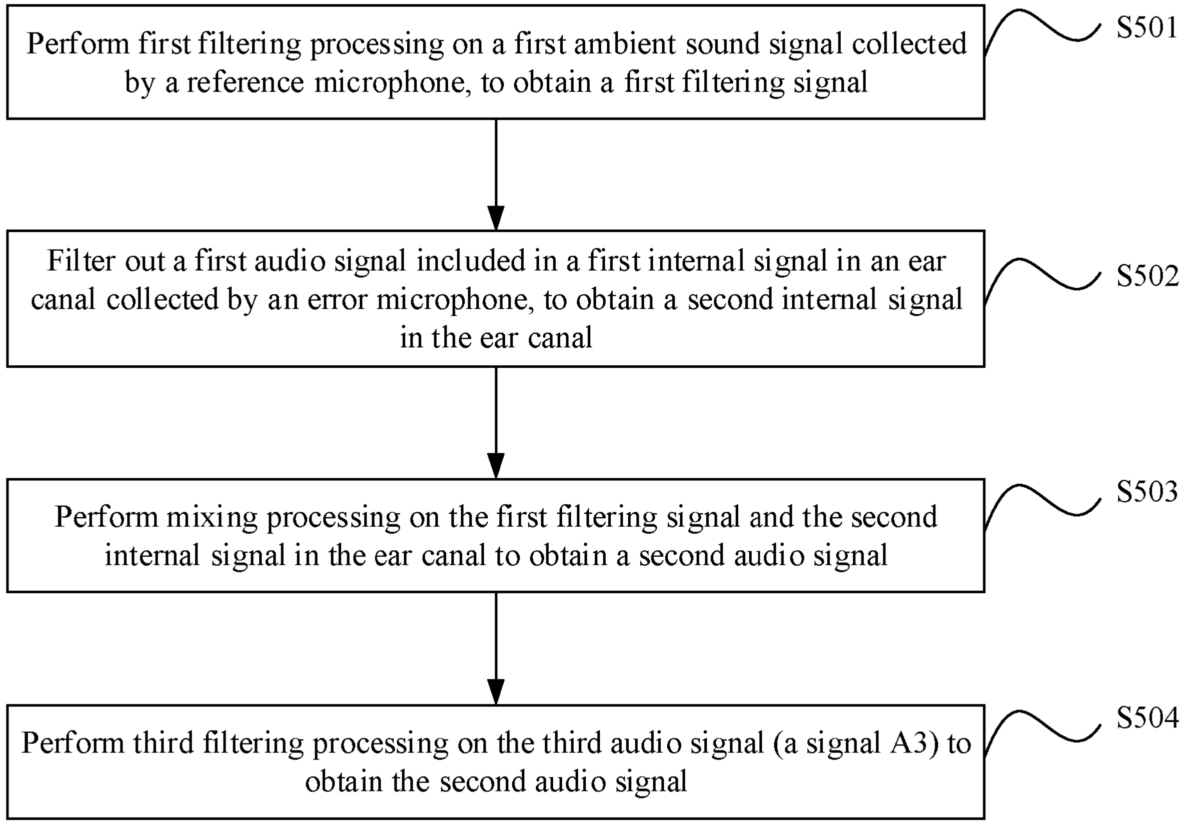
FIG. 5A is a flowchart of ANC processing according to an embodiment of this disclosure.
Figure 5B:
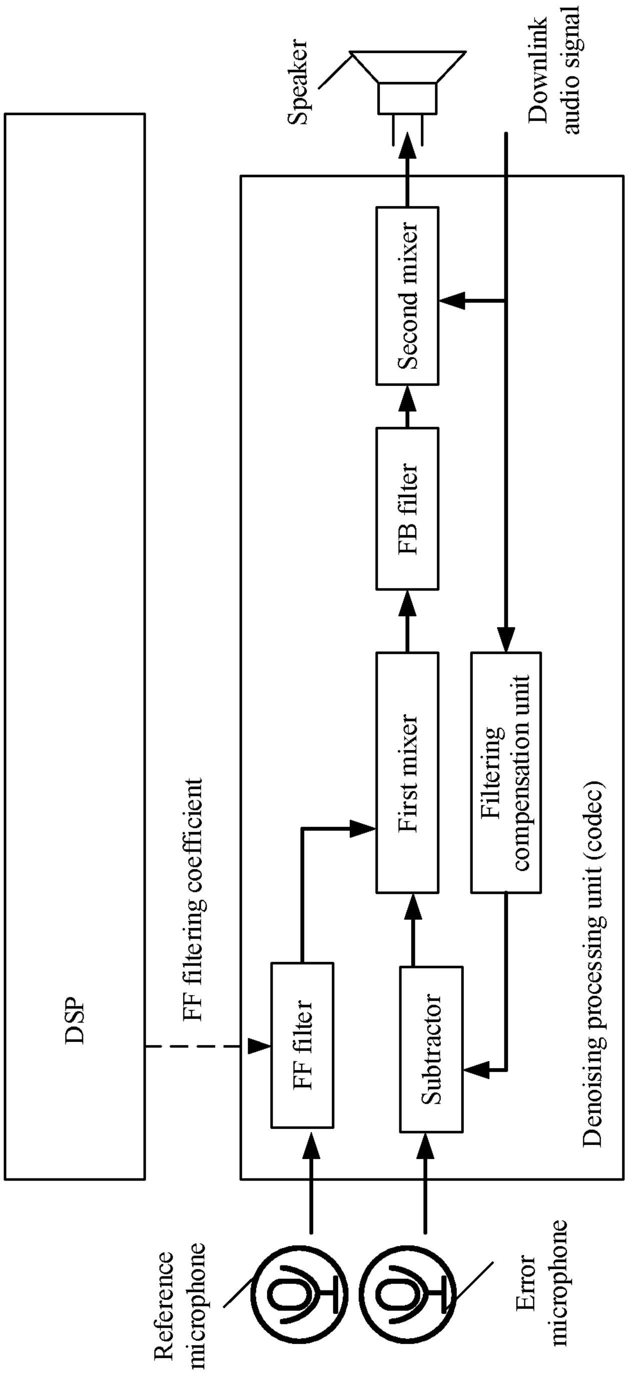
FIG. 5B is a schematic flowchart of ANC processing according to an embodiment of this disclosure.

FIG. 5A and FIG. 5B are schematic flowcharts of ANC processing. A downlink audio signal sent by a terminal device 100 to a headset 200 may also be referred to as a first audio signal in the following descriptions. The first audio signal may be a call signal, a music signal, or the like. Descriptions are provided by using an example in which a signal collected by a reference microphone is referred to as a first signal, and a signal collected by an error microphone is referred to as a second signal. An ANC mode is used for the headset.

It should be noted that downlink audio signals sent by the terminal device 100 to the left earphone and the right earphone of the headset 200 may be a same signal, or may be different signals. For example, stereo effect is used for the terminal device, and the terminal device 100 sends different downlink audio signals to the headset 200, to implement the stereo effect. Certainly, the terminal device may further send a same downlink audio signal to the left earphone and the right earphone, and stereo processing is performed on the left earphone and the right earphone, to achieve the stereo effect. The left earphone or the right earphone may perform, based on control of a user, processing shown in FIG. 5A or FIG. 5B.

- S501: Perform first filtering processing on the first signal collected by the reference microphone, to obtain a first filtering signal. In FIG. 5B, the first filtering signal is a signal A1.
- S502: Filter out the first audio signal included in the second signal collected by the error microphone, to obtain a first filtered signal. In FIG. 5B, the first filtered signal is a signal A2.
- S503: Perform mixing processing on the first filtering signal and the first filtered signal to obtain a third audio signal. In FIG. 5B, the third audio signal is a signal A3, that is, mixing processing is performed on the signal A1 and the signal A2 to obtain the signal A3.
- S504: Perform third filtering processing on the third audio signal (the signal A3) to obtain a fourth audio signal. In FIG. 5B, the fourth audio signal is a signal A4.
- S505: Perform mixing processing on the fourth audio signal and the first audio signal to obtain a second audio signal. A speaker is responsible for playing the second audio signal. In FIG. 5B, the second audio signal is A5.

It should be noted that, when there is no downlink audio signal, that is, the terminal device does not send the first audio signal to the headset, and when an ANC mode is used for the headset, a signal output by the speaker is the fourth audio signal that does not undergo mixing processing. In this case, neither S502 nor S505 needs to be performed.

For example, in FIG. 5B, first filtering processing is FF filtering processing and is implemented by an FF filter, and third filtering processing is FB filtering processing and is implemented by an FB filter. The reference microphone in the headset 200 picks up the first signal, and inputs the first signal to the FF filter for FF filtering processing to obtain the signal A1. The error microphone picks up the second signal, and inputs the second signal to a subtractor. The downlink audio signal undergoes filtering compensation and then is also input to the subtractor. The subtractor removes the downlink audio signal that has undergone filtering compensation and that is included in the second signal, to eliminate impact of the downlink audio signal to obtain the signal A2. The signal A3 is obtained by performing mixing processing on the signal A1 and the signal A2 by using the mixer. The signal A4 is input to the FB filter for FB filtering processing to obtain the signal A4. The signal A5 is obtained by mixing the signal A4 and the downlink audio signal, and the signal A5 is input to the speaker for playing.

In a possible implementation, good or bad ANC effect may be determined by ANC processing intensity. The ANC processing intensity depends on an FF filtering coefficient used for FF filtering and/or an FB filtering coefficient used for FB filtering.

In a manner, the FF filtering coefficient may be a default FF filtering coefficient in an ANC mode. In another manner, the FF filtering coefficient may be an FF filtering coefficient used when an ANC mode is selected last time. In still another manner, the headset determines, based on an identified scene, an FF filtering coefficient used in an ANC mode. In yet another manner, the user indicates, to the headset by using a UI control provided by the terminal device, an FF filtering coefficient used in an ANC mode. For example, the user selects processing intensity in the ANC mode as target processing intensity by using the UI control provided by the terminal device. Different processing intensity corresponds to different FF filtering coefficients.

In a manner, the FB filtering coefficient may be a default FB filtering coefficient in the ANC mode. In another manner, the FB filtering coefficient may be an FB filtering coefficient used when an ANC mode is selected last time. In still another manner, the headset determines a used FB filtering coefficient based on an identified scene. In yet another manner, the user indicates, to the headset by using a UI control provided by the terminal device, an FB filtering coefficient used in an ANC mode. For example, the user selects processing intensity in the ANC mode as target processing intensity by using the UI control provided by the terminal device. Different processing intensity corresponds to different FB filtering coefficients.

The FF filtering coefficient and the FB filtering coefficient in the ANC mode may be obtained in any combination of the foregoing provided manners. In an example, the FF filtering coefficient may be the fault filtering coefficient in the ANC mode, and the headset determines the used FB filtering coefficient based on the identified scene. In still another example, the FB filtering coefficient is the default filtering coefficient in the ANC mode, and the FF filtering coefficient is determined by the user by using the UI control provided by the terminal device. In yet another example, the FB filtering coefficient is the default filtering coefficient in the ANC mode, and the user chooses to indicate the FF filtering coefficient to the headset by using the UI control provided by the terminal device. Determining of the processing intensity in the ANC mode is described below in detail by using a specific example. Details are not described herein.

Next, a processing procedure of a hear-through path is described below in detail.

Figure 6A:
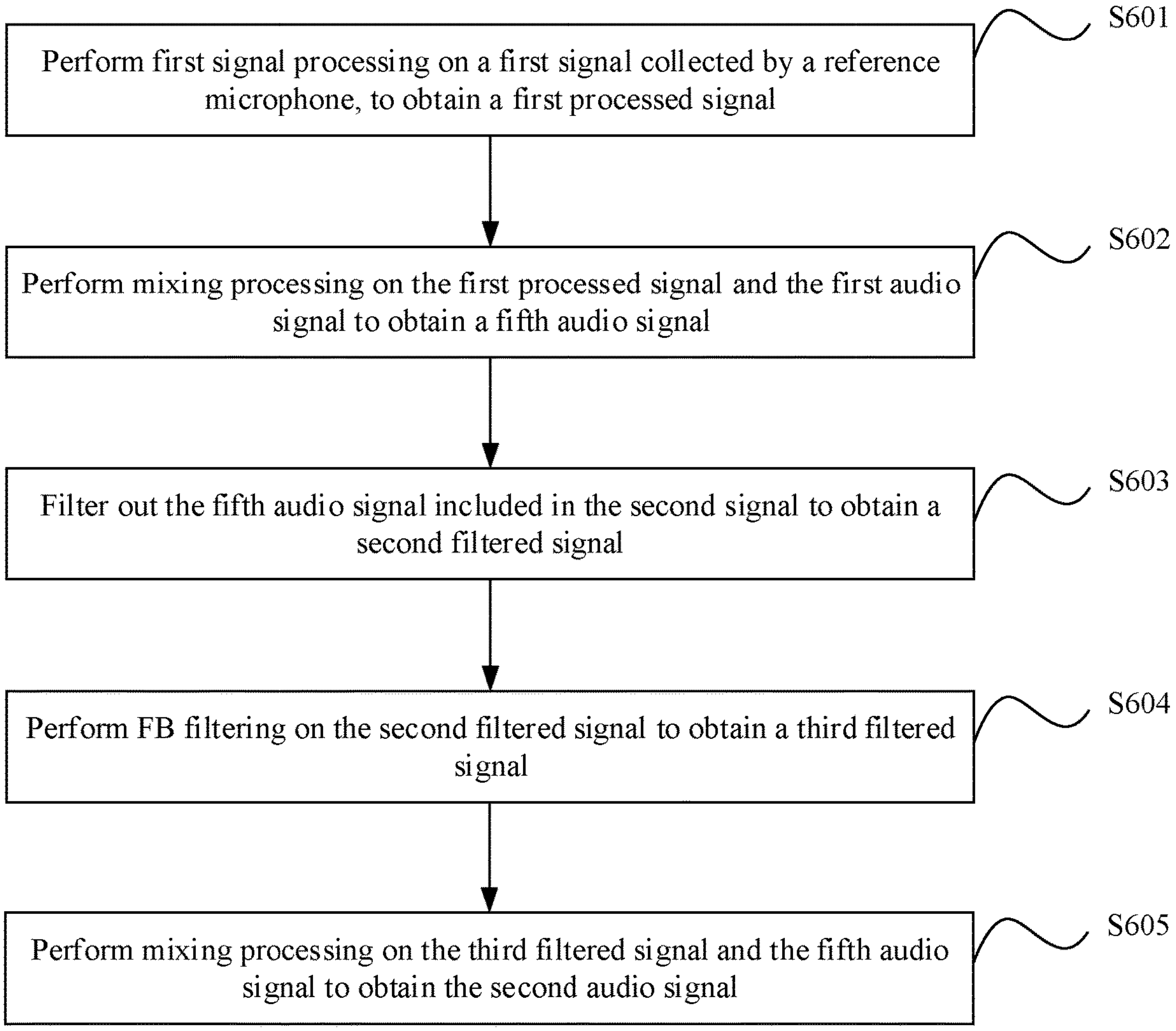
FIG. 6A is a flowchart of HT processing according to an embodiment of this disclosure.
Figure 6B:
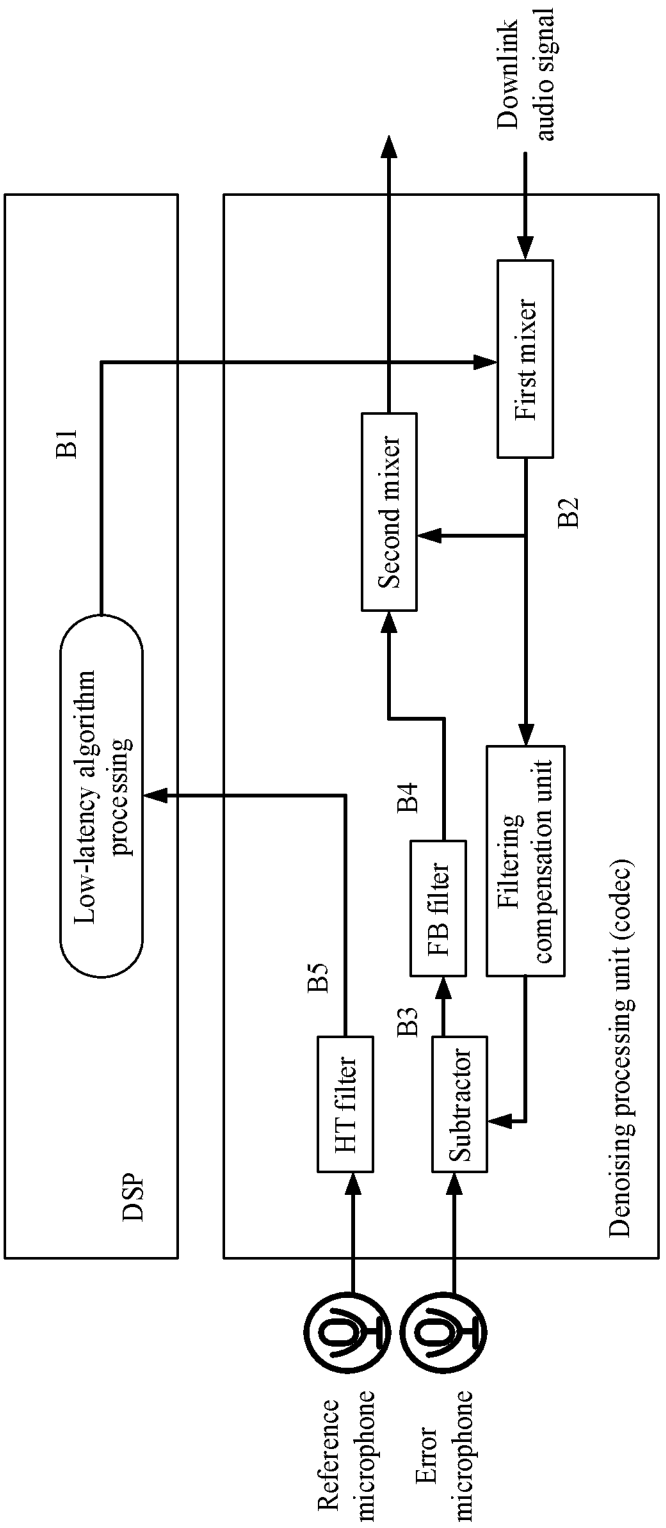
FIG. 6B is a schematic flowchart of HT processing according to an embodiment of this disclosure.
Figure 6C:
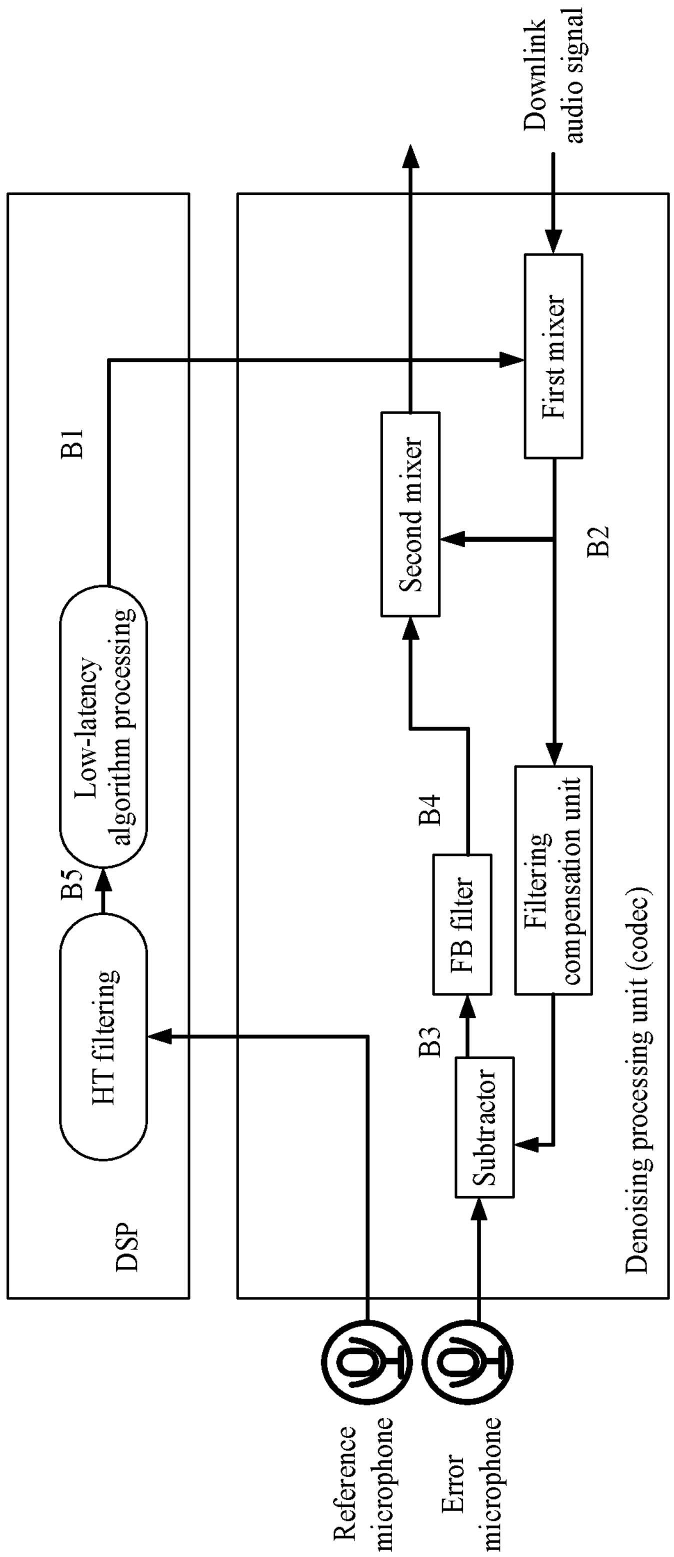
FIG. 6C is another schematic flowchart of HT processing according to an embodiment of this disclosure.

FIG. 6A, FIG. 6B, and FIG. 6C are schematic flowcharts of ambient sound hear-through processing. For example, a downlink audio signal sent by a terminal device 100 to a headset 200 is referred to as a first audio signal in the following descriptions. The first audio signal may be a call signal, a music signal, or the like. Descriptions are provided by using an example in which a signal collected by a reference microphone is referred to as a first signal, and a signal collected by an error microphone is referred to as a second signal. A left earphone or a right earphone in the headset 200 may perform processing shown in FIG. 6A, FIG. 6B, or FIG. 6C based on control of a user.

S601: Perform first signal processing on the first signal collected by the reference microphone, to obtain a first processed signal. In FIG. 6B and FIG. 6C, the first processed signal is referred to as a signal B1. First signal processing includes HT filtering.

S602: Perform mixing processing on the first processed signal and the first audio signal to obtain a fifth audio signal. In FIG. 6B and FIG. 6C, the fifth audio signal is referred to as a signal B2.

That is, mixing processing is performed on the signal B1 and the downlink audio signal (that is, the first audio signal) to obtain the signal B2.

S603: Filter out the fifth audio signal included in the second signal to obtain a second filtered signal. In FIG. 6B and FIG. 6C, the second filtered signal is referred to as a signal B3. That is, the signal B2 included in the second ambient signal is filtered out to obtain the signal B3.

S604: Perform FB filtering on the second filtered signal to obtain a third filtered signal. In FIG. 6B and FIG. 6C, the third filtered signal is referred to as a signal B4. In other words, FB filtering is performed on the signal B3 to obtain the signal B4.

S605: Perform mixing processing on the third filtered signal and the fifth audio signal to obtain the second audio signal. That is, mixing processing is performed on the signal B4 and the signal B2 to obtain the second audio signal.

In an example, first signal processing may be performed in the following manners on the first signal collected by the reference microphone, to obtain the first processed signal: performing HT filtering processing on the first signal to obtain a second filtering signal, where in FIG. 6B and FIG. 6C, the second filtering signal is referred to as a signal B5, and performing second signal processing on the second filtering signal to obtain the second processed signal, where second signal processing may also be referred to as low-latency algorithm processing, and low-latency algorithm processing includes one or more of the following: occlusion effect reduction processing, noise floor reduction processing, wind noise reduction processing, gain adjustment processing, or frequency response adjustment processing.

In a possible manner, HT filtering processing may be implemented by a denoising processing unit, as shown in FIG. 6B. For example, the denoising processing unit of the headset includes a codec. The codec includes an HT filter, an FB filter, a subtractor, a first mixer, a second mixer, and a filtering compensation unit. For example, in FIG. 6B, the denoising processing unit further includes a DSP. The DSP may be configured to perform low-latency algorithm processing. The reference microphone in the headset 200 picks up the first signal, and inputs the first signal to the HT filter for HT filtering processing to obtain the signal B5. The signal B5 is input to the DSP, and the DSP performs low-latency algorithm processing on the signal B5 to obtain the signal B1. The signal B1 is input to the first mixer, and the first mixer performs mixing processing on the downlink audio signal and the signal B1 to obtain the signal B2. The signal B2 that undergoes filtering compensation processing performed by the filtering compensation unit is input to the subtractor. The subtractor is configured to filter out the signal B2 that has undergone filtering compensation processing and that is included in the second ambient signal picked up by the error microphone, to obtain the signal B3. The signal B3 is input to the FB filter, and the FB filter performs FB filtering processing on the signal B3 to obtain the signal B4. The signal B4 is input to the second mixer. In addition, an input for the second mixer further includes the signal B2. The second mixer performs mixing processing on the signal B2 and the signal B4 to obtain the second audio signal, and the second audio signal is input to the speaker for playing.

In another possible manner, HT filtering processing may be implemented by a DSP, as shown in FIG. 6C. The DSP may be configured to perform HT filtering processing and low-latency algorithm processing. A denoising processing unit in the headset includes an FB filter, a subtractor, a first mixer, a second mixer, and a filtering compensation unit. The reference microphone in the headset picks up the first signal, and inputs the first signal to the DSP. The DSP performs HT filtering processing and low-latency algorithm processing on the first signal to obtain the signal B1. The signal B1 is input to the first mixer, and the first mixer performs mixing processing on the downlink audio signal and the signal B1 to obtain the signal B2. The signal B2 that undergoes filtering compensation processing performed by the filtering compensation unit is input to the subtractor. The subtractor is configured to filter out the signal B2 included in the second signal picked up by the error microphone, to obtain the signal B3. The signal B3 is input to the FB filter, and the FB filter performs FB filtering processing on the signal B3 to obtain the signal B4. The signal B4 is input to the second mixer. In addition, an input for the second mixer further includes the signal B2. The second mixer performs mixing processing on the signal B2 and the signal B4 to obtain the second audio signal, and the second audio signal is input to the speaker for playing.

In an example, low-latency algorithm processing includes occlusion effect reduction processing. An occlusion effect generation principle is described first before an occlusion effect reduction processing method is described. The voice of the headset wearer is perceived on two routes. On a route 1, the voice is transmitted through bone conduction to a periosteum and then is perceived, where the signal includes only a low-frequency signal. On a route 2, the voice is perceived from the external air to the periosteum, where the signal includes a low-frequency signal and a medium- and high-frequency signal. After a low-frequency signal and a medium- and high-frequency signal are added, a chaotic low-frequency signal is caused in the ears because the low-frequency signal has excessively high intensity and cannot be emitted when the headset is worn. As a result, occlusion effect is generated.

Occlusion effect reduction processing may be further performed in the following manner on the signal B5 obtained through HT filtering processing.

Figure 7:
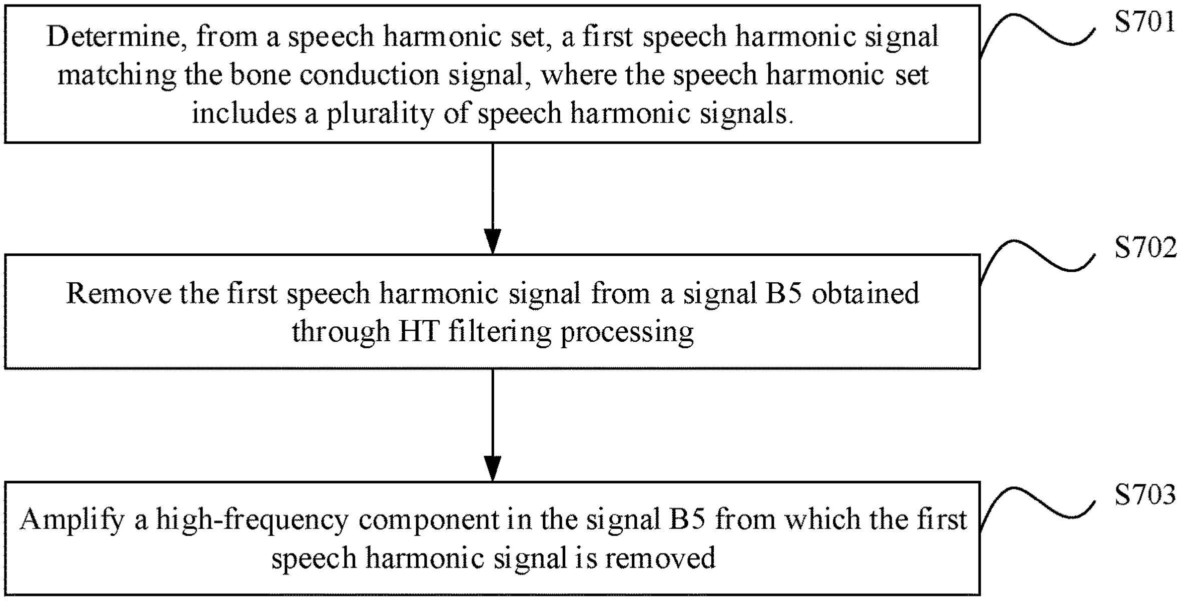
FIG. 7 is a schematic flowchart of occlusion effect reduction processing according to an embodiment of this disclosure.

For manner 1, refer to FIG. 7.

- S701: Determine, from a speech harmonic set, a first speech harmonic signal matching a bone-conducted signal, where the speech harmonic set includes a plurality of speech harmonic signals. The plurality of speech harmonic signals included in the speech harmonic set correspond to different frequencies. Further, a frequency of the bone-conducted signal may be determined, and the first speech harmonic signal is determined from the speech harmonic set based on the frequency of the bone-conducted signal. The speech harmonic signal may also be referred to as a speech harmonic component.
- S702: Remove the first speech harmonic signal from the signal B5 obtained through HT filtering processing. For example, the first speech harmonic signal is removed from the signal B5 obtained through HT filtering processing, to obtain a signal C1. A voice of a person collected by a bone conduction sensor is generally a low-frequency harmonic component. Therefore, in S702, the low-frequency harmonic component is removed from the signal B5, to obtain the signal C1 that does not include the low-frequency harmonic component.
- S703: Amplify a high-frequency component in the signal B5 from which the first speech harmonic signal is removed, that is, amplify the high-frequency component of the signal C1.

The first speech harmonic signal matching the bone-conducted signal can be determined from the speech harmonic set. In other words, the bone conduction sensor can detect the bone-conducted signal, that is, the headset wearer is currently making a voice, for example, speaking or singing. A signal obtained by improving the high-frequency component based on the signal C1 includes only a medium- and high-frequency component, so that a signal heard by the headset wearer has no occlusion effect.

The speech harmonic set may be pre-stored in the headset. In an example, the speech harmonic set may be obtained in an offline manner or in an online manner.

When the speech harmonic set is obtained in an offline manner, bone-conducted signals of a plurality of persons may be collected by the bone conduction sensor, and the following processing is performed on a bone-conducted signal of each person in the bone-conducted signals of the plurality of persons. For example, fast Fourier transform (FFT) is performed on a first bone-conducted signal to obtain a frequency-domain signal, a fundamental-frequency signal in the frequency-domain signal is determined in a manner of finding a fundamental frequency by using a pilot, and a harmonic component of the bone-conducted signal is determined based on the fundamental-frequency signal, to obtain a mapping relationship between a frequency of a bone-conducted signal and a harmonic component and obtain the speech harmonic set. The speech harmonic set may include a mapping relationship between different frequencies and different harmonic components.

When the speech harmonic set is obtained in an online manner, a second bone-conducted signal may be collected within specified duration by using the bone conduction sensor in the headset. Within the specified duration, a plurality of persons may use the headset, or only one person, that is, the user, may use the headset. The following processing is performed on the second bone-conducted signal.

FFT is performed on the second bone-conducted signal to obtain a frequency-domain signal, and a fundamental-frequency signal in the frequency-domain signal is determined in a manner of finding a fundamental frequency by using a pilot. If a plurality of persons uses the headset within the specified duration, a plurality of fundamental-frequency signals respectively corresponding to different time periods within the specified duration may be determined. A plurality of harmonic components of the bone-conducted signal may be determined based on the plurality of fundamental frequency signals, to obtain a mapping relationship between a frequency and a harmonic component and obtain the speech harmonic set. The speech harmonic set may include a mapping relationship between different frequencies and different harmonic components.

Manner 2: Adaptive filtering processing may be performed on the signal B5 obtained through HT filtering processing, to remove a low-frequency component from the signal B5 to obtain a signal C1, that is, to remove a voice signal of the headset wearer from the signal B5. A high-frequency component in a third filtering signal from which the low-frequency component is removed is amplified, that is, the high-frequency component in the signal C1 is amplified. A signal obtained by improving the high-frequency component based on the signal C1 includes only a medium- and high-frequency component, so that a signal heard by the headset wearer has no occlusion effect.

In a possible implementation, good or bad HT effect may be determined by HT processing intensity. The HT processing intensity depends on an HT filtering coefficient used for HT filtering and/or an FB filtering coefficient used for FB filtering.

In a manner, the HT filtering coefficient may be a default HT filtering coefficient in an HT mode. In another manner, the HT filtering coefficient may be an HT filtering coefficient used when an HT mode is selected last time. In still another manner, the headset determines, based on an identified scene, an HT filtering coefficient used in an HT mode. In yet another manner, the user indicates, to the headset by using a UI control provided by the terminal device, an HT filtering coefficient used in an HT mode. For example, the user selects processing intensity in the HT mode as target processing intensity by using the UI control provided by the terminal device. Different processing intensity corresponds to different HT filtering coefficients. In a manner, the FB filtering coefficient may be a default FB filtering coefficient in an HT mode. In another manner, the FB filtering coefficient may be an FB filtering coefficient used when an HT mode is selected last time. In still another manner, the headset determines a used FB filtering coefficient based on an identified scene. In yet another manner, the user indicates, to the headset by using a UI control provided by the terminal device, an HT filtering coefficient used in an HT mode. For example, the user selects processing intensity in the HT mode as target processing intensity by using the UI control provided by the terminal device. Different processing intensity corresponds to different FB filtering coefficients.

The HT filtering coefficient and the FB filtering coefficient in the HT mode may be obtained in any combination of the foregoing provided manners.

Then, the following describes in detail a processing procedure of an augmented hearing path.

Figure 8A:
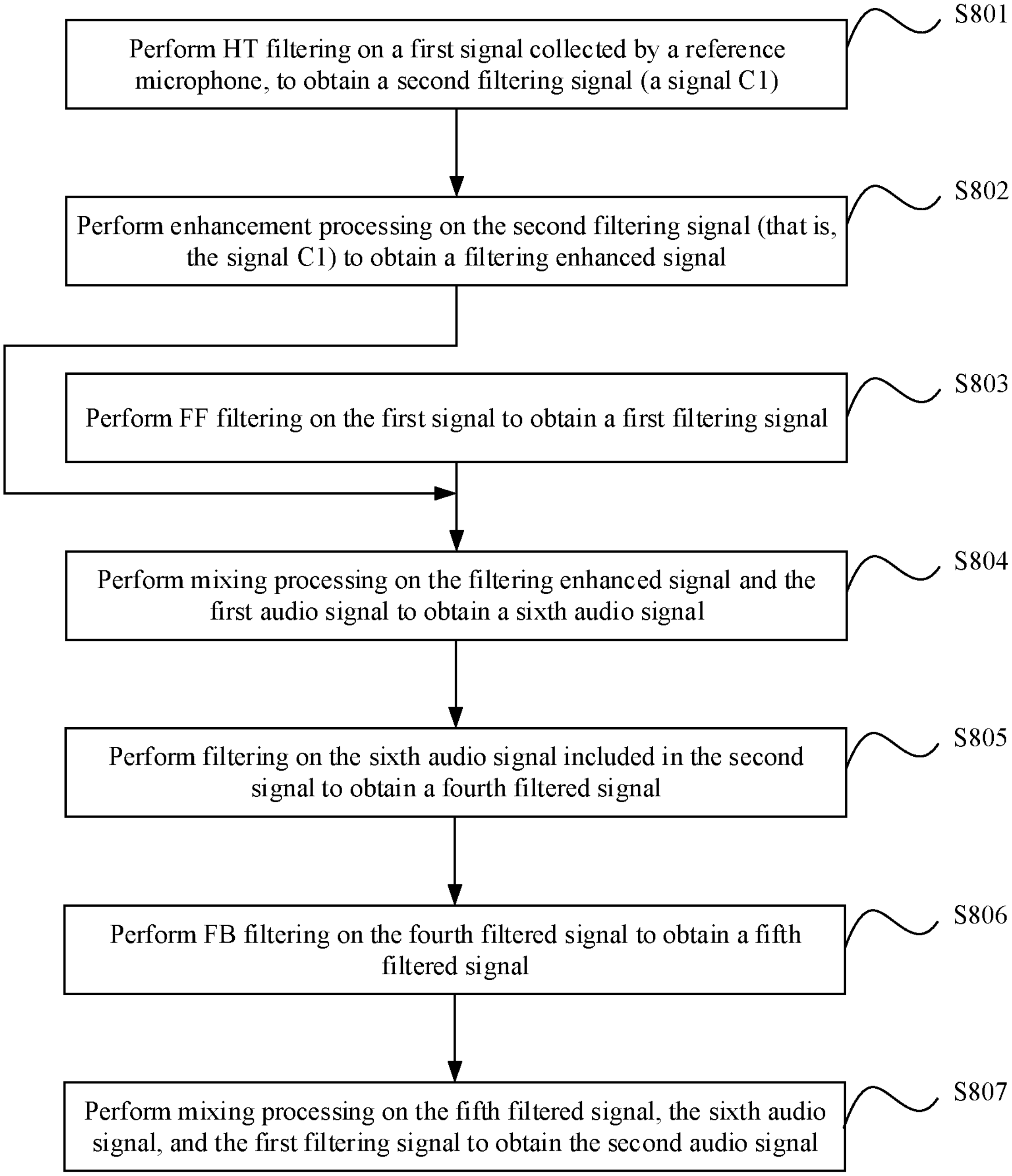
FIG. 8A is a flowchart of AH processing according to an embodiment of this disclosure.
Figure 8B:
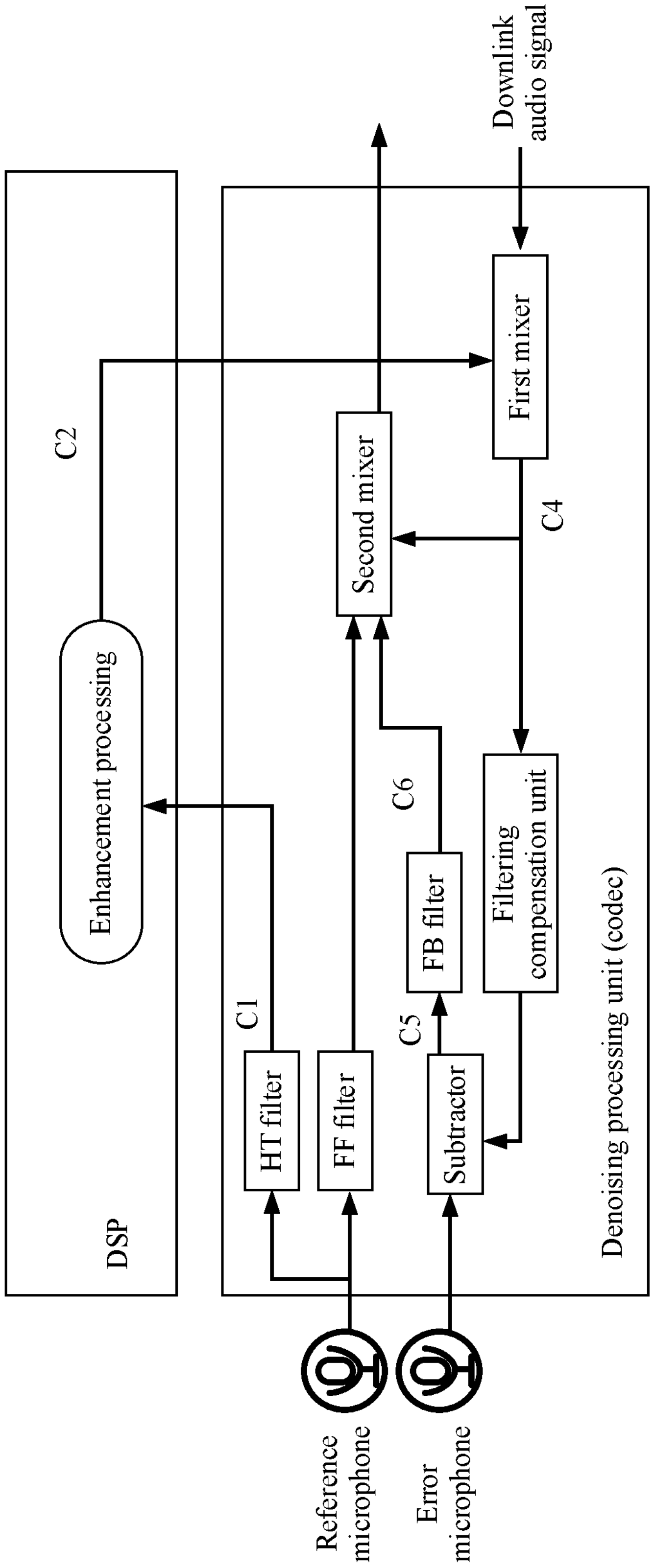
FIG. 8B is a schematic flowchart of AH processing according to an embodiment of this disclosure.
Figure 8C:
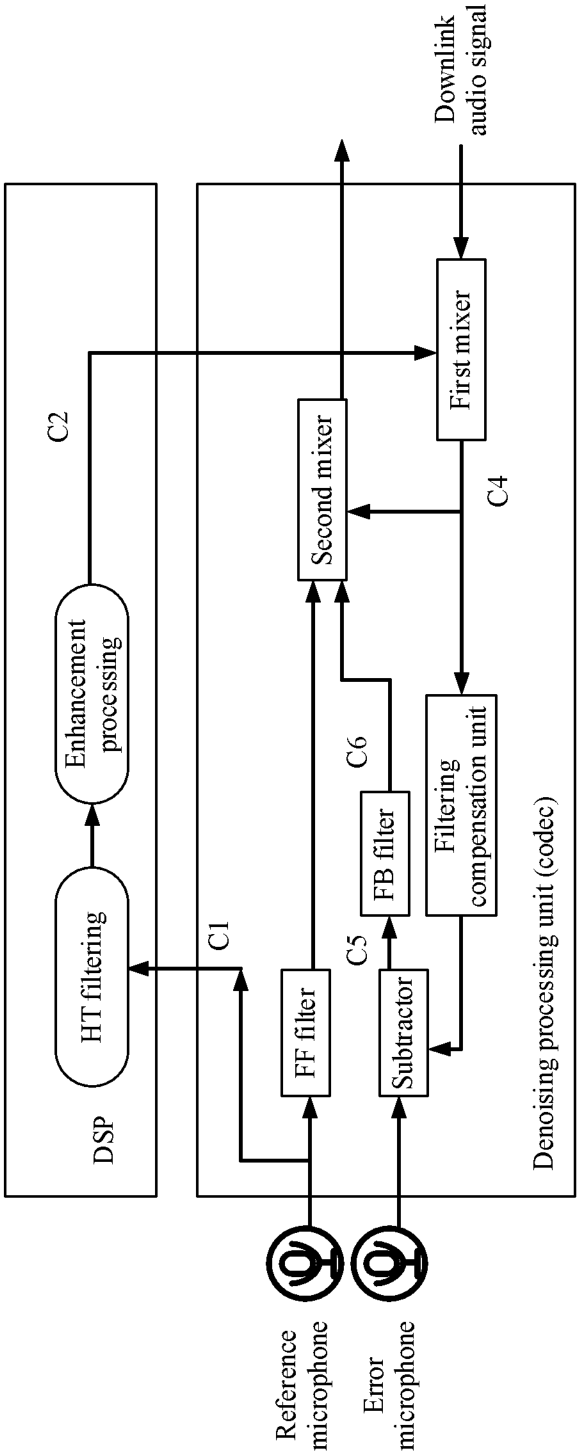
FIG. 8C is another schematic flowchart of AH processing according to an embodiment of this disclosure.

FIG. 8A, FIG. 8B, and FIG. 8C are schematic flowcharts of augmented hearing processing. For example, a downlink audio signal sent by a terminal device 100 to a headset 200 is referred to as a first audio signal in the following descriptions. The first audio signal may be a call signal, a music signal, a prompt tone, or the like. Descriptions are provided by using an example in which a signal collected by a reference microphone is referred to as a first signal, and a signal collected by an error microphone is referred to as a second signal. A left earphone or a right earphone in the headset 200 may perform processing in FIG. 8A, FIG. 8B, or FIG. 8C based on control of a user.

S801: Perform HT filtering on the first signal collected by the reference microphone, to obtain a second filtering signal (a signal C1). In FIG. 8B and FIG. 8C, the second filtering signal is referred to as the signal C1.

S802: Perform enhancement processing on the second filtering signal (that is, the signal C1) to obtain a filtering enhanced signal. In FIG. 8B and FIG. 8C, the filtering enhanced signal is a signal C2.

S803: Perform FF filtering on the first signal to obtain a first filtering signal. In FIG. 8B and FIG. 8C, the first filtering signal is a signal C3.

S804: Perform mixing processing on the filtering enhanced signal and the first audio signal to obtain a sixth audio signal. In FIG. 8B and FIG. 8C, the sixth audio signal is a signal C4. That is, in step S804, mixing processing is performed on the signal C2 and the downlink audio signal to obtain the signal C4.

S805: Perform filtering on the sixth audio signal included in the second signal to obtain a fourth filtered signal. In FIG. 8B and FIG. 8C, the fourth filtered signal is a signal C5. That is, in step S805, the signal C4 included in a second ambient signal is filtered out to obtain the signal C5.

In an example, when step S805 is performed, filtering compensation processing may be first performed on the signal C4 to obtain a compensated signal, and then the compensated signal included in the second signal is filtered out to obtain C5.

S806: Perform FB filtering on the fourth filtered signal to obtain a fifth filtered signal.

In FIG. 8B and FIG. 8C, the fourth filtered signal is a signal C6. That is, in step S806, FB filtering is performed on the signal C5 to obtain the signal C6.

S807: Perform mixing processing on the fifth filtered signal, the sixth audio signal, and the first filtering signal to obtain the second audio signal. That is, in step S806, mixing processing is performed on the signal C6, the signal C4, and the signal C3 to obtain the second audio signal.

In a possible implementation, enhancement processing may be performed on the second filtering signal (that is, the signal C1) in the following Manner 1 or Manner 2 to obtain the filtering enhanced signal (the signal C2).

Figure 9:
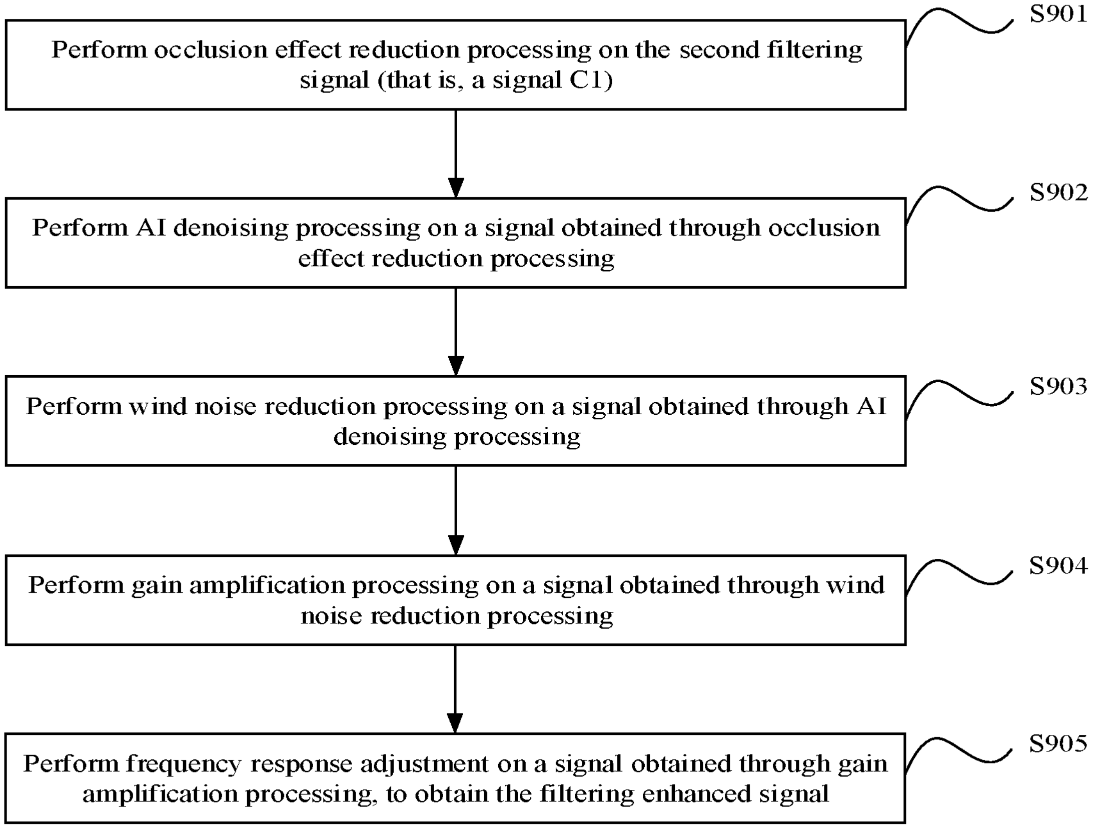
FIG. 9 is a schematic flowchart of denoising processing according to an embodiment of this disclosure.

For manner 1, refer to FIG. 9.

S901: Perform occlusion effect reduction processing on the second filtering signal (that is, the signal C1).

A manner of performing occlusion effect reduction processing on the signal C1 may be the same as a manner of performing occlusion effect reduction processing on the signal B5. For details, refer to manner 1 and manner 2 in scene 2. Details are not described herein again.

Then, denoising processing is performed on a signal obtained through occlusion effect reduction processing. Denoising processing includes artificial intelligence (AI) denoising processing and/or wind noise reduction processing. FIG. 9 shows an example in which denoising processing includes AI denoising processing and wind noise reduction processing.

S902: Perform AI denoising processing on the signal obtained through occlusion effect reduction processing.

S903: Perform wind noise reduction processing on a signal obtained through AI denoising processing.

S904: Perform gain amplification processing on a signal obtained through wind noise reduction processing.

S905: Perform frequency response adjustment on a signal obtained through gain amplification processing, to obtain the filtering enhanced signal.

Figure 10:
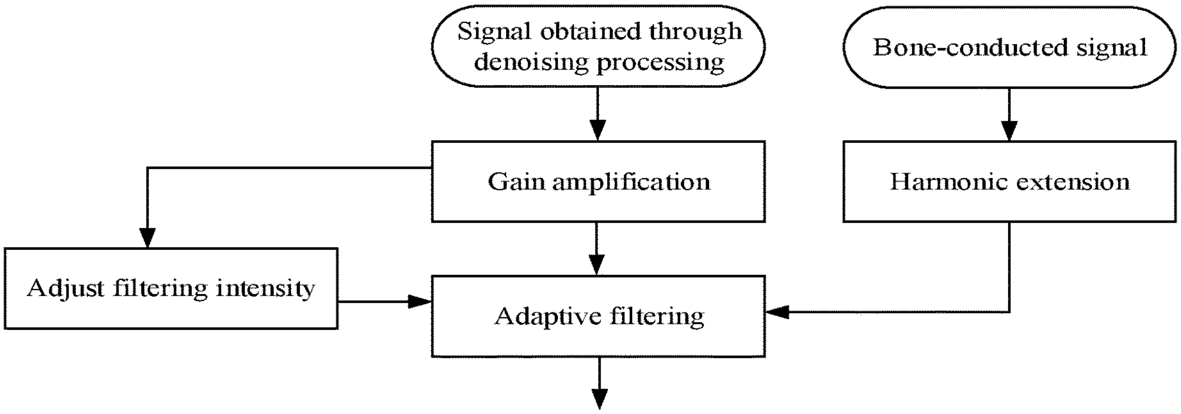
FIG. 10 is a schematic flowchart of gain amplification processing according to an embodiment of this disclosure.

A feasible manner of performing gain amplification processing on the signal obtained through wind noise processing in S904 is to directly amplify the signal obtained through wind noise processing. In the manner of directly amplifying the signal, a voice of the wearer is also amplified while an external signal is amplified. This embodiment of this disclosure provides a gain amplification processing manner in which only an external signal is amplified, but a voice signal of the wearer is not amplified. For example, refer to FIG. 10. Gain amplification processing may be performed on the signal obtained through denoising processing in the following manner.

The voice signal of the wearer is transmitted to a periosteum through bone conduction, and the voice signal is concentrated at a low frequency and is denoted as a bone-conducted signal D1. The bone-conducted signal D1 is collected by a bone conduction sensor.

1: Harmonic extension is performed on the bone-conducted signal D1 to obtain a harmonic extended signal. For example, the harmonic extended signal is referred to as D2. For example, harmonic extension may be performed by using a harmonic enhancement method or by using a method in which a harmonic wave of the bone-conducted signal D1 is directly spread upward.

2: Amplification processing is performed by using a first gain coefficient (gain) on a signal obtained through denoising processing. For ease of description, the signal obtained through denoising processing is referred to as a signal D3. Amplification processing is performed by using the first gain coefficient on the signal D3, to obtain a signal D4. Amplification processing herein may be directly amplifying the signal.

3: A harmonic extended signal included in the signal obtained through amplification processing is filtered out by using a first filtering coefficient, to obtain a signal D5. D2 included in the signal D4 is filtered out in an adaptive filtering manner by using the first filtering coefficient. In this case, the signal D5 is a signal of which the voice of the wearer has been filtered out. The first filtering coefficient is determined based on the first gain coefficient. Adaptive filtering intensity is adjusted by using the first gain coefficient gain, which may also be referred to as the first filtering coefficient. That is, a quantity of decibels (dBs) in which the signal is amplified by using the first gain coefficient is the same as that of dBs filtered out through adaptive filtering, so that the voice signal of the wearer can be balanced, and is not amplified or reduced.

Figure 11:
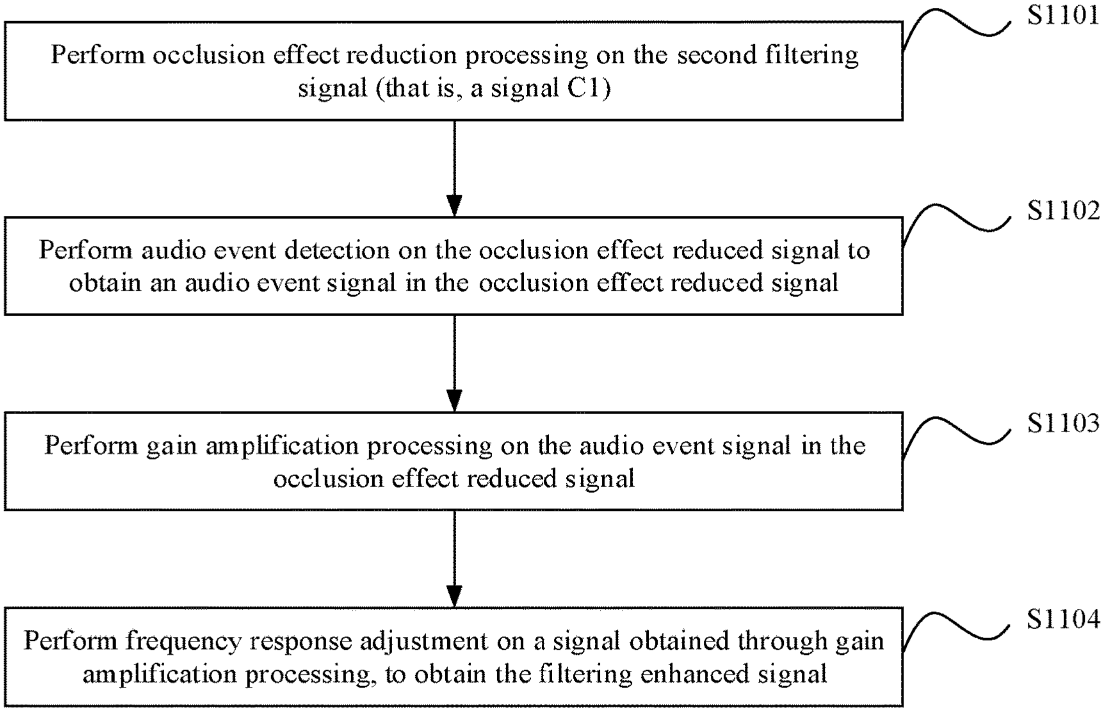
FIG. 11 is another schematic flowchart of gain amplification processing according to an embodiment of this disclosure.

For Manner 2, refer to FIG. 11.

S1101: Perform occlusion effect reduction processing on the second filtering signal (that is, the signal C1) to obtain an occlusion effect reduced signal.

A manner of performing occlusion effect reduction processing on the signal C1 may be the same as a manner of performing occlusion effect reduction processing on the signal B5. For details, refer to manner 1 and manner 2 in scene 2. Details are not described herein again.

S1102: Perform audio event detection on the occlusion effect reduced signal to obtain an audio event signal (which may be an event signal) in the occlusion effect reduced signal. The audio event signal is, for example, a station announcement sound or a horn.

S1103: Perform gain amplification processing on the audio event signal in the occlusion effect reduced signal.

Gain amplification processing is performed on the audio event signal in the occlusion effect reduced signal, for example, a station announcement sound or a horn, so that the headset wearer can clearly hear the station announcement sound or the horn.

S1104: Perform frequency response adjustment on a signal obtained through gain amplification processing, to obtain the filtering enhanced signal.

In Manner 2, gain amplification processing may be performed on the audio event signal in the occlusion effect reduced signal by using the same manner as that of performing gain amplification processing on the signal obtained through denoising processing. Details are not described herein again.

In a possible manner, refer to FIG. 8B. For example, a denoising processing unit includes a codec and a DSP. The codec of the headset includes an HT filter, an FB filter, an FF filter, a subtractor, a first mixer, a second mixer, and a filtering compensation unit. HT filtering processing is performed by the codec. The DSP may be configured to perform enhancement processing. The reference microphone in the headset 200 picks up the first signal, and inputs the first signal to the HT filter for HT filtering processing to obtain the signal C1. The signal C1 is input to the DSP, and the DSP performs enhancement processing on the signal C1 to obtain the signal C2. The signal C2 is input to the first mixer, and the first mixer performs mixing processing on the downlink audio signal and the signal C2 to obtain the signal C4. The signal C4 that undergoes filtering compensation processing performed by the filtering compensation unit is input to the subtractor. The subtractor is configured to filter out the signal C4 that has undergone filtering compensation and that is included in the second ambient signal picked up by the error microphone, to obtain the signal C5. The signal C5 is input to the FB filter, and the FB filter performs FB filtering processing on the signal C5 to obtain the signal C6. The signal C6 is input to the second mixer. In addition, an input for the second mixer further includes the signal C4 and the signal C3. The second mixer performs mixing processing on the signal C3, the signal C4, and the signal C6 to obtain the second audio signal, and the second audio signal is input to a speaker for playing.

In another possible manner, refer to FIG. 8C. For example, a denoising processing unit includes a codec and a DSP. The DSP may be configured to perform HT filtering processing and enhancement processing. The codec of the headset includes an FB filter, an FF filter, a subtractor, a first mixer, a second mixer, and a filtering compensation unit. The reference microphone in the headset 200 picks up the first signal, and inputs the first signal to the DSP. The DSP performs HT filtering processing on the first signal to obtain the signal C1. The DSP performs enhancement processing on the signal C1 to obtain the signal C2. The signal C2 is input to the first mixer, and the first mixer performs mixing processing on the downlink audio signal and the signal C2 to obtain the signal C4. The signal C4 that undergoes filtering compensation processing performed by the filtering compensation unit is input to the subtractor. The subtractor is configured to filter out the signal C4 that has undergone filtering compensation and that is included in the second ambient signal picked up by the error microphone, to obtain the signal C5. The signal C5 is input to the FB filter, and the FB filter performs FB filtering processing on the signal C5 to obtain the signal C6. The signal C6 is input to the second mixer. In addition, an input for the second mixer further includes the signal C4 and the signal C3. The second mixer performs mixing processing on the signal C3, the signal C4, and the signal C6 to obtain the second audio signal, and the second audio signal is input to a speaker for playing.

In a possible implementation, good or bad AH effect may be determined by AH processing intensity. The AH processing intensity depends on at least one of the following coefficients: an HT filtering coefficient, an FB filtering coefficient, or an FF filtering coefficient.

In a manner, the FF filtering coefficient may be a default FF filtering coefficient in an AH mode. In another manner, the FF filtering coefficient may be an FF filtering coefficient used when an AH mode is selected last time. In still another manner, the headset determines, based on an identified scene, an FF filtering coefficient used in an AH mode. In yet another manner, the user indicates, to the headset by using a UI control provided by the terminal device, an FF filtering coefficient used in an AH mode. For example, the user selects processing intensity in the AH mode as target processing intensity by using the UI control provided by the terminal device. Different processing intensity corresponds to different FF filtering coefficients. In a manner, the HT filtering coefficient may be a default HT filtering coefficient in an AH mode. In another manner, the HT filtering coefficient may be an HT filtering coefficient used when an AH mode is selected last time. In still another manner, the headset determines, based on an identified scene, an HT filtering coefficient used in an AH mode. In yet another manner, the user indicates, to the headset by using a UI control provided by the terminal device, an HT filtering coefficient used in an AH mode. For example, the user selects processing intensity in the AH mode as target processing intensity by using the UI control provided by the terminal device. Different processing intensity corresponds to different HT filtering coefficients. In a manner, the FB filtering coefficient may be a default FB filtering coefficient in an AH mode. In another manner, the FB filtering coefficient may be an FB filtering coefficient used when an AH mode is selected last time. In still another manner, the headset determines a used FB filtering coefficient based on an identified scene. In yet another manner, the user indicates, to the headset by using a UI control provided by the terminal device, an HT filtering coefficient used in an AH mode. For example, the user selects processing intensity in the AH mode as target processing intensity by using the UI control provided by the terminal device. Different processing intensity corresponds to different FB filtering coefficients.

The HT filtering coefficient, the FB filtering coefficient, or the FF filtering coefficient in the AH mode may be obtained in any combination of the foregoing provided manners.

A processing mode used by the headset 200 (including the left earphone and the right earphone) may be determined by the user by using the UI control on the terminal device 100 and indicated to the headset, may be determined by the terminal device based on an adaptively identified scene and indicated to the headset, or may be determined by the headset based on an adaptively identified scene.

The following describes a manner of determining the processing mode of the headset by using examples.

Example 1: A single control controls the left earphone and the right earphone.

The terminal device 100 provides a control interface used for the user to select a processing mode of the headset 200 (including the left earphone and the right earphone) based on a requirement: a null mode, an ANC mode, an HT mode, or an AH mode. No processing is performed in the null mode. It should be understood that all processing modes of the headset that are in the control interface and that are available for the user to select are processing modes supported by the headset. In Example 1, the left earphone and the right earphone have a same processing function, or support a same processing mode. For example, the left earphone supports AHA, and the right earphone also supports AHA. For example, a headset application adapted to the headset 200 is installed on the terminal device, and a processing function of the headset can be learned in an adaptation process. For another example, in a communication process in which the headset 200 establishes a connection to the terminal device, a function parameter is transmitted to the terminal device, so that the terminal device can determine a processing function of the headset based on the function parameter.

For example, the user selects the ANC mode. The control interface includes a user interface (UI) control. The UI control is used by the user to select the processing mode of the headset 200. For ease of differentiation, the UI control used by the user to select the processing mode of the headset is referred to as a selection control. The processing mode includes at least two of the following modes: the ANC mode, the HT mode, or the AH mode. The terminal device 100 separately sends control signaling 1 to the left earphone and the right earphone in response to that the user selects, by using the selection control, a target mode from the processing modes supported by the headset. The control signaling 1 carries the target mode. The selection control may also be used to select processing intensity in the target mode. The selection control may be of a ring shape or a bar shape, or the like. The selection control may include a first control and a second control. Any two different positions of the second control on the first control correspond to different processing modes of the headset, or any two different positions of the second control on the first control correspond to different processing intensity of the headset in a same processing mode. The user moves a position that is of the second control on the first control of the display and that represents user selection, to select different processing modes and controls processing intensity.

In a possible implementation, a headset application (APP) is used to control processing modes of the left earphone and the right earphone.

Figure 12A:
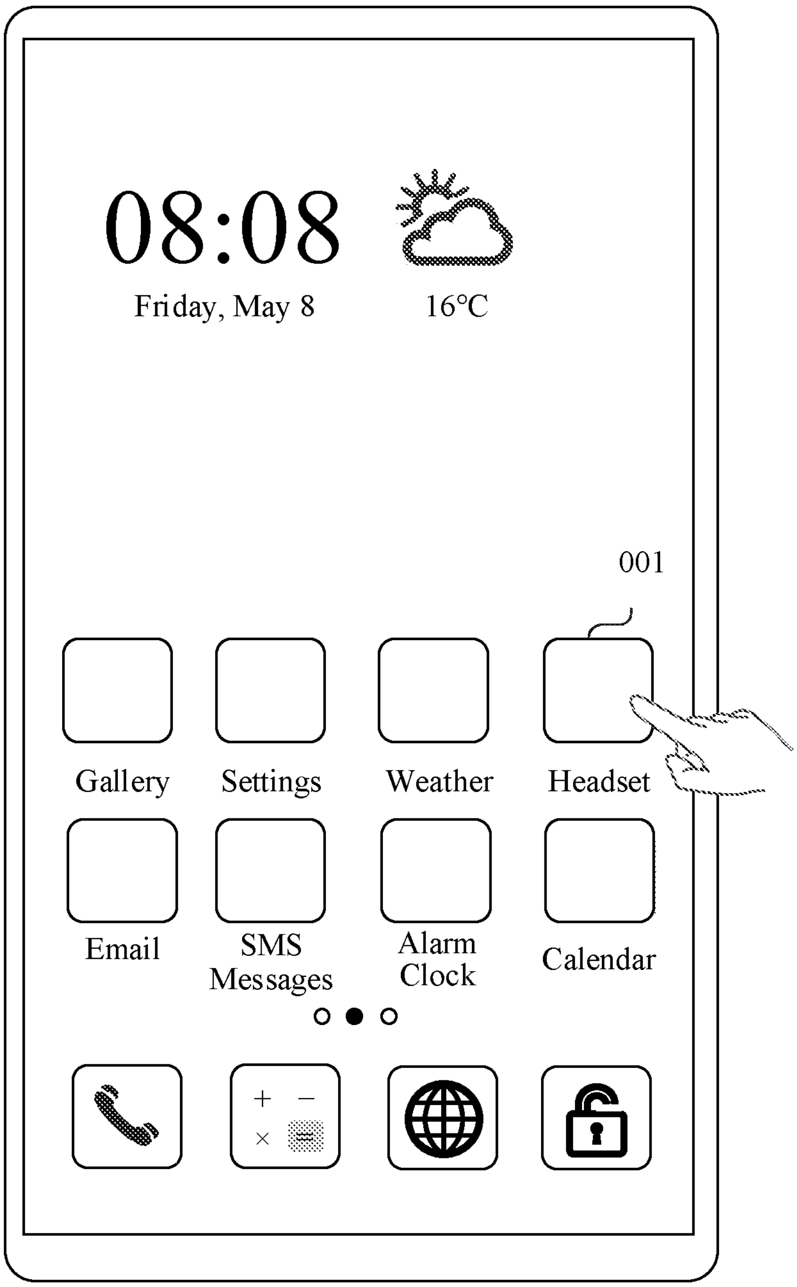
FIG. 12A is a schematic diagram of a home screen of a terminal device according to an embodiment of this disclosure.

The terminal device 100 includes a headset control application configured to control the headset, which is a headset application. For example, refer to a home screen of the terminal device shown in FIG. 12A. After the headset is connected to the terminal device, when the user taps an icon 001 of the headset APP on the home screen, the terminal device may start the headset application in response to the operation of tapping the icon 001 by the user, and display a control interface of the headset application on the display, or a control interface of the headset application is popped up when the headset application is started. A name of the application may be referred to as an audio assistant, and the control function may also be integrated into a settings option in a terminal system.

Figure 12B:
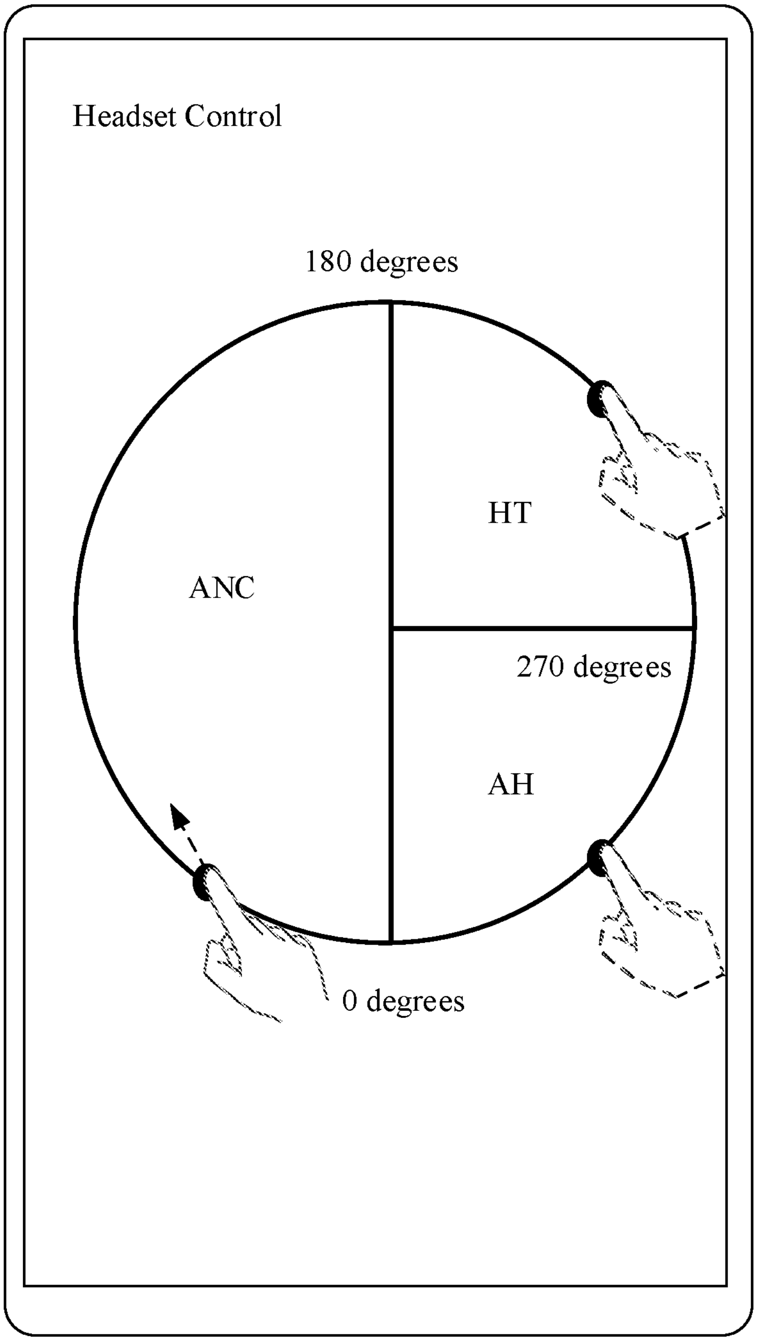
FIG. 12B is a schematic diagram of a control interface of a headset application according to an embodiment of this disclosure.

For example, the selection control is of a ring shape, as shown in FIG. 12B. In FIG. 12B, for example, both the left earphone and the right earphone support the ANC mode, the HT mode, and the AH mode. The first control in the ring-shaped selection control in FIG. 12B includes three arc segments respectively corresponding to the ANC mode, the HT mode, and the AH mode. If the second control is located in the arc segment in the ANC mode, it is determined that the second control is in the ANC mode. Different positions of the second control in the arc segment in the ANC mode correspond to different processing intensity in the ANC mode. If the second control is located in the arc segment in the HT mode, it is determined that the second control is in the HT mode. Different positions of the second control in the arc segment in the HT mode correspond to different processing intensity in the HT mode. If the second control is located in the arc segment in the AH mode, it is determined that the second control is in the AH mode. Different positions of the second control in the arc segment in the AH mode correspond to different processing intensity in the AH mode. In an optional setting, a position with largest ANC intensity is adjacent to a position with smallest HT intensity, and auditory perception can be smoothly transited. A position with largest HT intensity is adjacent to a position with smallest AH, and auditory perception can also be smoothly transited.

A highlighted black dot on the ring (or a circumference) represents a second control used by the user to select processing intensity. The user may move a position of the black dot on the circumference to select different processing modes and control processing intensity. The terminal device 100 (for example, a processor) responds to an operation 1 performed by the user in the control interface. For example, the operation 1 is generated when the user moves a position that is of the second control on the second control of the display and that represents user selection. The terminal device 100 separately sends a control instruction 1 to the left earphone and the right earphone, where the control instruction 1 indicates the target mode and the target processing intensity. In FIG. 12B, the target mode is the ANC mode.

In an example, the control instruction 1 may include an ANC identifier and a parameter value indicating target processing intensity used when ANC processing is performed. In the ANC mode, different processing intensity (that is, different processing intensity values) corresponds to different FB filtering coefficients and/or different FF filtering coefficients.

In another example, the control instruction 1 includes a radian. A corresponding processing mode may be determined based on a range of the radian. Different radian values correspond to processing intensity in the processing mode. Refer to FIG. 12B. A processing mode corresponding to (0, 180] is the ANC mode, a processing mode corresponding to (180, 270] is the HT mode, and a processing mode corresponding to (270, 360] is the AH mode. The left earphone and the right earphone may include a mapping relationship between a range of a radian and a processing mode, and a mapping relationship between a radian value and a filtering coefficient. For example, in the ANC mode, different radian values correspond to different FB filtering coefficients and different FF filtering coefficients.

For example, in FIG. 12B, the user may touch and control the black dot on the ring to move clockwise from 0 degrees to 360 degrees, an FF filtering coefficient and an FB filtering coefficient that correspond to 0 degrees make strongest ANC effect, that is, a weaker sound in an environment in which the user is currently located and a weaker ambient sound in an ear canal of the user that are perceived by the user. The FF filtering coefficient and the FB filtering coefficient change after movement, to gradually weaken ANC effect. When the black dot is moved to 180 degrees, the ANC effect is weakest, which is similar to that no denoising processing is performed when the headset is worn. A region from 180 degrees to 270 degrees is a hear-through control part. The user touches and controls the black dot on the ring to move clockwise from 180 degrees to 270 degrees. An HT filtering coefficient and an FB filtering coefficient that correspond to 180 degrees make weakest ambient sound hear-through effect, that is, smaller intensity of the sound and that is perceived by the user and that is in the environment in which the user is currently located. This is similar to that the null mode is used after the headset is worn. The HT filtering coefficient and the FB filtering coefficient change after clockwise movement, so that the hear-through effect becomes stronger. A region from 270 degrees to 360 degrees is used to control augmented hearing. That is, the user touches and controls the black dot on the ring. An FF filtering coefficient, an HT filtering coefficient, and an FB filtering coefficient that correspond to 180 degrees make weakest augmented hearing effect, that is, a weaker event sound included in the sound that is perceived by the user and that is in the environment in which the user is currently located. The FF filtering coefficient, the HT filtering coefficient, and the FB filtering coefficient change after clockwise movement, so that augmented hearing effect becomes stronger, that is, the event signal that the user expects to hear becomes stronger, to assist in hearing.

For example, the terminal device 100 is connected to the left earphone and the right earphone via BLUETOOTH.

Figure 12C:
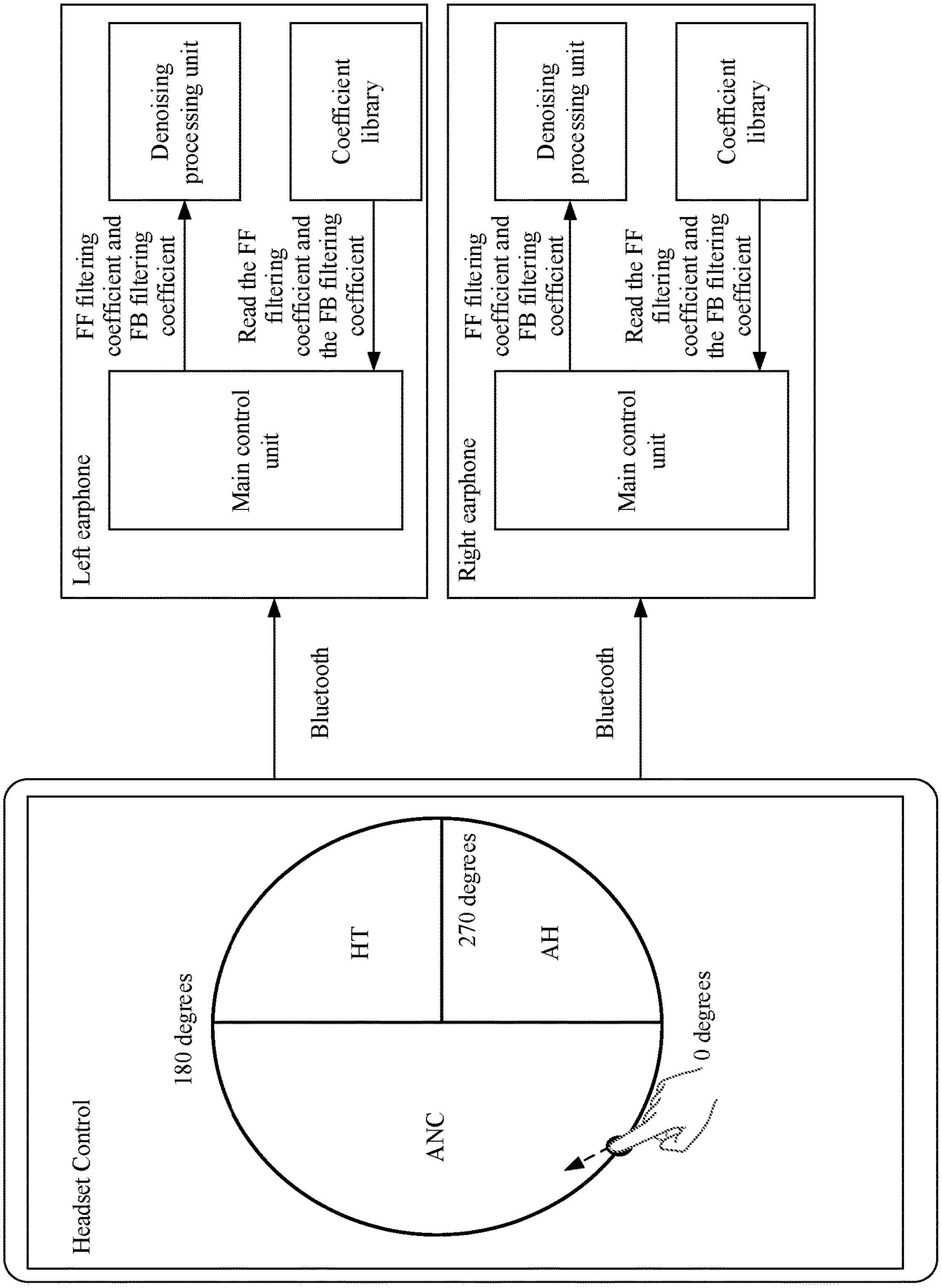
FIG. 12C is a schematic control diagram of controlling a headset by a terminal device in an ANC mode according to an embodiment of this disclosure.

For example, the ANC mode is used as an example. Refer to FIG. 12C. The terminal device 100 separately sends a control instruction 1 to the left earphone and the right earphone via BLUETOOTH in response to an operation 1 of the user. The control instruction 1 may include an ANC identifier and a parameter value for target processing intensity. Similar operations are performed by the left earphone and the right earphone after the control instruction 1 is received, and processing of the left earphone is used as an example in the following descriptions. After receiving the control instruction 1, a main control unit of the left earphone obtains, from a coefficient library based on the ANC identifier and the target processing intensity, an FF filtering coefficient and an FB filtering coefficient that are for ANC processing.

For example, the coefficient library includes a mapping relationship shown in Table 1. Table 1 is merely an example, and constitutes a specific limitation on the mapping relationship. For example, the parameter value for the target processing intensity is intensity 1. In this case, the main control unit of the left earphone learns, according to Table 1, that an FF filtering coefficient corresponding to the intensity 1 is a coefficient FF1, and an FB filtering coefficient is a coefficient FB1. The main control unit controls the FF filter to perform, by using the coefficient FF1, FF filtering processing on the first signal collected by the reference microphone, to obtain the signal A1. The main control unit controls the FB filter to perform FB filtering processing on the signal A3 by using the coefficient FB1, to obtain the second audio signal. Further, the main control unit writes the coefficient FF1 and the coefficient FB1 into an AHA core, so that the AHA core performs steps of S501 to S504 to obtain the second audio signal.

TABLE 1

| Processing mode | Parameter value for processing intensity | FF filtering coefficient | FB filtering coefficient | HT filtering coefficient |
|---|---|---|---|---|
| ANC | Intensity 1 | Coefficient FF1 | Coefficient FB1 | |
| | Intensity 2 | Coefficient FF2 | Coefficient FB2 | |
| | Intensity 3 | Coefficient FF3 | Coefficient FB3 | |
| | Intensity 4 | Coefficient FF4 | Coefficient FB4 | |
| HT | Intensity 5 | NA | Coefficient FB5 | Coefficient HT1 |
| | Intensity 6 | NA | Coefficient FB6 | Coefficient HT2 |
| AH | Intensity 7 | Coefficient FF5 | Coefficient FB7 | Coefficient HT3 |
| | Intensity 8 | Coefficient FF6 | Coefficient FB8 | Coefficient HT4 |

Figure 12D:
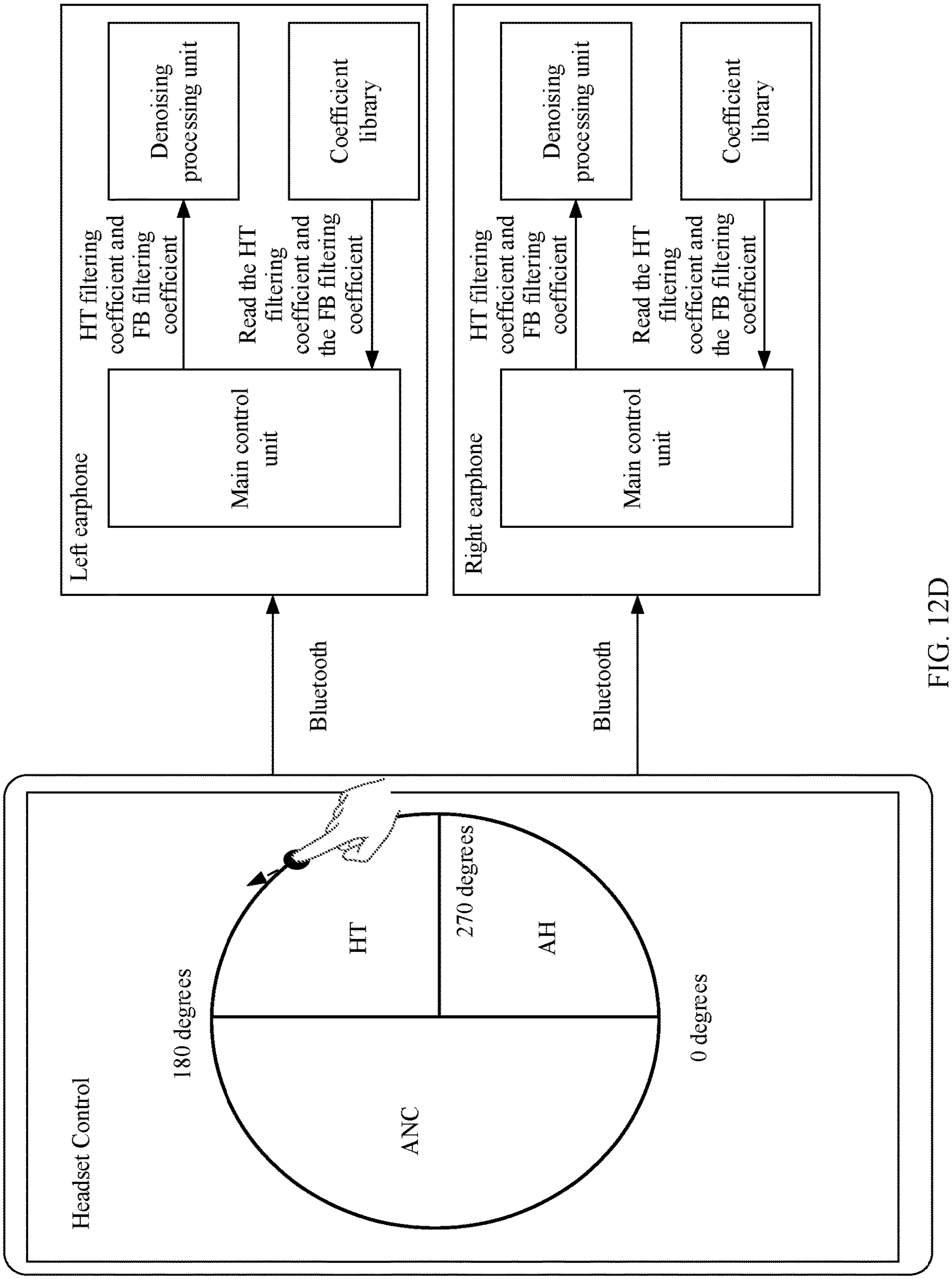
FIG. 12D is a schematic control diagram of controlling a headset by a terminal device in an HT mode according to an embodiment of this disclosure.

For example, the HT mode is used. Refer to FIG. 12D. The terminal device 100 separately sends a control instruction 1 to the left earphone and the right earphone via BLUETOOTH in response to an operation 1 of the user. The control instruction 1 may include an HT identifier and target processing intensity, and the target processing intensity indicates processing intensity used when HT processing is performed. Similar operations are performed by the left earphone and the right earphone after the control instruction 1 is received, and processing of the left earphone is used as an example in the following descriptions. After receiving the control instruction 1, the main control unit of the left earphone obtains, from the coefficient library based on the HT identifier and the target processing intensity, an HT filtering coefficient and/or an FB filtering coefficient that are for HT processing.

Table 1 is used as an example. A value of the target processing intensity is the intensity 5. In this case, the main control unit of the left earphone learns, according to Table 1, an HT filtering coefficient corresponding to the intensity 5 is a coefficient HT1, and an FB filtering coefficient is a coefficient FB5. The main control unit controls an HT filter to perform, by using the coefficient HT1, HT filtering processing on the first signal collected by the reference microphone. The main control unit controls the FB filter to perform FB filtering processing on the signal B3 by using the coefficient FB5. Further, the main control unit writes the coefficient HT1 and the coefficient FB5 into the AHA core, so that the AHA core performs steps of S601 to S605 to obtain the second audio signal.

Figure 12E:
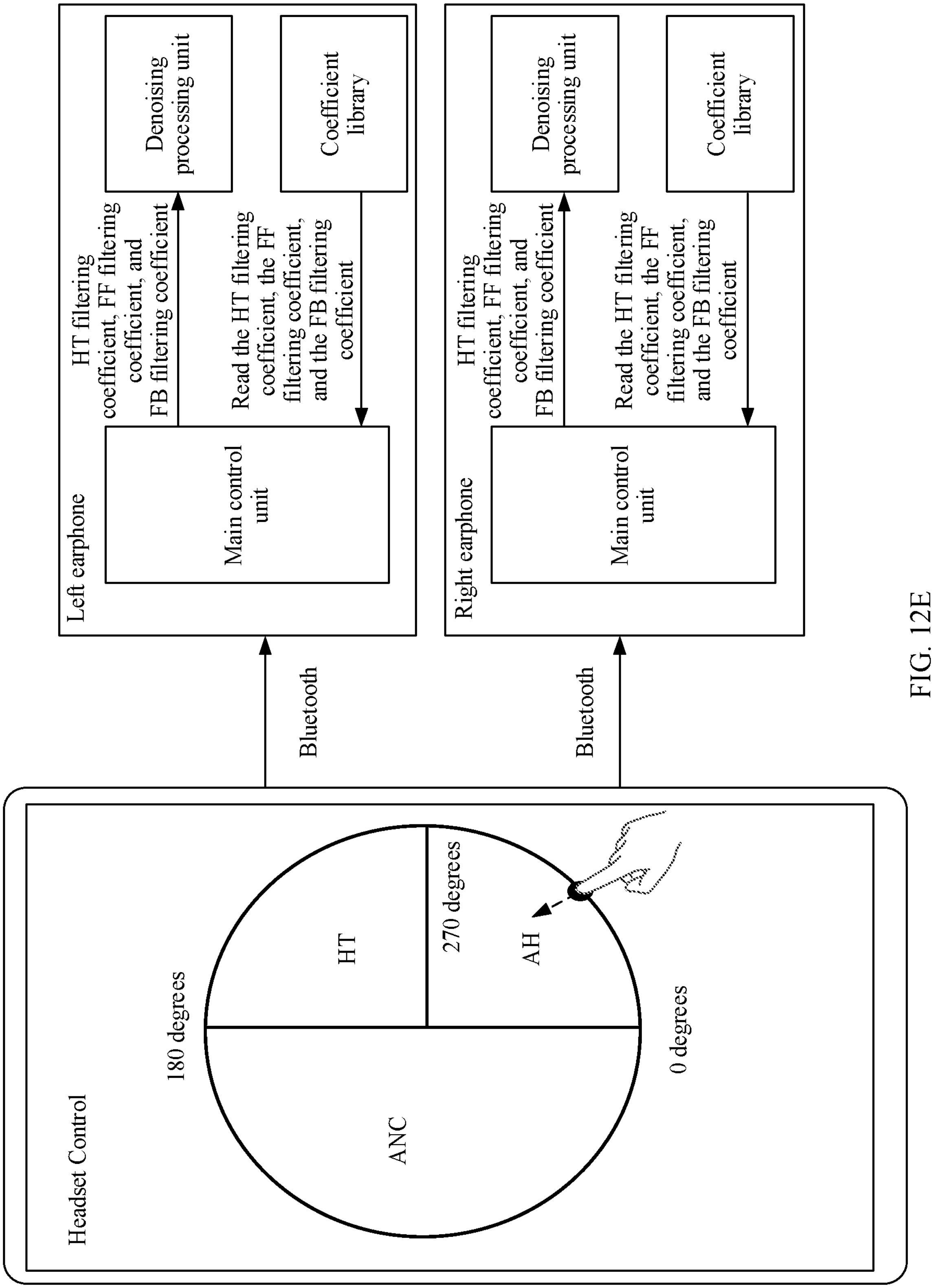
FIG. 12E is a schematic control diagram of controlling a headset by a terminal device in an AH mode according to an embodiment of this disclosure.

For example, the AH mode is used as an example. Refer to FIG. 12E. The terminal device 100 separately sends a control instruction 1 to the left earphone and the right earphone via BLUETOOTH in response to an operation 1 of the user. The control instruction 1 may include an AH identifier and a parameter value for target processing intensity. Similar operations are performed by the left earphone and the right earphone after the control instruction 1 is received, and processing of the left earphone is used as an example in the following descriptions. After receiving the control instruction 1, the main control unit of the left earphone obtains, from the coefficient library based on the HT identifier and the target processing intensity, an HT filtering coefficient, an FF filtering coefficient, and an FB filtering coefficient that are for AH processing.

Table 1 is used as an example. A value of the target processing intensity is an indicator 7. In this case, the main control unit of the left earphone learns, according to Table 1, that an HT filtering coefficient corresponding to the indicator 7 is a coefficient HT3, an FB filtering coefficient is a coefficient FB7, and an FF filtering coefficient is a coefficient FF5. The main control unit controls the HT filter to perform, by using the coefficient HT3, HT filtering processing on the first signal collected by the reference microphone. The main control unit controls the FB filter to perform FB filtering processing on the signal C5 by using the coefficient FB7. The main control unit controls the FF filter to perform FF filtering processing on the first signal by using the coefficient FF5. Further, the main control unit writes the coefficient HT3, the coefficient FB7, and the coefficient FF5 into the AHA core, so that the AHA core performs steps of S801 to S807 to obtain the second audio signal.

Figure 12F:
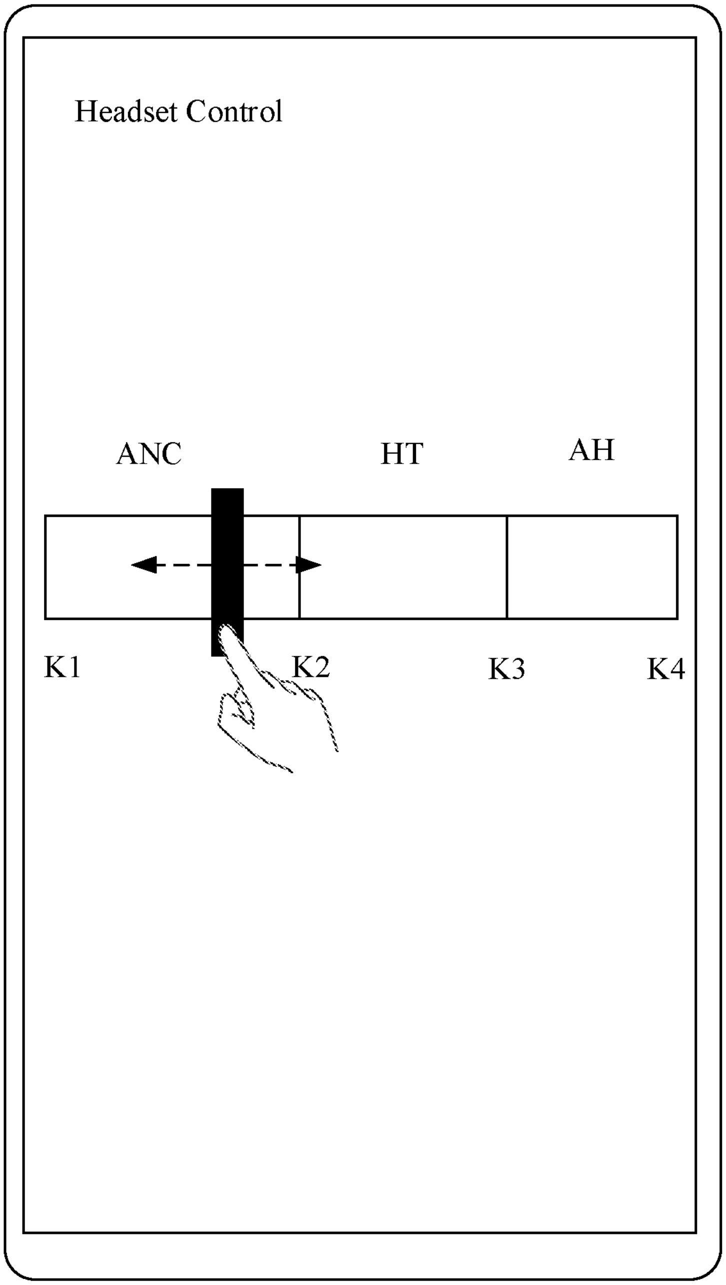
FIG. 12F is a schematic diagram of a selection control according to an embodiment of this disclosure.

For example, refer to FIG. 12F. The selection control may be of a bar shape. The selection control includes a first control and a second control. The bar of the first control may be divided into a plurality of bar-shaped segments based on a quantity of processing modes supported by the headset. The second control is located in different bar-shaped segments of the first control to indicate different processing modes. The second control is located in different positions of a same bar-shaped segment of the first control to indicate different processing intensity in a same processing mode. For example, in FIG. 12F, both the left earphone and the right earphone support AHA. In this case, the bar of the first control includes three bar-shaped segments.

FIG. 12F is used as an example. The user may touch and control a black bar to slide leftwards or rightwards, a corresponding FF filtering coefficient and FB filtering coefficient make strongest ANC effect when the black bar is located in a position K1, and the FF filtering coefficient and the FB filtering coefficient change after the black bar slides rightwards, to gradually weaken ANC effect, and make weakest ANC effect when the black bar slides to a position K2. This is similar to that no denoising processing is performed when the headset is worn. A region between K2 and K3 is a hear-through control part. The user touches and controls the black bar to move from the position K2 to K3, a corresponding HT filtering coefficient and FB filtering coefficient make weakest ambient sound hear-through effect when the black bar moves to the position K2, and the HT filtering coefficient and FB filtering coefficient change when the black bar moves to the position K3, so that ambient sound hear-through effect becomes stronger. A region from the position K3 to the position K4 is used to control augmented hearing. That is, the user touches and controls the black bar to move from the position K3 to the position K4, a corresponding FF filtering coefficient, HT filtering coefficient, and FB filtering coefficient make weakest augmented hearing effect when the black bar moves to the position K3, and the FF filtering coefficient, the HT filtering coefficient, and the FB filtering coefficient change when the black bar moves from the position K3 to the position K4, so that augmented hearing effect becomes stronger, that is, a voice signal that the user expects to hear becomes stronger, to assist in hearing.

Figure 12G:
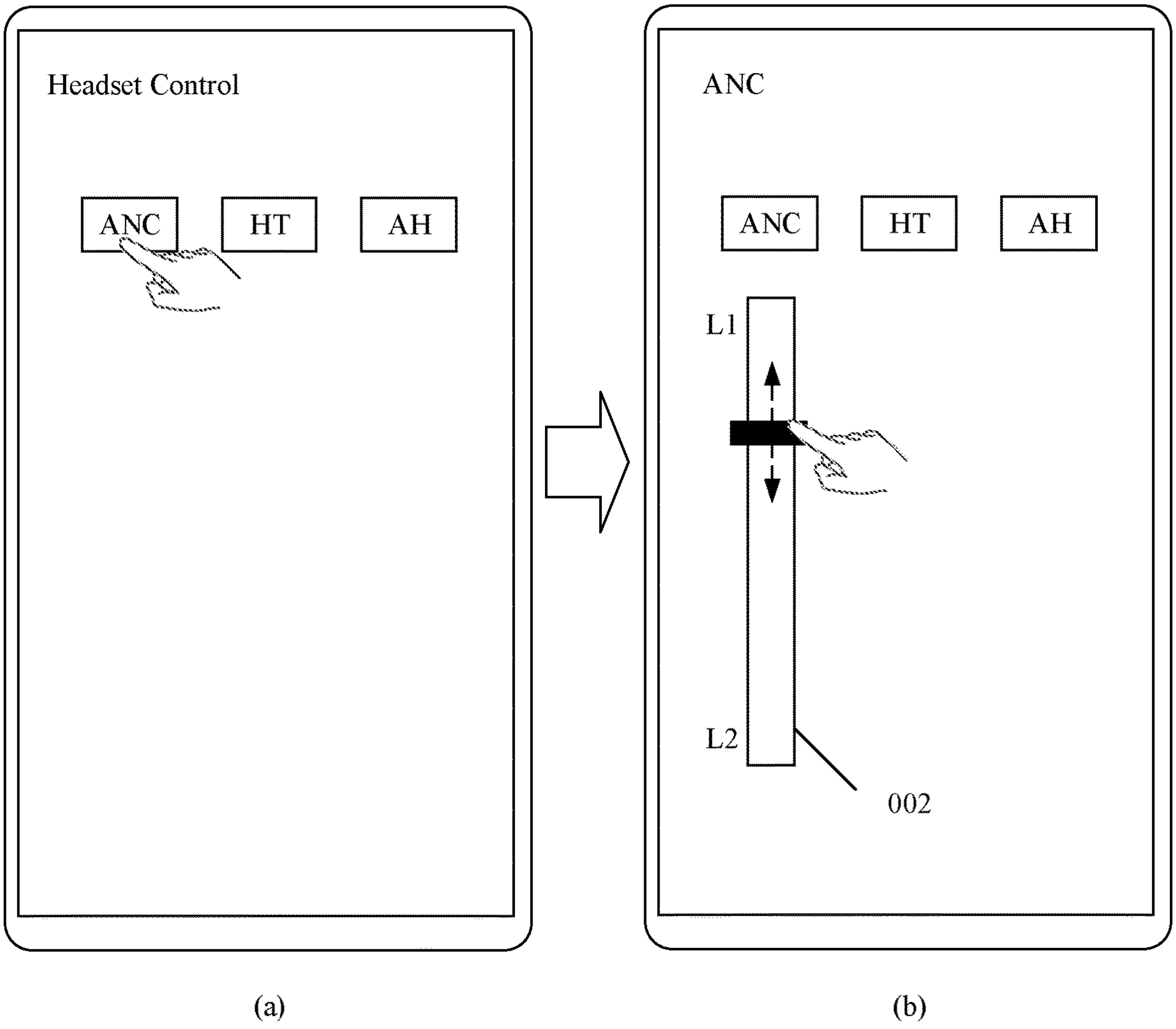
FIG. 12G is another schematic diagram of a selection control according to an embodiment of this disclosure.

For example, refer to FIG. 12G. The selection control in (a) includes buttons corresponding to different processing modes, including an ANC button, an HT button, and an AH button. The ANC mode is used as an example. The terminal device 100 displays a display interface in (b) of FIG. 12G in response to an operation of tapping the ANC button by the user. the display interface in (b) includes a control 002 for selecting processing intensity. The user can determine ANC processing intensity by controlling a black bar to slide upwards or downwards, that is, select a corresponding FF filtering coefficient and FB filtering coefficient. The black bar slides in a region between L1 and L2. A corresponding FF filtering coefficient and FB filtering coefficient make strongest ANC effect when the black bar is located in the position L1, and the FF filtering coefficient and the FB filtering coefficient change after the black bar slides downwards, to gradually weaken ANC effect, and make weakest ANC effect when the black bar slides to the position L2. This is similar to that no denoising processing is performed when the headset is worn.

In another possible implementation, when the headset 200 establishes a connection to the terminal device, startup of the headset APP may be triggered to display a control interface including a selection control, for example, the control interface shown in FIG. 12A, FIG. 12B, FIG. 12F, or FIG. 12G.

For example, an interface displayed by the terminal device is an interface 1. In this case, the interface may jump from the interface 1 to the control interface when the terminal device identifies that the headset 200 establishes a connection to the terminal device.

In still another possible implementation, after the headset establishes a connection to the terminal device, the terminal device may trigger startup of the headset APP when triggering the headset to play audio, that is, display a control interface including a selection control, for example, the display interface shown in FIG. 12A, FIG. 12B, FIG. 12C, or FIG. 12D. For example, when the terminal device triggers the headset to play the audio, after establishing a connection to the headset, the terminal device may play a song, and display a control interface including a selection control. For another example, after establishing a connection to the headset, the terminal device plays a video, and may display a control interface including a selection control.

Figure 12H:
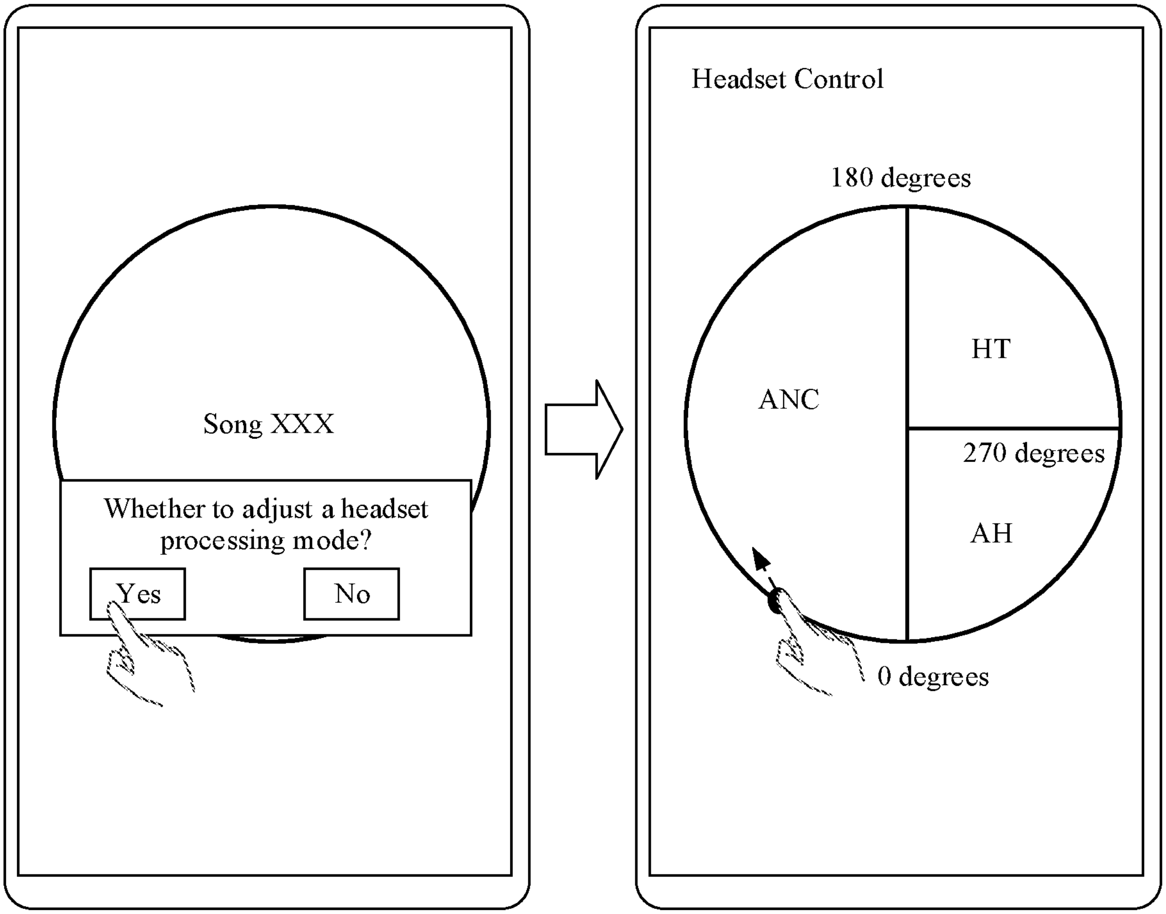
FIG. 12H is a schematic diagram of triggering a control interface of a headset according to an embodiment of this disclosure.

In yet another possible implementation, after the headset establishes a connection to the terminal device, in a process in which the terminal device plays audio by using the headset, it is identified that a scene type of a current external environment is a target scene, the target scene adapts to a scene type in which a processing mode of a first target earphone needs to be adjusted, and prompt information may be displayed. The prompt information is used to prompt the user whether to adjust the processing mode of the headset. Refer to FIG. 12H. For example, the prompt information is displayed in a form of a prompt box. A control interface including a selection control may be displayed in response to an operation of choosing, by the user, to adjust the processing mode of the headset, for example, the control interface shown in FIG. 12A, FIG. 12B, FIG. 12C, or FIG. 12D. FIG. 12E shows an example of the control interface shown in FIG. 12A.

For example, the terminal device identifies that a scene in which the user is currently located is a noisy scene. In this scene, the user may need to enable a processing mode, so as to display selection prompt information (for example, in a form of a prompt box) to indicate the user whether to adjust the processing mode of the headset. For example, the terminal device identifies that a scene type of an external environment is a noisy scene. In this scene, the user may need to enable a processing mode, so as to display a prompt box to indicate the user whether to adjust the processing mode of the headset.

In an example, scene types for displaying the prompt box through triggering may include a noisy scene, a terminal building scene, a railway station scene, a bus station scene, a road scene, and the like.

For example, when it is identified that signal intensity reaches a specified threshold, it is considered that a noisy scene is identified. For another example, when a particular airplane announcement sound is identified, it is determined that a terminal building scene is identified. For another example, when a train time notification sound is identified, it is determined that a railway station scene is identified. For another example, when bus ticket broadcasting is identified, it is determined that a bus station scene is identified. For another example, when a tick sound of a signal light or a horn of a car is identified, it is determined that a road scene is identified.

In still another possible scenario, after the headset establishes a connection to the terminal device, in a process in which the terminal device plays audio by using the headset, a control interface including a selection control is displayed based on an identified scene in which the user is currently located.

Example 2: Two controls are used to control the left and right earphones.

The terminal device 100 provides a control interface used for the user to separately select a processing mode of the left earphone and a processing mode of the right earphone based on a requirement. The processing modes of the left earphone and the right earphone may be different. For example, an ANC mode is selected for the left earphone, and an HT mode is used for the right earphone. The control interface includes a selection control for the left earphone and a selection control for the right earphone. For ease of distinguishing, the selection control for the left earphone is referred to as a first selection control, and the selection control for the right earphone is referred to as a second selection control. The first selection control is used by the user to select the processing mode of the left earphone, and the second selection control is used by the user to select the processing mode of the right earphone. The first selection control and the second selection control may be of a ring shape or a bar shape, or the like. Forms of the first selection control and the second selection control may be the same or may be different. The user moves a position that is of a control on the display and that represents user selection, to select different processing modes and control processing intensity. For shapes of controls used by the left earphone and the right earphone, refer to descriptions in Example 1. Details are not described herein again.

Figure 13:
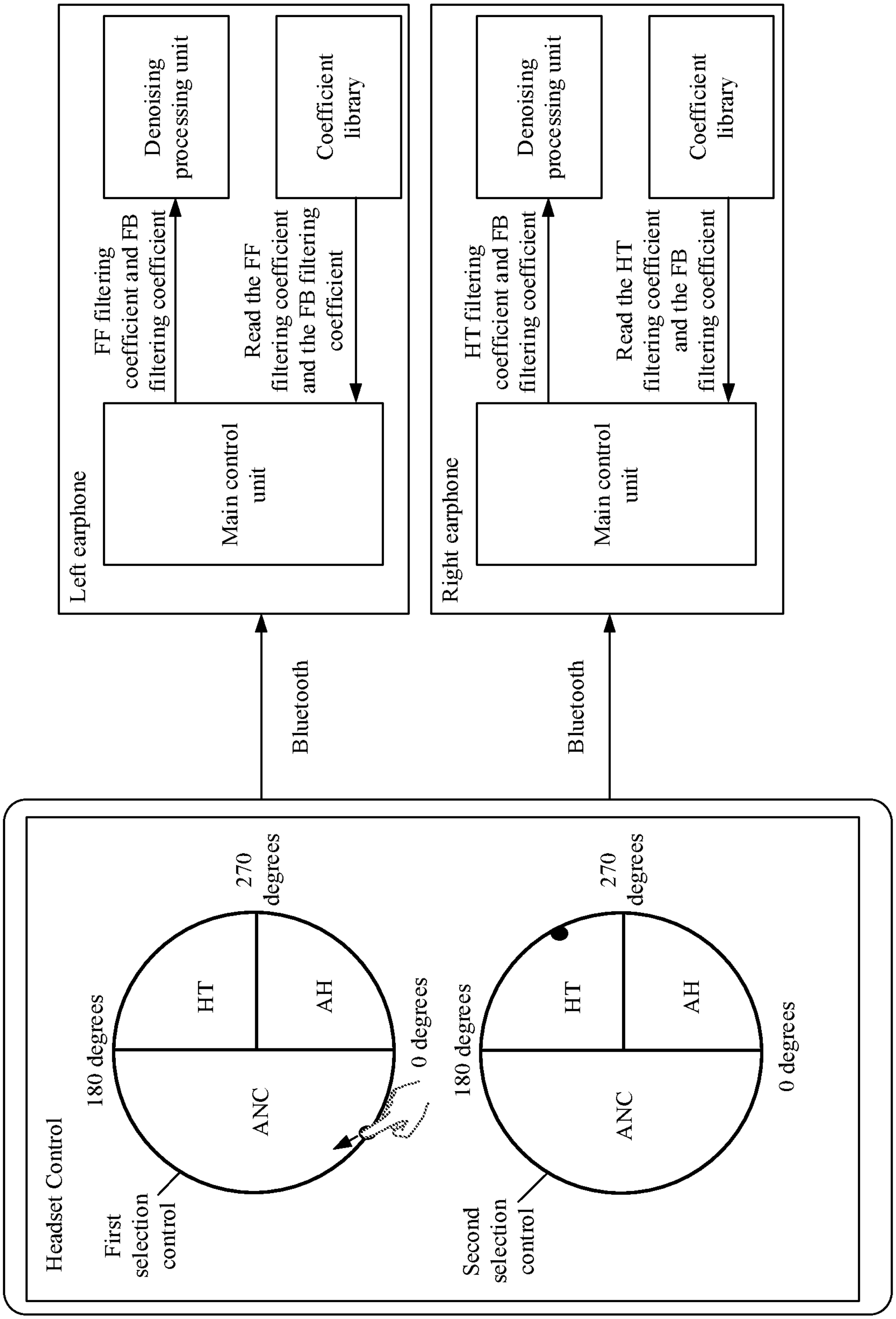
FIG. 13 is still another schematic diagram of a selection control according to an embodiment of this disclosure.

Descriptions are provided by using an example in which a ring-shaped selection control is used for both the left earphone and the right earphone. Refer to FIG. 13, both the first selection control and the second selection control include a first control and a second control. Two different positions of the second control on the first control correspond to different processing modes, or two different positions of the second control on the first control correspond to different processing intensity in a same processing mode. Refer to an example of a control interface shown in FIG. 13. The user may move a position, on the circumference of the first control, of the second control (black dot) of the first selection control of the left earphone to select different processing modes implemented by the left earphone and control processing intensity. The user may move a position, on the first control, of the second control of the second selection control of the right earphone to select different processing modes implemented by the right earphone and control processing intensity. In example 2, the user may select different processing modes for the left earphone and the right earphone, select same processing intensity in a same processing mode, or select different processing intensity in a same processing mode, to match ear differences or meet different application requirements.

In example 2, for a manner of displaying the control interface including the first selection control and the second selection control through triggering, refer to the descriptions in Example 1. Details are not described herein again.

Example 3: The terminal device performs smart scene detection.

The terminal device identifies a scene in which the user is currently located. Processing modes used for the headset are different in different scenes. When identifying that a scene type of a current external environment is indicated as a first scene, the terminal device determines a target mode that corresponds to the first scene and that is in the processing modes of the headset, and separately sends control signaling 2 to the left earphone and the right earphone. The control signaling 2 indicates the target mode. Different target modes correspond to different scene types.

In this embodiment of this disclosure, the terminal device determines, based on the identified scene, a specific function to be performed by the headset. An AHA function adapts to a scene type. In this case, a most appropriate function for the scene type is selected so that the user can automatically experience most desired effect.

In an example, the scene type may include a walking scene, a running scene, a quiet scene, a multi-person speaking scene, a cafe scene, a subway scene, a train scene, a car scene, a waiting-hall scene, a dialog scene, an office scene, an outdoor scene, a driving scene, a strong-wind scene, an airplane scene, an alarm-sound scene, a horn sound scene, a crying sound scene, and the like.

When the terminal device performs smart scene detection, detection classification may be performed by using a manner of an AI model. The AI model may be built in an offline manner and stored on the terminal device. For example, a microphone on a terminal device records a large amount of noise and sensor data and/or video processing unit (VPU) data in different scenes, and manually marks a scene corresponding to the data. Next, an AI model is constructed through initialization. The model may be one of a convolutional neural network (CNN)/a deep neural network (DNN)/a long short-term memory (LSTM) network, or may be a combination of different models. Then, model training is performed by using the marked data, to obtain a corresponding AI model. During use, a sound signal in an external environment collected in real time is input into the AI model for calculation, to obtain a classification result.

In an example, processing modes applicable to different scene types are listed. Information in a bracket corresponding to each of the following scenes indicates a processing mode corresponding to the scene type: the walking scene (HT), the running scene (HT), the quiet scene (HT), the multi-person speaking scene (ANC), the cafe scene (ANC), the subway scene (AH), the train scene (ANC), the waiting-hall scene (AH), the dialog scene (AH), the office scene (ANC), the outdoor scene(ANC), the driving scene (ANC), the strong-wind scene (ANC), the airplane scene (ANC), the alarm-sound scene (AH), the horn sound scene (AH), the crying sound scene (AH), and another scene. For example, in the airplane scene, noise is large when an airplane is flying. Therefore, the ANC mode is suitable. For another example, the HT mode is applicable to the walking scene, the running scene, and the quiet scene, to hear a sound of an emergency event. For another example, quietness is required for a user in the cafe scene. Therefore, the ANC mode may be used. For another example, the HT mode may be used in a light-music scene. For another example, a preset sound needs to be heard in the alarm-sound scene (AH), the horn sound scene (AH), and the crying sound scene (AH). Therefore, the AH mode is suitable.

For example, in the airplane scene, when identifying that a scene type of a current external environment is an airplane scene, the terminal device 100 may send control signaling 2 to the headset. The control signaling 2 indicates that the headset needs to perform an ANC function, that is, indicates the headset to use the ANC mode. After receiving the control signaling 2, the left earphone and the right earphone separately perform processing in S501 to S504.

In an example, in the walking scene, the terminal device 100 may send control signaling 2 to the headset when identifying that a scene type of a current external environment is the walking scene. The control signaling 2 indicates that the headset needs to perform the HT function, that is, the headset uses the HT mode. After receiving the control signaling 2, the left earphone and the right earphone separately perform processing in S601 to S605.

In still another example, in the alarm-sound scene, the terminal device 100 may send control signaling 2 to the headset when identifying that a scene type of a current external environment is the railway-station scene. The control signaling 2 indicates that the headset needs to perform an AH function, that is, the headset uses the AH mode. After receiving the control signaling 2, the left earphone and the right earphone separately perform processing in S801 to S807.

In a possible implementation, the terminal device starts scene detection after the headset establishes a connection to the terminal device. After completing detection, the terminal device may further display a detection result to the user, so that the user learns of a processing mode used for the headset. For example, the detection result is displayed to the user in a form of a prompt box. The detection result may include a detected scene, and may further include a processing mode corresponding to the detected scene. For example, when identifying that the scene is a first scene, the terminal device determines a target mode that corresponds to the first scene and that is in processing modes of the headset, and may display a detection result, that is, the first scene and the target mode, to the user. Then, control signaling 2 is separately sent to the left earphone and the right earphone. The control signaling 2 indicates the target mode.

In another possible implementation, a function for enabling smart scene detection is configured on the terminal device. The terminal device triggers scene detection in response to a function of enabling smart scene detection by the user. When it is identified that a scene is a first scene, a target mode that corresponds to the first scene and that is in processing modes of the headset is determined, and then control signaling 2 is separately sent to the left earphone and the right earphone. The control signaling 2 indicates the target mode.

After completing detection, the terminal device may further display a detection result to the user, so that the user learns of a processing mode used for the headset. The detection result may include a detected scene, and may further include a processing mode corresponding to the detected scene. For example, when identifying that the scene is a first scene, the terminal device determines a target mode that corresponds to the first scene and that is in processing modes of the headset, and may display a detection result, that is, the first scene and the target mode, to the user. Then, control signaling 2 is separately sent to the left earphone and the right earphone. The control signaling 2 indicates the target mode. Optionally, after the detection result is displayed to the user, the left earphone and the right earphone sends the control signaling 2 in response to the operation of determining the target mode by the user.

For example, the switch that is for enabling the smart scene detection function and that is configured on the terminal device may be configured on a control interface of the headset application, or may be configured on a system setting menu bar of the terminal device. For example, the function switch is configured in the control interface of the headset application. The terminal device may control, in a manner of identifying a scene, a processing mode used for the headset, and the terminal device may further identify a user operation on a selection control in the control interface to control the processing mode used for the headset. The terminal device may determine, based on a requirement, whether to enable a smart scene detection function. When the smart scene detection function is not enabled, the processing mode used for the headset may be manually selected by using Example 1. When the smart scene detection function is enabled, the terminal device 100 identifies a scene in which the user is currently located. After the user enables the smart scene detection function, the interface on which the processing mode is manually selected may be updated to another interface, or a detection result may be displayed on the interface on which a processing function is manually selected.

Figure 14A:
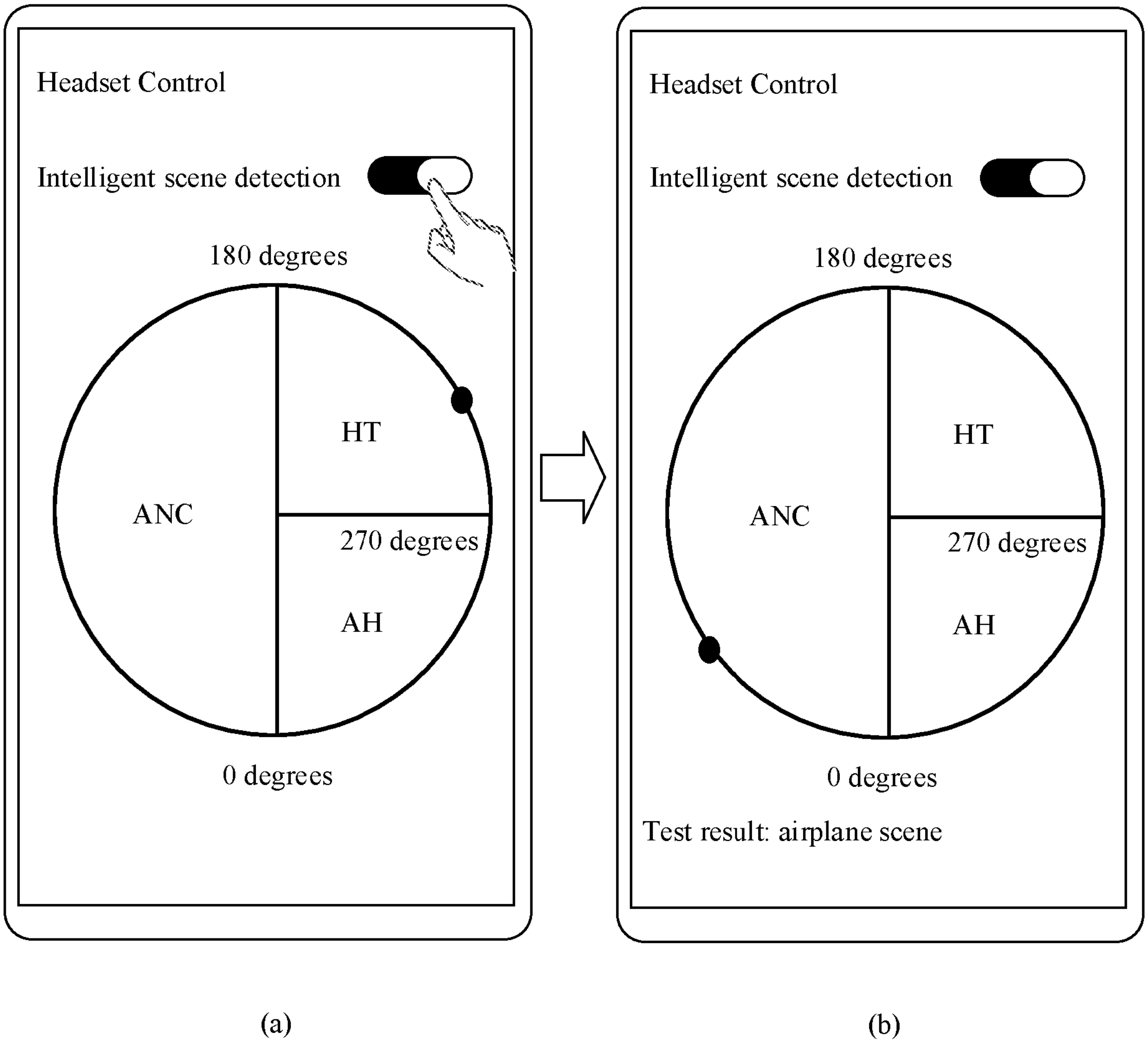
FIG. 14A is a schematic diagram of controlling enabling of a smart scene detection function according to an embodiment of this disclosure.
Figure 14B:
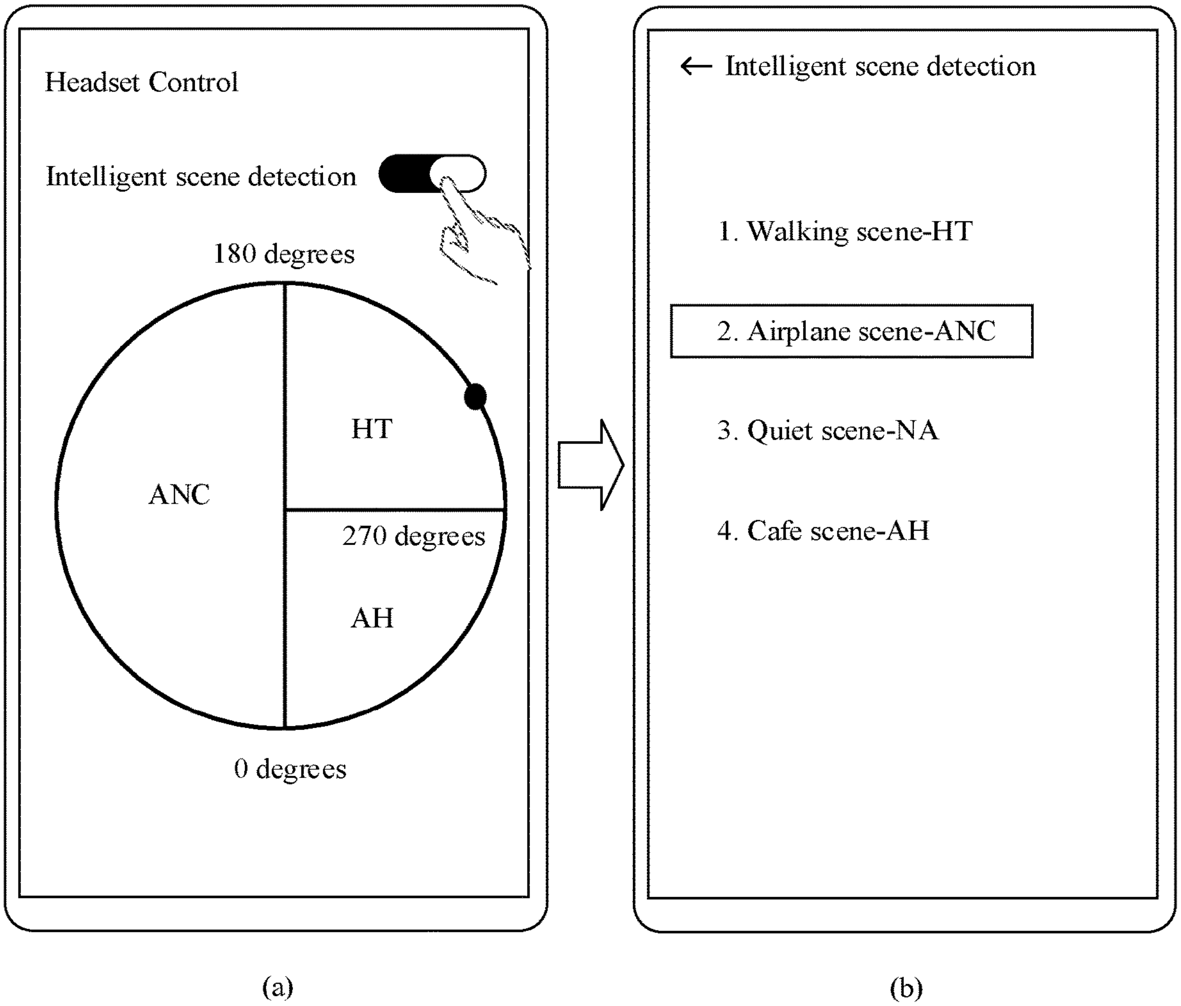
FIG. 14B is another schematic diagram of controlling enabling of a smart scene detection function according to an embodiment of this disclosure.

For example, before the user enables the smart scene detection function, a processing function selected by the user on the terminal device is an HT function. After enabling the smart scene detection function, the terminal device identifies that a scene in which the user is currently located is an airplane scene, and an ANC function is suitable to be used. In an example, the user starts the headset application, and displays a control interface of the headset application on the display. A ring is used as an example. A processing function selected by the user is an HT function, as shown in (a) of FIG. 14A. The control interface includes an option control indicating whether to enable a smart scene detection function. After the user triggers the option control for enabling the smart scene detection function, the user triggers the smart scene detection function, performs scene detection to obtain a detection result, and changes, to an ANC function region, a position that is of a control for a processing function and that represents user selection. A position of a black dot on the ring may be a default value in the case of the ANC function or a position corresponding to processing intensity selected when the user selects the ANC function last time, for example, as shown in (b) of FIG. 14A. (b) of FIG. 14A shows an example in which an airplane scene is detected. The terminal device 100 separately sends control signaling 2 to the left earphone and the right earphone. The control signaling 2 indicates the ANC function. In another example, the user starts the headset application, and a control interface of the headset application is displayed on the display. A ring is used as an example. A processing function selected by the user is an HT function, as shown in (a) of FIG. 14B. The control interface includes an option control indicating whether to enable a smart scene detection function. After the user triggers the option control for enabling the smart scene detection function, the user triggers the smart scene detection function, performs scene detection to obtain a detection result, and displays the detection result on a detection result interface. The detection result interface may further include a scene that can be identified by the terminal device and a processing function corresponding to the scene. For example, refer to (b) of FIG. 14B. A detection result is an airplane scene, and a corresponding processing function is an ANC function. The terminal device 100 separately sends control signaling 2 to the left earphone and the right earphone. The control signaling 2 indicates the ANC function.

In a manner in which the terminal device performs smart scene detection, target processing intensity in a target mode may be determined in any one of the following manners.

Manner 1: The headset uses default target processing intensity in the target mode.

For example, after the terminal device separately sends the control signaling 2 to the left earphone and the right earphone, a processing mode that the left earphone determines to use after receiving the control signaling 2 is the target mode, the control signaling 2 indicates no target processing intensity, and the headset determines to use the default target processing intensity. For example, the target mode is the ANC mode. After receiving the control signaling 2, the left earphone determines to use the ANC mode, and obtains, from the left earphone, a default FF filtering coefficient and a default FB filtering coefficient in the ANC mode.

Manner 2: Processing intensity used when the target mode is used last time is used as the target processing intensity.

In an example, the terminal device determines the target processing intensity, and indicates the target processing intensity to the left earphone and the right earphone by using control signaling. After performing scene detection and determining the target mode based on the detected scene, the terminal device obtains, as the target processing intensity, the processing intensity used when the target mode is used last time, and separately sends control signaling 2 to the left earphone and the right earphone. The control signaling 2 indicates the target mode and the target processing intensity.

In another example, the headset determines processing intensity in the target mode. After performing scene detection and determining the target mode based on the detected scene, the terminal device separately sends control signaling 2 to the left earphone and the right earphone. The control signaling 2 indicates the target mode. After receiving the control signaling 2, the left earphone and the right earphone determine that a used processing mode is the target mode, and obtains, as the target processing intensity, saved processing intensity used when the target mode is used last time. For example, the target mode is ANC, and a saved FF filtering coefficient and a saved FB filtering coefficient that are used when the ANC mode is used last time are obtained for ANC processing.

Manner 3: The terminal device determines the target processing intensity based on an identified scene.

If no switch for enabling a smart scene detection function is configured on the terminal device, the terminal device may determine the target processing intensity based on the identified scene after identifying the scene.

In an example, processing modes determined in different scenes are the same, but different scenes correspond to different processing intensity. For example, an HT mode is applicable to each of the following scenes: a walking scene, a running scene, and a quiet scene. The walking scene, the running scene, and the quiet scene correspond to different processing intensity when the HT mode is used. For another example, an ANC mode is applicable to each of the following scenes: a multi-person speaking scene, a cafe scene, a train scene, an airplane scene, a strong-wind scene, and an office scene. The multi-person speaking scene, the cafe scene, the train scene, the airplane scene, the strong-wind scene, and the office scene correspond to different processing intensity when the ANC mode is used. For another example, an AH mode is applicable to each of the following scenes: a dialog scene, an alarm-sound scene, a horn sound scene, and a crying sound scene. The dialog scene, the alarm-sound scene, the horn sound scene, and the crying sound scene correspond to different processing intensity when the AH mode is used.

Based on this, the terminal device sends control signaling 2 to the left earphone and the right earphone based on a stored correspondence among a scene type, a target mode, and processing intensity, where the control signaling 2 indicates a target mode and target processing intensity in the target mode. In this case, after receiving the control signaling 2, the headset determines, based on the control signaling 2, to use the target mode, and determines a filtering coefficient corresponding to the target processing intensity. For example, the target mode is AH. An FF filtering coefficient, an FB filtering coefficient, and an HT filtering coefficient are determined based on target processing intensity, and S801 to S807 are performed based on the FF filtering coefficient, the FB filtering coefficient, and the HT filtering coefficient.

Manner 4: The user indicates, to the headset by using a UI control provided by the terminal device, the processing intensity used in the target mode.

Figure 14C:
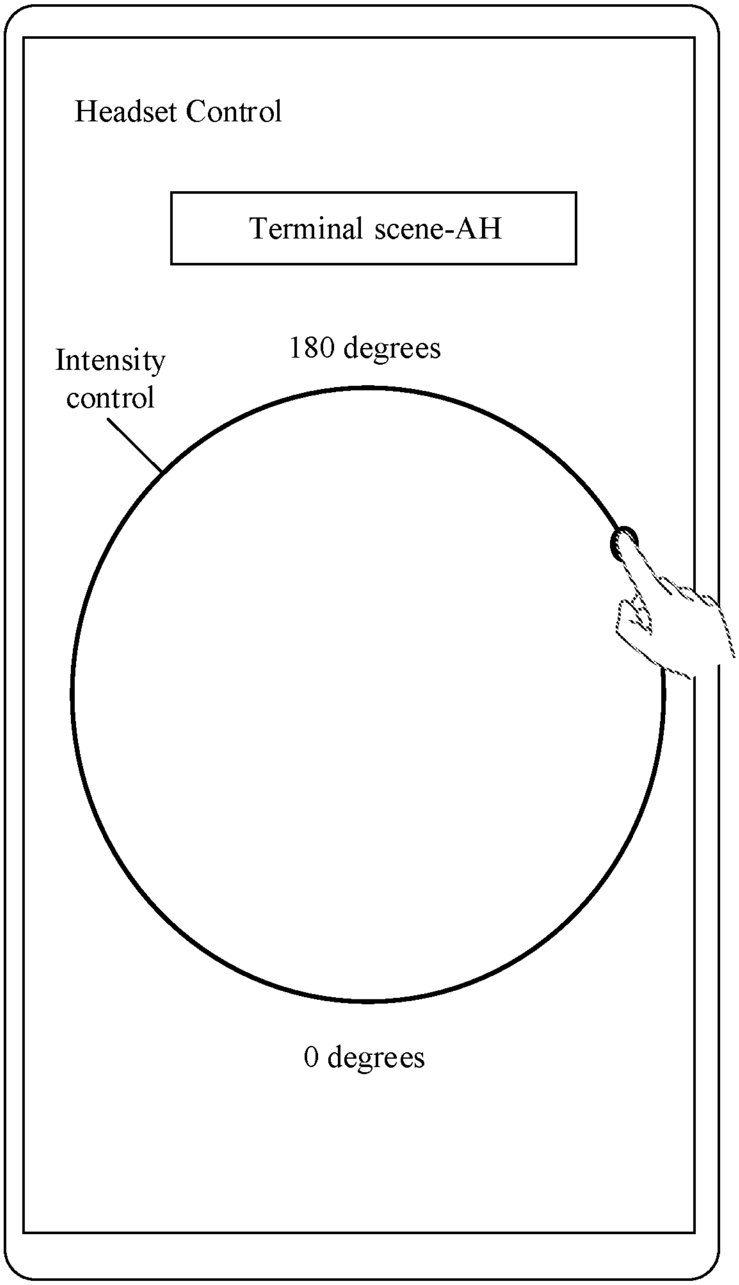
FIG. 14C is a schematic diagram of a headset control interface according to an embodiment of this disclosure.

In an example, after performing scene detection, the terminal device displays a detection result on a display interface of the terminal device, where the detection result includes a detected scene and the target mode corresponding to the detected scene. The display interface may include a control for selecting processing intensity. For ease of description, the control for selecting processing intensity is referred to as an intensity control. The intensity control may include a control 1 and a control 2. Different positions of the control 1 indicate different processing intensity in the target mode. The intensity control may be of a ring shape or a bar shape, or the like. Refer to FIG. 14C, a detected scene is a terminal-building scene. For example, in the intensity control, the control 1 is ring-shaped, and the control 2 is a ring-shaped black dot. In response to that the user touches and controls the control 2 move to a position 1 of the control 1, the position 1 represents the target processing intensity that is in the target mode and that is selected by the user. A control instruction 2 is sent to the left earphone and the right earphone, where the control instruction 2 indicates the target mode and the target processing intensity corresponding to the position 1.

Optionally, the target mode and the target processing intensity may be sent to the left earphone and the right earphone by using different control instructions. After determining the target mode based on the detected scene, the terminal device sends, to the left earphone and the right earphone, control signaling indicating the target mode. After receiving the control signaling indicating the target mode, the left earphone and the right earphone use default processing intensity in the target mode, that is, a default filtering coefficient in the target mode, to implement target processing corresponding to the target mode. In response to that the user touches and controls the control 2 to move to the position 1 of the control 1, control signaling indicating the target processing intensity is sent to the left earphone and the right earphone. Further, the left earphone and the right earphone use a filtering coefficient corresponding to the target processing intensity, to implement target processing corresponding to the target mode.

In another example, following the example in FIG. 14A, after the user triggers an option control for enabling the smart scene detection function, the user triggers the smart scene detection function, performs scene detection to obtain a detection result, and changes, to an ANC function region, a position that is of a control for a processing function and that represents user selection. A position of a black dot on the ring may be a default value in the case of the ANC function or a position corresponding to processing intensity selected when the user selects the ANC function last time. The user can move the position of the black dot to select processing intensity in an ANC mode. Control signaling 2 is sent to the left earphone and the right earphone, where the control signaling 2 indicates the ANC mode and target processing intensity corresponding.

Example 4: Scene detection of the headset. Different scenes correspond to different processing functions.

The headset has a scene detection function. The headset identifies a scene in which the user is currently located. The headset implements different processing functions when types of detected scenes are different. The left earphone in the headset may have a scene detection function, the right earphone has a scene detection function, or both the left earphone and the right earphone have a scene detection function. For example, one of the left earphone and the right earphone is configured to perform scene detection. For example, the left earphone performs scene detection, and sends a detection result to the right earphone. In this case, both the left earphone and the right earphone perform, based on the detection result of the left earphone, processing for performing a processing function corresponding to the detection result. Alternatively, the right earphone performs scene detection, and sends a detection result to the left earphone. In this case, both the left earphone and the right earphone perform, based on the detection result of the right earphone, processing for performing a processing function corresponding to the detection result. In another example, both the left earphone and the right earphone perform scene detection, the left earphone performs, based on a detection result of the left earphone, processing for performing a processing function corresponding to the detection result, the right earphone performs, based on a detection result of the right earphone, processing for performing a processing function corresponding to the detection result.

In a possible implementation, enabling of the scene detection function of the headset may be controlled by the user by using the headset or by using the terminal device.

In a manner, a button for enabling the scene detection function is disposed on the headset. The user touches and controls the button to enable or disable the scene detection function of the headset. After the scene detection function of the headset is enabled, the headset identifies a scene in which the user is currently located (or a scene in which the headset is currently located), and determines, based on a correspondence between a scene and a processing mode, a processing mode corresponding to the identified scene, to perform a processing function corresponding to the processing mode.

In another manner, the user taps the headset, for example, taps the headset three times consecutively, to enable or disable the scene detection function of the headset. When the scene detection function of the headset is disabled, the headset enables the scene detection function of the headset in response to an operation of tapping the headset three times by the user. When the scene detection function of the headset is enabled, the headset disables the scene detection function of the headset in response to an operation of tapping the headset three times by the user. After the scene detection function of the headset is enabled, the headset identifies a scene in which the user is currently located (or a scene in which the headset is currently located), and determines, based on a correspondence between a scene and a processing mode, a processing mode corresponding to the identified scene, to perform a processing function corresponding to the processing mode.

In still another manner, enabling of the scene detection function of the left earphone or the right earphone is controlled by the terminal device 100. For example, a headset control interface includes an on/off button for the headset scene detection function. The terminal device may determine, based on a user requirement, whether to enable the scene detection function of the headset. When the scene detection function of the headset is not enabled, a processing function that needs to be implemented by the headset may be manually selected by using Example 1. After the scene detection function of the headset is enabled, the headset identifies a scene type of a current external environment, and determines, based on a correspondence between a scene type and a processing mode, a processing mode corresponding to the identified scene type, to perform a processing function corresponding to the processing mode. The terminal device 100 sends control signaling 3 to the headset 200 in response to enabling the scene detection function of the headset by the user, where the control signaling 3 indicates the headset to enable the scene detection function. The headset 200 starts to perform scene detection based on the control signaling 3. The headset 200 determines, based on the detected scene type of the current external environment, the processing function that needs to be implemented, for example, an ANC function. In this case, the headset 200 performs ANC processing, and performs S501 to S504.

In another possible implementation, the headset starts scene detection after the headset establishes a connection to the terminal device, or the headset starts scene detection when the headset receives a downlink audio signal sent by the terminal device.

In Example 4, in an example, the headset may further send a detection result to the terminal device after performing detection. For example, the detection result may be included in indication information and sent to the terminal device. The detection result may include a detected scene and a processing mode corresponding to the scene. The terminal device displays the detection result to the user when receiving the detection result, so that the user learns of the processing mode used for the headset. For example, the detection result is displayed to the user in a form of a prompt box. Optionally, the detection result may include only a detected scene. After receiving the detection result, the terminal device determines a processing mode corresponding to the scene detected by the headset, and displays, to the user, the scene detected by the headset and the processing mode corresponding to the scene. For example, when identifying that the scene is a first scene, the headset determines a target mode that corresponds to the first scene and that is in processing modes of the headset, and may display a detection result, that is, the first scene and the target mode, to the user.

In another example, after performing detection, the headset sends a detection result to the terminal device instead of immediately performing a processing function for a processing mode corresponding to a scene, and the terminal device displays the detection result to the user. The terminal device sends a confirmation instruction to the headset in response to an operation of determining a processing mode by the user. When receiving the confirmation instruction, the headset performs a processing function by using the processing mode corresponding to the scene detected by the headset.

For example, the scene type that can be identified by the headset may include a walking scene, a running scene, a quiet scene, a multi-person speaking scene, a cafe scene, a subway scene, a train scene, a car scene, a waiting-hall scene, a dialog scene, an office scene, an outdoor scene, a driving scene, a strong-wind scene, an airplane scene, an alarm-sound scene, a horn sound scene, a crying sound scene, and the like.

In an example, processing modes applicable to different scene types are listed. Information in a bracket corresponding to each of the following scenes indicates a processing mode corresponding to the scene type: the walking scene (HT), the running scene (HT), the quiet scene (HT), the multi-person speaking scene (ANC), the cafe scene (ANC), the subway scene (AH), the train scene (ANC), the waiting-hall scene (AH), the dialog scene (AH), the office scene (ANC), the outdoor scene(ANC), the driving scene (ANC), the strong-wind scene (ANC), the airplane scene (ANC), the alarm-sound scene (AH), the horn sound scene (AH), the crying sound scene (AH), and another scene. For example, in the airplane scene, noise is large when an airplane is flying. Therefore, the ANC mode is suitable. For another example, the HT mode is applicable to the walking scene, the running scene, and the quiet scene, to hear a sound of an emergency event. For another example, quietness is required for a user in the cafe scene. Therefore, the ANC mode may be used. For another example, the HT mode may be used in a light-music scene. For another example, a preset sound needs to be heard in the alarm-sound scene (AH), the horn sound scene (AH), and the crying sound scene (AH). Therefore, the AH mode is suitable.

In an example, in the airplane scene, when it is identified that the scene type is the airplane scene, it is determined to use the ANC mode, and the left earphone and the right earphone separately perform processing in S501 to S504.

In another example, in the walking scene, when it is identified that the scene type is the walking scene, it is determined to use the HT mode, and the left earphone and the right earphone separately perform processing in S601 to S605.

In still another example, in the railway station scene, when it is identified that the scene type is the railway station scene, it is determined to use the AH mode, and the left earphone and the right earphone separately perform processing in S801 to S807.

In a manner in which the headset performs scene detection, the target processing intensity in the target mode may be determined in any one of the following manners.

Manner 1: The headset uses default target processing intensity in the target mode.

The headset (the left earphone or the right earphone) determines, based on the detected scene, that a used processing mode is the target mode, and the left earphone and the right earphone determine to use the default target processing intensity. For example, the target mode is an ANC mode. The left earphone and the right earphone obtain a default FF filtering coefficient and a default FB filtering coefficient in the ANC mode.

Manner 2: Processing intensity used when the target mode is used last time is used as the target processing intensity.

In an example, the headset (the left earphone or the right earphone) determines the processing intensity in the target mode. After the headset performs scene detection and determines the target mode based on a detected scene, the headset obtains, as the target processing intensity, saved processing intensity used when the target mode is used last time. For example, the target mode is ANC, and a saved FF filtering coefficient and a saved FB filtering coefficient that are used when the ANC mode is used last time are obtained for ANC processing.

In another example, the terminal device determines the target processing intensity, and indicates the target processing intensity to the left earphone and the right earphone by using control signaling. The headset sends a detection result to the terminal device after performing scene detection, so that the terminal device obtains, as the target processing intensity, processing intensity used when the target mode is used last time, and separately sends control signaling 4 to the left earphone and the right earphone, where the control signaling 4 indicates the target processing intensity.

Manner 3: The headset determines the target processing intensity based on the identified scene.

The headset may determine the target processing intensity based on the identified scene after identifying the scene.

In an example, processing modes determined in different scenes are the same, but different scenes correspond to different processing intensity. For example, an HT mode is applicable to each of the following scenes: a walking scene, a running scene, and a quiet scene. The walking scene, the running scene, and the quiet scene correspond to different processing intensity when the HT mode is used. For another example, an ANC mode is applicable to each of the following scenes: a multi-person speaking scene, a cafe scene, a train scene, an airplane scene, a strong-wind scene, and an office scene. The multi-person speaking scene, the cafe scene, the train scene, the airplane scene, the strong-wind scene, and the office scene correspond to different processing intensity when the ANC mode is used. For another example, an AH mode is applicable to each of the following scenes: a dialog scene, an alarm-sound scene, a horn sound scene, and a crying sound scene. The dialog scene, the alarm-sound scene, the horn sound scene, and the crying sound scene correspond to different processing intensity when the AH mode is used.

Based on this, the left earphone and the right earphone determine, based on a stored correspondence among a scene type, a target mode, and processing intensity, a target mode corresponding to a detected scene and target processing intensity in the target mode. In this case, the left earphone and the right earphone obtain a filtering coefficient corresponding to the target processing intensity. For example, the target mode is AH. An FF filtering coefficient, an FB filtering coefficient, and an HT filtering coefficient are determined based on target processing intensity, and S801 to S807 are performed based on the FF filtering coefficient, the FB filtering coefficient, and the HT filtering coefficient.

In another example, in different scenes, the headset may further perform event detection to determine a target event (or a target event scene). The emergency event includes, for example, one or more of the following events: a wind noise event, a howling event, an emergency event, a human voice event, or no emergency event. Different events correspond to different processing intensity. The headset performs scene detection and event detection. In the target mode, different events correspond to different filtering coefficients. ANC is used as an example. Different events correspond to different FF filtering coefficients and/or different FB filtering coefficients. For example, in an ANC mode, the left earphone may obtain an FF filtering coefficient or an FB filtering coefficient from a coefficient library based on a detection result after the left earphone or the right earphone performs scene and event detection, where the FF filtering coefficient or the FB filtering coefficient corresponds to an event detected when the ANC function is implemented. The coefficient library stores a mapping relationship among a processing mode, an event, an FF filtering coefficient, and an FB filtering coefficient. Good or bad ANC processing effect mainly relies on FB filtering and/or FF filtering. For example, a filtering coefficient of an FF filter is controlled based on a detected scene, and an FB filtering coefficient is a fixed value. For another example, a filtering coefficient of an FB filter is controlled based on a detected scene, and an FF filtering coefficient is a fixed value. For still another example, an FF filtering coefficient and an FB filtering coefficient are controlled based on a detected scene. Table 2 shows an example in which events include a howling event, a wind noise event, an emergency event, a human voice event, or no emergency event.

TABLE 2

| Processing mode | Event | FF filtering coefficient | FB filtering coefficient | HT filtering coefficient |
|---|---|---|---|---|
| ANC | Howling event | Coefficient FF1 | Coefficient FB1 | |
| | Wind noise event | Coefficient FF2 | Coefficient FB2 | |
| | emergency event | Coefficient FF3 | Coefficient FB3 | |
| | No emergency event | Coefficient FF4 | Coefficient FB4 | |
| | Human voice event | Coefficient FF5 | Coefficient FB5 | |
| HT | Howling event | NA | Coefficient FB6 | Coefficient HT1 |
| | Wind noise event | NA | Coefficient FB7 | Coefficient HT2 |
| | emergency event | NA | Coefficient FB8 | Coefficient HT3 |
| | No emergency event | NA | Coefficient FB9 | Coefficient HT4 |
| | Human voice event | NA | Coefficient FB10 | Coefficient HT5 |
| AH | Howling event | Coefficient FF6 | Coefficient FB11 | Coefficient HT6 |
| | Wind noise event | Coefficient FF7 | Coefficient FB12 | Coefficient HT7 |
| | emergency event | Coefficient FF8 | Coefficient FB13 | Coefficient HT8 |
| | No emergency event | Coefficient FF9 | Coefficient FB14 | Coefficient HT9 |
| | Human voice event | Coefficient FF10 | Coefficient FB15 | Coefficient HT10 |

For example, the headset 200 detects an event sound in an external environment, and may determine, based on a signal collected by the reference microphone, a target event corresponding to the event sound in the external environment. For example, if the signal collected by the reference microphone includes a signal with a preset spectrum, an event corresponding to the signal with the preset spectrum is determined. For example, for a wind noise event, if the signal collected by the reference microphone includes a wind sound signal, that is, the collected signal includes a signal matching a spectrum of a wind sound, it is determined that the event corresponding to the detected event sound in the external environment is the wind noise event. When it is determined that the signal collected by the reference microphone includes the signal with the preset spectrum, a spectrum matching manner may be used, or a deep neural network (DNN) matching manner may be used.

Figure 15:
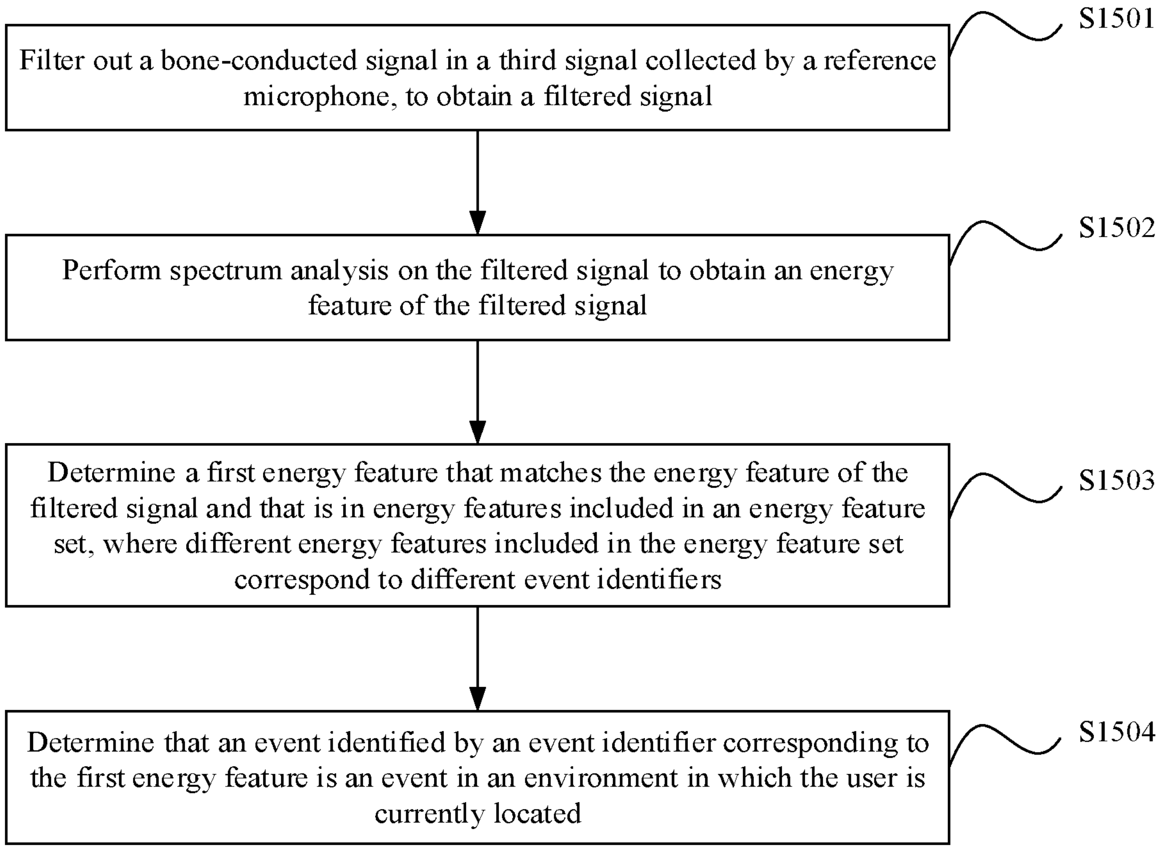
FIG. 15 is a schematic diagram of event detection according to an embodiment of this disclosure.

For example, the headset 200 may determine, in the following manner based on the signal collected by the reference microphone, an event in an environment in which the user is currently located, as shown in FIG. 15. The headset 200 further includes a bone conduction sensor. The bone conduction sensor is configured to collect a bone-conducted signal of the headset user. When the user wears the headset 200 and makes a sound, for example, speaks or sings, the bone conduction sensor collects a bone-conducted signal, that is, collects a periosteum vibration signal generated when the user speaks, to obtain the bone-conducted signal.

Enabling of the scene detection function of the left earphone or the right earphone may be controlled by the terminal device 100, or may be controlled by performing an operation on the headset by the user, for example, tapping the left earphone or the right earphone. Alternatively, the headset includes a bone conduction sensor, and a tooth touch sound is generated when the upper and lower teeth of the user touch, so that the bone conduction sensor enables a scene detection function by detecting an audio signal generated when the upper and lower teeth of the user touch.

S1501: Filter out a bone-conducted signal in a third signal collected by the reference microphone, to obtain a filtered signal that is a signal AA1.

In step S1501, the third signal collected by the reference microphone is a signal collected by the reference microphone after the headset enables the scene detection function.

It should be understood that energy of the bone-conducted signal collected by the bone conduction sensor is small when the user makes no sound, for example, does not speak or sing when wearing the headset. For example, when the energy of the bone-conducted signal is less than a specified threshold, S1501 may not need to be performed, in this case, the signal AA1 is the third signal. In an example, the headset 200 may first determine the energy of the bone-conducted signal. If the energy of the bone-conducted signal is less than the specified threshold, a filtering operation, that is, S1501, is not performed. When it is determined that the energy of the bone-conducted signal is greater than or equal to the specified threshold, S1501 is performed.

S1502: Perform spectrum analysis on the filtered signal to obtain an energy feature of the filtered signal.

That is, the headset 200 performs spectrum analysis on the signal AA1 to obtain the energy feature of the signal AA1. For example, the headset 200 performs spectrum analysis on the signal to obtain energy of an entire frame of the signal AA1 and energy of each bark subband of the signal AA1, so as to constitute energy features of the signal AA1 that are represented by a vector.

S1503: Determine a first energy feature that matches the energy feature of the filtered signal and that is in energy features included in an energy feature set, where different energy features included in the energy feature set correspond to different event identifiers.

S1504: Determine that an event identified by an event identifier corresponding to the first energy feature is an event in the environment in which the user is currently located, that is, a detection result of event detection.

In an example, the energy feature set may be generated in the following manner: performing wind noise detection, burst-noise detection, howling detection, and human voice detection on signals collected by the first microphone, the second microphone, and the third microphone, to obtain a wind noise signal, a burst-noise signal, and a howling signal, separately performing spectrum analysis on the wind-noise signal, the burst-noise signal, the howling signal, and the human voice signal, to obtain a subband energy feature of the wind noise signal, a subband energy feature of the burst-noise signal, a subband energy feature of the howling signal, and a subband energy feature of the human voice signal, and constituting the energy feature set by the subband energy feature of the wind noise signal, the subband energy feature of the burst-noise signal, the subband energy feature of the howling signal, and the subband energy feature of the human voice signal. It should be understood that in a quiet scene, energy of a subband of a noise is weak.

Optionally, when the first energy feature that matches the energy feature of the filtered signal and that is in the energy features included in the energy feature set is determined, a spectrum matching manner may be used, or a DNN matching manner may be used. For example, when the DNN matching manner is used, a degree of matching between the energy feature of the filtered signal and each energy feature included in the energy feature set may be determined by using the DNN, and an event identified by an event identifier corresponding to the first energy feature with a highest matching degree is the detection result.

In this embodiment of this disclosure, the main control unit in the headset 200 may determine, based on the signal collected by the reference microphone, the event in the environment in which the user is currently located. For example, the main control unit includes a DSP, and the DSP is configured to perform S1501 to S1504.

Manner 4: The user indicates, to the headset by using a UI control provided by the terminal device, the processing intensity used in the target mode.

Figure 16:
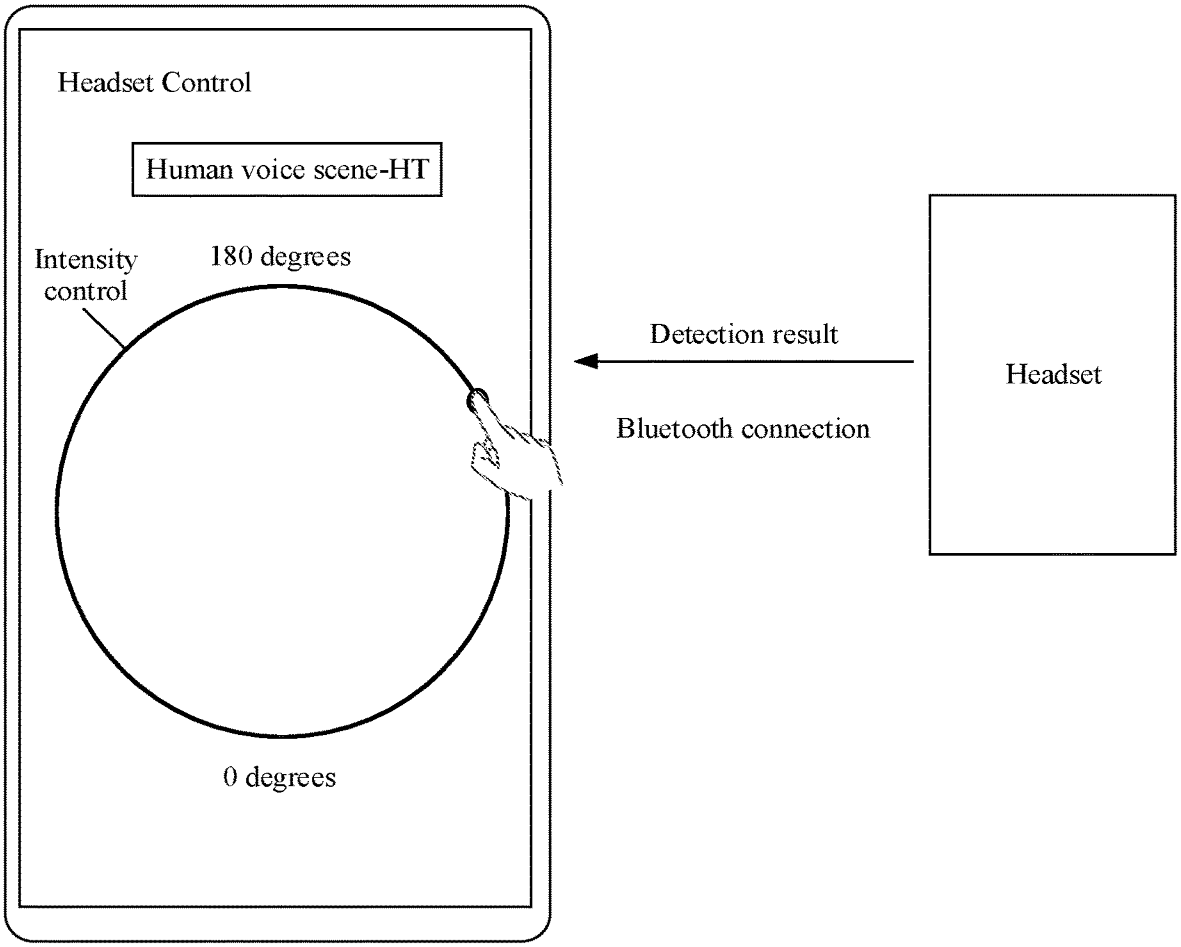
FIG. 16 is a schematic diagram of a processing mode and processing intensity of exchange between a terminal device and a headset according to an embodiment of this disclosure.

In an example, after performing scene detection, the headset sends a detection result to the terminal device, and the terminal device displays the detection result to the user. The detection result is displayed on a display interface of the terminal device, and the detection result includes a scene detected by the headset and a target mode corresponding to the detected scene. The display interface further includes a control for selecting processing intensity. For ease of description, the control for selecting processing intensity is referred to as an intensity control. The intensity control may include a control 1 and a control 2. Different positions of the control 1 indicate different processing intensity in the target mode. The intensity control may be of a ring shape or a bar shape, or the like. FIG. 16 shows an example in which the intensity control is ring-shaped. In response to that the user touches and controls a control 2 to move to a position 2 of the control 1, the position 2 represents the target processing intensity that is in the target mode and that is selected by the user. A control instruction 5 is sent to the left earphone and the right earphone, where the control instruction 5 indicates the target processing intensity corresponding to the position 2. FIG. 16 shows an example in which the target mode is HT.

In an example, the terminal device 100 sends control signaling 3 to the headset 200 in response to enabling the scene detection function of the headset by the user, where the control signaling 3 indicates the headset to enable the scene detection function. The headset 200 starts to perform scene detection based on the control signaling 3, to obtain a detection result. The headset 200 may send the detection result to the terminal device 100, so that the terminal device 100 displays the detection result to the user, and displays, to the user, a processing mode that corresponds to a detected scene and that needs to be used for the headset.

Further, after the user enables the headset scene detection function, an interface on which the processing mode is manually selected may be updated to another interface, or a detection result may be displayed on an interface on which a processing function is manually selected.

Figure 17A:
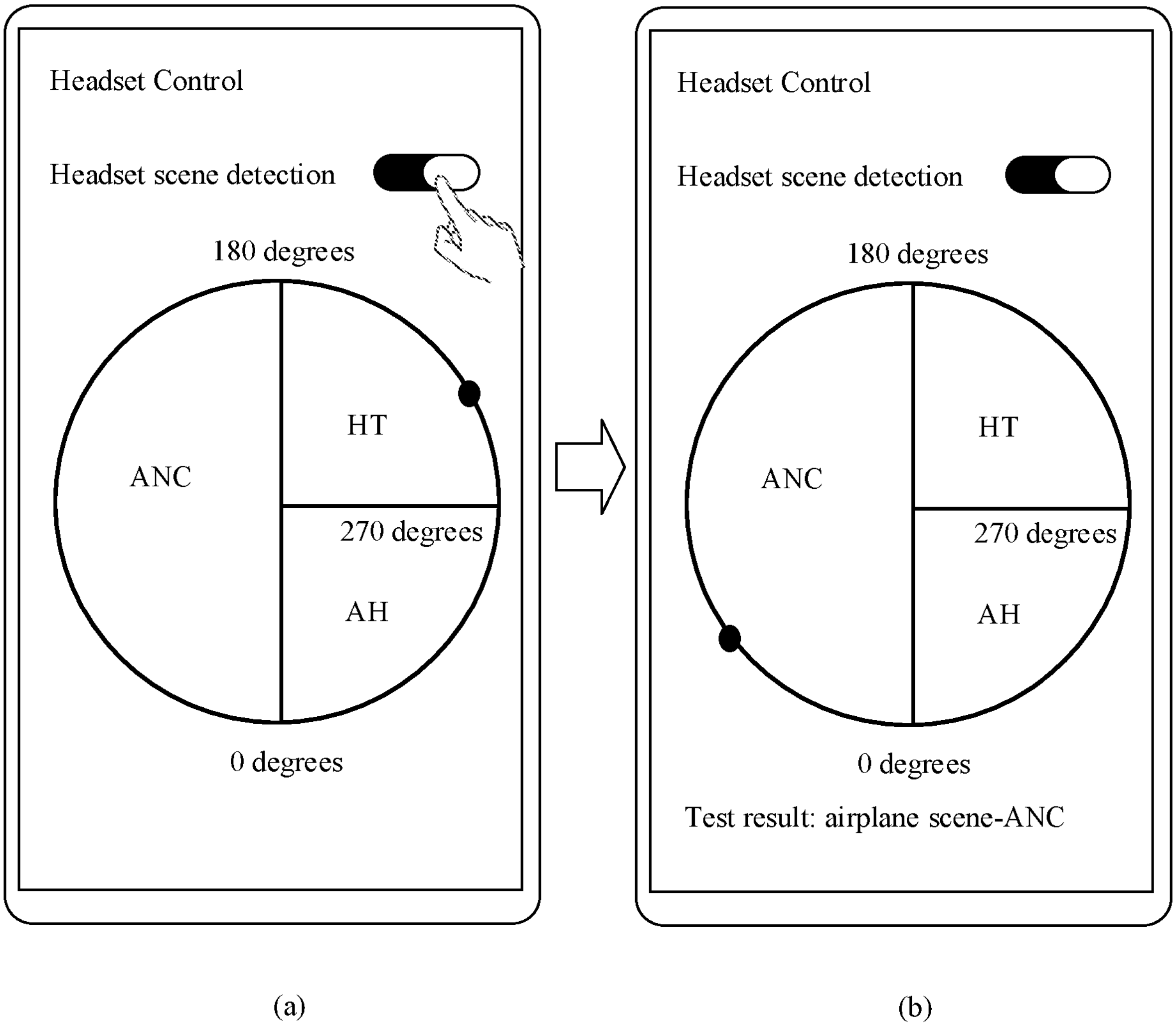
FIG. 17A is a schematic diagram of displaying a scene detection result according to an embodiment of this disclosure.

For example, before the user enables the headset scene detection function, a processing function selected by the user on the terminal device is an HT function. After the headset scene detection function is enabled, the headset 200 identifies that a scene in which the user is currently located is an airplane scene and an ANC function is suitable to be used, and sends a detection result, that is, the airplane scene and the ANC function, to the terminal device. In an example, the user starts the headset application, and displays a control interface of the headset application on the display. A ring is used as an example. A processing function selected by the user is an HT function, as shown in (a) of FIG. 17A. The control interface includes an option control indicating whether to enable a headset scene detection function. After the user triggers the option control for enabling the headset scene detection function, the terminal device triggers the headset scene detection function, and sends control signaling 3 to the headset 200. The control signaling 3 indicates the headset to enable the scene detection function. The headset 200 starts to perform scene detection based on the control signaling 3, to obtain a detection result. The headset 200 sends the detection result to the terminal device 100. After receiving the detection result, the terminal device 100 changes, to an ANC function region, a position that is of a control for a processing function and that represents user selection. The user moves a position of a black dot on the ring to select processing intensity in an ANC mode, for example, as shown in (b) of FIG. 17A. (b) of FIG. 17A shows an example in which an airplane scene is detected.

Figure 17B:
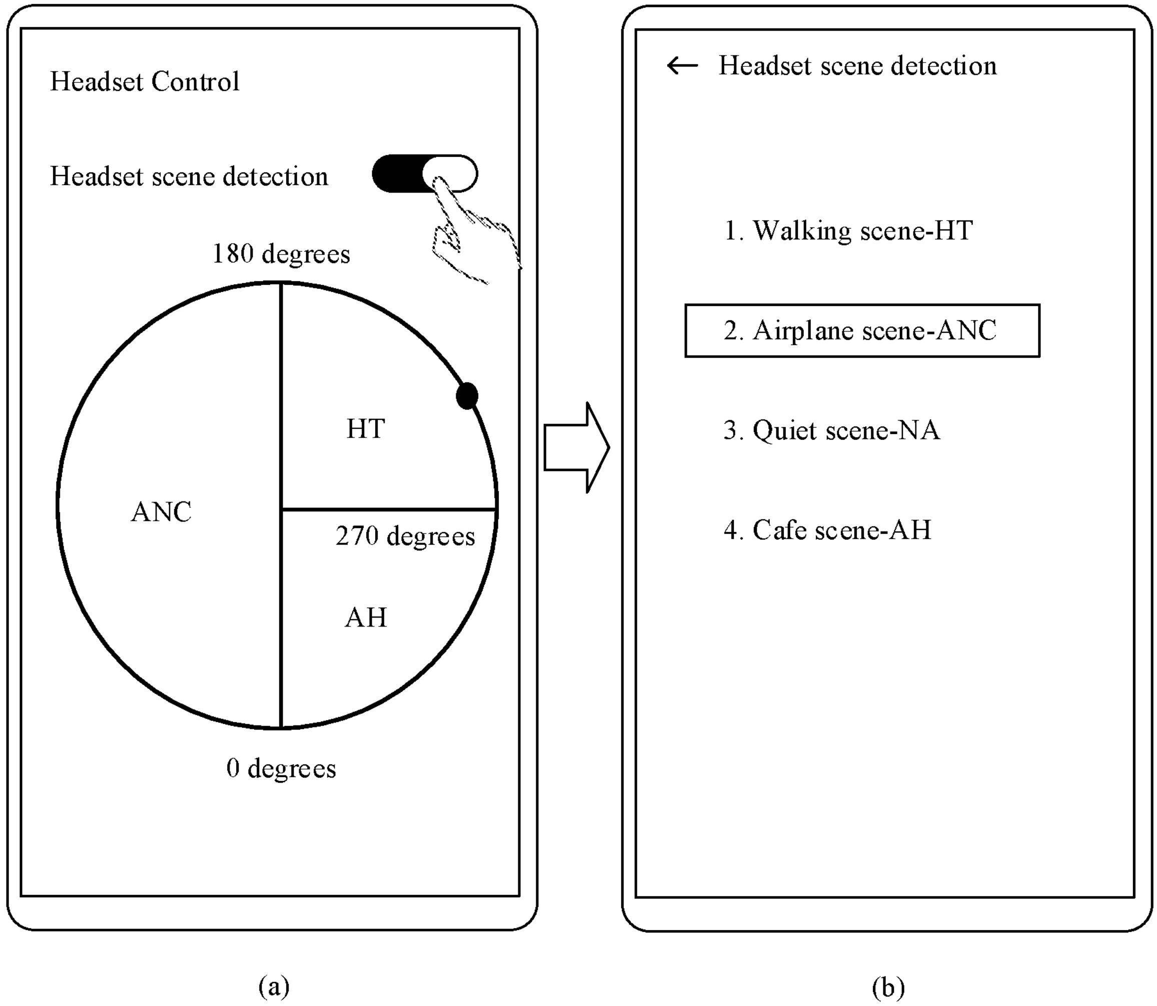
FIG. 17B is another schematic diagram of displaying a scene detection result according to an embodiment of this disclosure.

In another example, the user starts the headset application, and displays a control interface of the headset application on the display. A ring is used as an example. A processing function selected by the user is an HT function, as shown in (a) of FIG. 17B. The control interface includes an option control indicating whether to enable a headset scene detection function. After the user triggers the option control for enabling the headset scene detection function, the terminal device triggers the headset scene detection function, and sends control signaling 3 to the headset 200. The control signaling 3 indicates the headset to enable the scene detection function. The headset 200 starts to perform scene detection based on the control signaling 3, to obtain a detection result. The headset 200 sends the detection result to the terminal device 100. The terminal device 100 displays the detection result on a detection result interface after receiving the detection result. The detection interface may further include a scene that can be identified by the headset and a processing mode corresponding to the scene. The user moves a position of a black dot on the ring to select processing intensity in an ANC mode. For example, refer to (b) of FIG. 17B. A detection result is an airplane scene, and a corresponding processing mode is an ANC mode.

Figure 18:
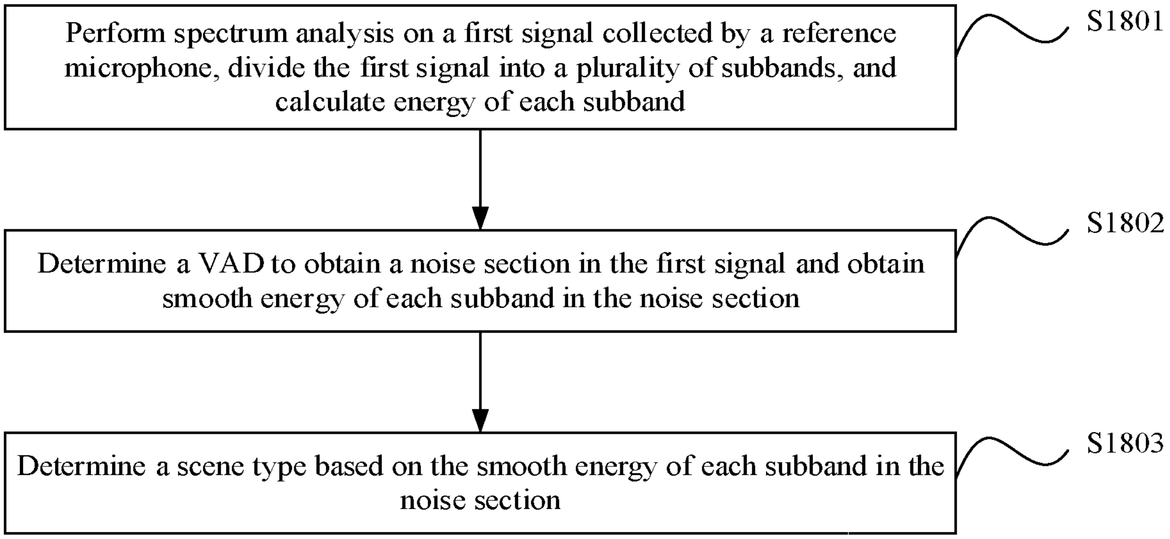
FIG. 18 is a schematic diagram of scene detection according to an embodiment of this disclosure.

For example, when the headset 200 detects a scene, in a manner, detection classification may be performed by using an AI model. The AI model can be configured in the headset. In another manner, a scene type may be determined based on the signal collected by the reference microphone. For example, the headset 200 may determine, in the following manner based on the signal collected by the reference microphone, a scene in which the user is currently located, as shown in FIG. 18.

S1801: Perform spectrum analysis on a first signal collected by the reference microphone, divide the first signal into a plurality of subbands, and calculate energy of each subband. For example, the first signal collected by the reference microphone is divided into subbands in frequency domain according to a bark subband division method, and the energy of each subband is calculated.

S1802: Determine a VAD to obtain a noise section in the first signal and obtain smooth energy of each subband in the noise section.

In an example, a VAD determining manner is as follows: calculating a cross-correlation between the signal of the reference microphone and a signal of a calling microphone to obtain a cross-correlation coefficient A, calculating an autocorrelation coefficient B of the reference microphone, and when A<alpha (a first threshold) and B<beta (a second threshold), determining that a signal section corresponding to the VAD is the noise segment, otherwise, determining that a signal section corresponding to the VAD is a speech segment.

S1803: Determine a scene type based on the smooth energy of each subband in the noise section.

In an example, determining a quiet scene, a low-frequency heavy-noise scene, and a human voice scene is used as an example. The following processing is performed on the determined noise section to determine the scene type:

(1) Calculate an average energy value C of 50 Hz-1 kHz subbands in the noise section, an average energy value D of 1-2 kHz subbands, and an average energy value E of 2-3 kHz subbands, and if C/D/E is less than a threshold gamma for N consecutive frames, determine the scene type as the quiet scene.

(2) When a=D/C, if a is less than a threshold t, both C and D are greater than a threshold k, and M consecutive frames meet that a is less than the threshold t and that both C and D are greater than the threshold k, determine the scene type as the low-frequency heavy-noise scene.

(3) Determine the scene type as the human voice (or music) scene if a is greater than the threshold k and P consecutive frames are not noise frames.

Example 5: The headset performs event detection in the processing mode after determining the processing mode. In the processing mode, different events correspond to different filtering coefficients (that is, processing intensity in the processing mode).

The headset identifies an operation of the user, and determines that the headset 200 selected by the user needs to implement ANC processing, HT processing, or AH processing. For example, a processing mode used for the headset 200 is an ANC mode. In a possible manner, the operation of the user may be an operation of tapping the headset by the user, and it is determined, based on different operations, that the processing mode is an ANC mode, an HT mode, or an AH mode. In another possible manner, buttons are disposed on the headset, and different buttons indicate different processing modes. The user presses a button to select the processing mode used for the headset. For example, after the headset 200 receives an operation instruction that is for the ANC mode and that is triggered by the user, the left earphone and the right earphone perform ANC processing, and perform S501 to S504. In still another possible manner, selection of a processing mode that needs to be implemented by the headset is controlled by the terminal device 100.

The left earphone or the right earphone may have an event detection function. In an example, one of the left earphone and the right earphone is configured to perform event detection. For example, the left earphone performs event detection and sends a detection result to the right earphone, or the right earphone performs event detection and sends a detection result to the left earphone. In the ANC mode, different events correspond to different FF filtering coefficients and different FB filtering coefficients. For example, the left earphone may obtain an FF filtering coefficient or an FB filtering coefficient from a coefficient library based on a detection result after the left earphone or the right earphone performs event detection, where the FF filtering coefficient or the FB filtering coefficient corresponds to a detected event in the ANC mode. For example, refer to content included in the coefficient library shown in Table 2. For example, the event includes a howling event, a wind noise event, an emergency event, or a human voice event.

It may be understood that, to perform the functions in the foregoing method embodiments, the headset includes corresponding hardware structures and/or software modules for performing the functions. A person skilled in the art should be easily aware that, with reference with modules and method steps in the examples described in embodiments disclosed in this disclosure, this disclosure can be implemented by hardware or a combination of hardware and computer software. Whether a function is performed by hardware or hardware driven by computer software depends on particular application scenarios and design constraints of the technical solutions.

Figure 19:
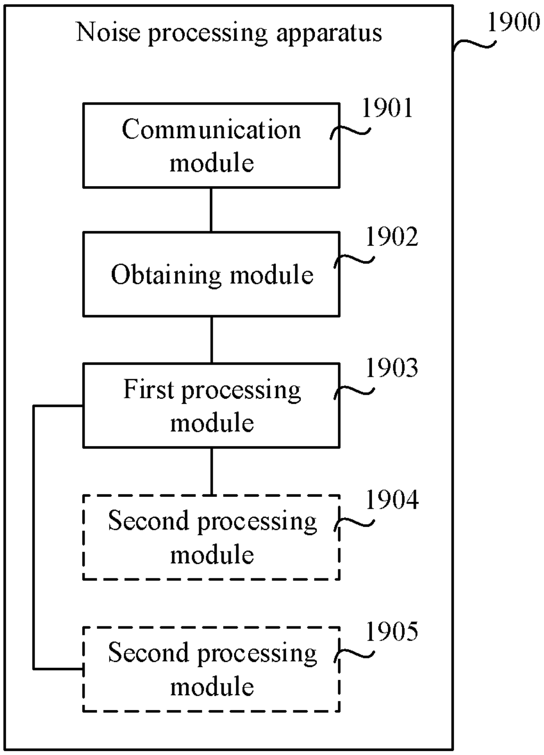
FIG. 19 is a schematic diagram of a structure of a noise processing apparatus according to an embodiment of this disclosure.

Based on a same idea as the foregoing methods, as shown in FIG. 19, an embodiment of this disclosure further provides a noise processing apparatus 1900. The noise processing apparatus 1900 is used in a headset. The headset has at least two of the following functions: an ANC function, an HT function, or an AH function. The headset includes a first microphone and a second microphone. The first microphone is configured to collect a first signal, where the first signal is used to represent a sound in a current external environment. The second microphone is configured to collect a second signal, where the second signal is used to represent an ambient sound in an ear canal of a user wearing the headset. The noise processing apparatus 1900 may be configured to perform the functions of the headset in the foregoing method embodiments, and therefore can achieve the beneficial effects of the foregoing method embodiments. The apparatus may include a communication module 1901, an obtaining module 1902, and a first processing module 1903.

The communication module 1901 is configured to receive a first audio signal from the terminal device.

The obtaining module 1902 is configured to obtain a target mode. The target mode is determined based on a scene type of the current external environment, the target mode indicates the headset to perform a target processing function, and the target processing function is one of the following functions: the ANC function, the HT function, or the AH function.

The first processing module 1903 is configured to obtain a second audio signal based on the target mode, the first audio signal, the first signal, and the second signal.

In a possible implementation, the apparatus further includes: a playing module configured to play the second audio signal. The playing module is not shown in FIG. 19.

In a possible implementation, the target processing function is the ANC function, and the second audio signal played by the playing module can weaken perception of the user on the sound in the environment in which the user is currently located and on the ambient sound in the ear canal of the user.

Alternatively, the target processing function is the HT function, and the second audio signal played by the playing module can enhance perception of the user on a sound in an environment in which the user is currently located.

Alternatively, the target processing function is the AH function, the second audio signal played by the playing module can enhance perception of the user on an event sound, and the event sound meets a preset spectrum.

In a possible implementation, when the target processing function is the ANC function, the second audio signal is obtained based on the first audio signal, a third signal, and a fourth signal, where the third signal is an antiphase signal of the first signal, and the fourth signal is an antiphase signal of the second signal, when the target processing function is the HT function, the second audio signal is obtained based on the first audio signal, the first signal, and the second signal, or when the target processing function is the AH function, the second audio signal is obtained based on the first audio signal, a fifth signal, and a fourth signal, where the fifth signal is an event signal in the first signal, and the event signal meets a preset spectrum.

In a possible implementation, the communication module 1901 is further configured to receive a first control instruction from the terminal device, where the first control instruction carries the target mode, and the target mode is determined by the terminal device based on the scene type of the current external environment, and send the target mode to the obtaining module 1902.

In a possible implementation, the communication module 1901 is further configured to receive a second control instruction from the terminal device, where the second control instruction carries target processing intensity, and the target processing intensity indicates processing intensity at which the headset performs the target processing function.

The first processing module 1903 is further configured to obtain the second audio signal based on the target mode, the target processing intensity, the first audio signal, the first signal, and the second signal.

In a possible implementation, the apparatus further includes a second processing module 1904 configured to determine, based on the first signal, a target event corresponding to an event sound in the current external environment, and determine target processing intensity in the target mode based on the target event, where the target processing intensity indicates processing intensity at which the headset performs the target processing function.

The first processing module 1903 is further configured to obtain the second audio signal based on the target mode, the target processing intensity, the first audio signal, the first signal, and the second signal.

In a possible implementation, the headset further includes a bone conduction sensor, and the bone conduction sensor is configured to collect a bone-conducted signal generated when the vocal cord of the user vibrates.

The first processing module 1903 is further configured to determine, based on the first signal and the bone-conducted signal, the target event corresponding to the event sound in the current external environment.

In a possible implementation, the target event includes one of the following events: a howling event, a wind noise event, an emergency event, or a human voice event.

In a possible implementation, the apparatus further includes a third processing module 1905 configured to identify, based on the first signal, that the scene type of the current external environment is a target scene, and determine, based on the target scene, the target mode used by the headset, where the target mode is a processing mode corresponding to the target scene.

In a possible implementation, the target scene includes one of the following scenes: a walking scene, a running scene, a quiet scene, a multi-person speaking scene, a cafe scene, a subway scene, a train scene, a waiting-hall scene, a dialog scene, an office scene, an outdoor scene, a driving scene, a strong-wind scene, an airplane scene, an alarm-sound scene, a horn sound scene, or a crying sound scene.

In a possible implementation, the communication module 1901 is further configured to send indication information to the terminal device, where the indication information carries the target mode, and receive third control signaling from the terminal device, where the third control signaling includes target processing intensity in the target mode, and the target processing intensity indicates processing intensity at which the headset performs the target processing function.

The first processing module 1903 is further configured to obtain the second audio signal based on the target mode, the target processing intensity, the first audio signal, the first signal, and the second signal.

In a possible implementation, when the target processing function is the ANC function, larger target processing intensity indicates a weaker ambient sound in an ear canal of the user, and a weaker sound that is perceived by the user and that is in an environment in which the user is currently located, when the target processing function is the HT function, larger target processing intensity indicates larger intensity of a sound that is perceived by the user and that is in an environment in which the user is currently located, or when the target processing function is the AH function, higher target processing intensity indicates a stronger event sound included in a sound that is perceived by the user and that is in an environment in which the user is currently located.

In a possible implementation, the headset is a left earphone, or the headset is a right earphone.

In a possible implementation, the target mode indicates the headset to perform the ANC function. The first processing module 1903 is further configured to perform first filtering processing on the first signal to obtain a first filtering signal, filter out the first audio signal included in the second signal to obtain a first filtered signal, perform mixing processing on the first filtering signal and the filtered signal to obtain a third audio signal, perform third filtering processing on the third audio signal to obtain a fourth audio signal, and perform mixing processing on the fourth audio signal and the first audio signal to obtain the second audio signal.

In a possible implementation, a filtering coefficient used for first filtering processing is a filtering coefficient associated with the target processing intensity for first filtering processing in the case of the ANC function, or a filtering coefficient used for third filtering processing is a filtering coefficient associated with the target processing intensity for third filtering processing in the case of the ANC function.

In a possible implementation, the target mode indicates the headset to perform the HT function. The first processing module 1903 is further configured to perform first signal processing on the first signal to obtain a first processed signal, where first signal processing includes second filtering processing, perform mixing processing on the first processed signal and the first audio signal to obtain a fifth audio signal, perform filtering on the fifth audio signal included in the second signal to obtain a second filtered signal, perform third filtering processing on the second filtered signal to obtain a third filtered signal, and perform mixing processing on the third filtered signal and the fifth audio signal to obtain the second audio signal.

In a possible implementation, a filtering coefficient used for second filtering processing is a filtering coefficient associated with the target processing intensity for second filtering processing in the case of the HT function, or a filtering coefficient used for third filtering processing is a filtering coefficient associated with the target processing intensity for third filtering processing in the case of the HT function.

In a possible implementation, the target mode indicates the headset to perform the AH function. The first processing module 1903 is further configured to perform second filtering processing on the first signal to obtain a second filtering signal, and perform enhancement processing on the second filtering signal to obtain a filtering enhanced signal, perform first filtering processing on the first signal to obtain a first filtering signal, perform mixing processing on the filtering enhanced signal and the first audio signal to obtain a sixth audio signal, perform filtering on the sixth audio signal included in the second signal to obtain a fourth filtered signal, perform third filtering processing on the fourth filtered signal to obtain a fifth filtered signal, and perform mixing processing on the fifth filtered signal, the sixth audio signal, and the first filtering signal to obtain the second audio signal.

In a possible implementation, a filtering coefficient used for first filtering processing is a filtering coefficient associated with the target processing intensity for first filtering processing in the case of the AH function, a filtering coefficient used for second filtering processing is a filtering coefficient associated with the target processing intensity for second filtering processing in the case of the AH function, or a filtering coefficient used for third filtering processing is a filtering coefficient associated with the target processing intensity for third filtering processing in the case of the AH function.

It may be understood that, to perform the functions in the foregoing method embodiments, the terminal device includes corresponding hardware structures and/or software modules for performing the functions. A person skilled in the art should be easily aware that, with reference with modules and method steps in the examples described in embodiments disclosed in this disclosure, this disclosure can be implemented by hardware or a combination of hardware and computer software. Whether a function is performed by hardware or hardware driven by computer software depends on particular application scenarios and design constraints of the technical solutions.

Figure 20:
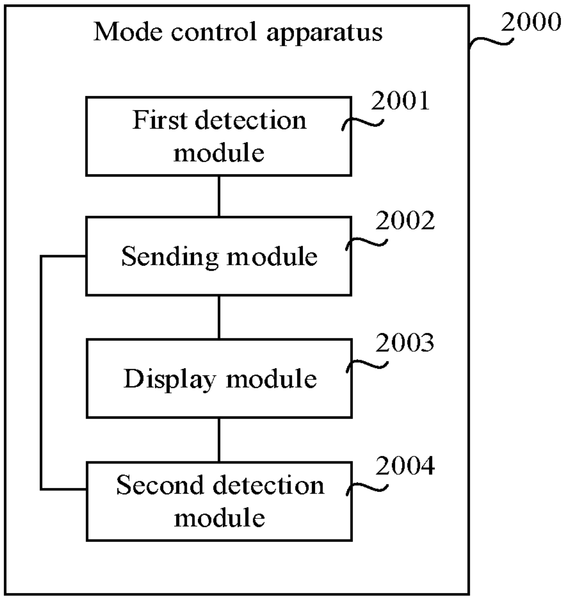
FIG. 20 is a schematic diagram of a structure of a mode control apparatus according to an embodiment of this disclosure.

Based on a same idea as the foregoing methods, as shown in FIG. 20, an embodiment of this disclosure further provides a mode control apparatus 2000. The mode control apparatus 2000 is used in the terminal device 100. The mode control apparatus 2000 may be configured to perform the functions of the terminal device in the foregoing method embodiments, and therefore can achieve the beneficial effects of the foregoing method embodiments.

The mode control apparatus 2000 includes a first detection module 2001 and a sending module 2002, and may further include a display module 2003 and a second detection module 2004.

The first detection module 2001 is configured to determine a target mode based on a target scene when it is identified that a scene type of a current external environment is the target scene.

The target mode is one of processing modes supported by a headset, different processing modes correspond to different scene types, and the processing modes supported by the headset include at least two of the following modes: an ANC mode, an HT mode, or an AH mode.

The sending module 2002 is configured to send the target mode to the headset, where the target mode indicates the headset to perform a processing function corresponding to the target mode.

In a possible implementation, the display module 2003 is configured to display result prompt information when the target mode is determined based on the target scene, where the result prompt information is used to prompt a user that the headset performs the processing function corresponding to the target mode.

In a possible implementation, the display module 2003 is configured to display selection prompt information before first control signaling is sent to the headset, where the selection prompt information indicates a user whether to adjust a processing mode of the headset to the target mode.

The second detection module 2004 is configured to detect an operation of selecting, by the user, the processing mode of the headset as the target mode.

In a possible implementation, the display module 2003 is further configured to display a first control and a second control, where different positions of the second control on the first control indicate different processing intensity in the target mode.

The second detection module 2004 is further configured to, before the sending module 2002 sends the first control signaling to the headset, detect an operation of touching and controlling, by the user, the second control to move to a first position on the first control, where the first position of the second control on the first control indicates target processing intensity in the target mode.

The sending module 2002 is further configured to send the target processing intensity to the headset, where the target processing intensity indicates processing intensity at which the headset performs the processing function corresponding to the target mode.

In a possible implementation, the first control is of a ring shape, and the user touches and controls the second control to move on the first control in a clockwise direction, and the processing intensity in the target mode changes in ascending order, or the user touches and controls the second control to move on the first control in an anticlockwise direction, and the processing intensity in the target mode changes in ascending order.

In a possible implementation, the first control is of a bar shape, and the user touches and controls the second control to move on the first control from top to bottom, and the processing intensity in the target mode changes in ascending order, the user touches and controls the second control to move on the first control from bottom to top, and the processing intensity in the target mode changes in ascending order, the user touches and controls the second control to move on the first control from left to right, and the processing intensity in the target mode changes in ascending order, or the user touches and controls the second control to move on the first control from right to left, and the processing intensity in the target mode changes in ascending order.

In a possible implementation, when the target processing function is an ANC function, larger target processing intensity indicates a weaker ambient sound in an ear canal of the user, and a weaker sound that is perceived by the user and that is in an environment in which the user is currently located, when the target processing function is an HT function, larger target processing intensity indicates larger intensity of a sound that is perceived by the user and that is in an environment in which the user is currently located, or when the target processing function is an AH function, higher target processing intensity indicates a stronger event sound included in a sound that is perceived by the user and that is in an environment in which the user is currently located.

Figure 21:
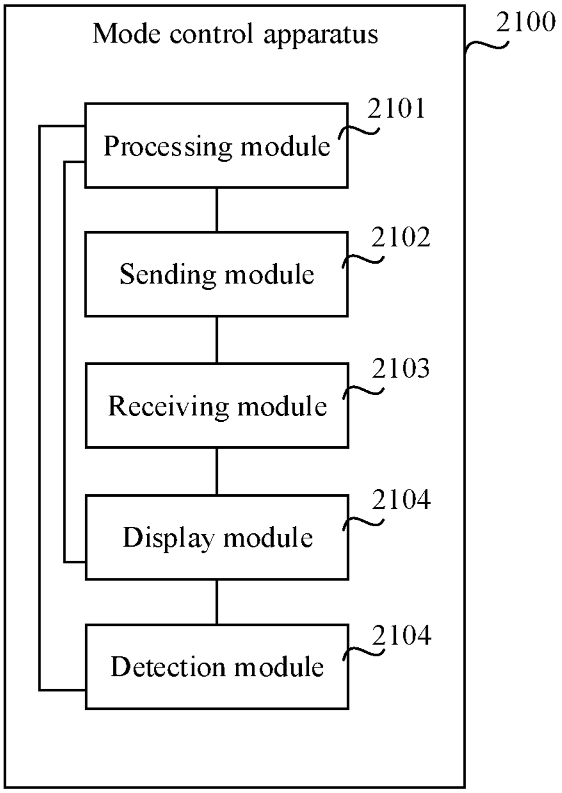
FIG. 21 is a schematic diagram of a structure of a mode control apparatus according to an embodiment of this disclosure.

Based on a same idea as the foregoing methods, as shown in FIG. 21, an embodiment of this disclosure further provides a mode control apparatus 2100. The mode control apparatus 2100 is used in the terminal device 100. The mode control apparatus 2100 may be configured to perform the functions of the terminal device in the foregoing method embodiments, and therefore can achieve the beneficial effects of the foregoing method embodiments. The mode control apparatus 2100 includes a processing module 2101, a sending module 2102, a receiving module 2103, a display module 2104, and a detection module 2105.

The processing module 2101 is configured to obtain a target mode, where the target mode is one of processing modes supported by a headset, and the processing modes supported by the headset include at least two of the following modes: an ANC mode, an HT mode, or an AH mode.

The processing module 2101 is further configured to determine target processing intensity in the target mode based on a scene type of a current external environment, where different scene types correspond to different processing intensity in the target mode.

The sending module 2102 is configured to send the target processing intensity to the headset, where the target processing intensity indicates processing intensity at which the headset performs a processing function corresponding to the target mode.

In a possible implementation, the receiving module 2103 is configured to receive the target mode sent by the headset.

In a possible implementation, the display module 2104 is configured to display a selection control, where the selection control includes the processing modes supported by the headset, and detect an operation of selecting, by a user, the target mode from the processing modes of the headset by using the selection control.

In a possible implementation, the display module 2104 is further configured to, before the processing module 2101 determines the target processing intensity in the target mode based on the scene type of the current external environment, display selection prompt information when the receiving module 2103 receives the target mode sent by the headset, where the selection prompt information indicates the user whether to adjust a processing mode of the headset to the target mode, and the detection module 2105 is configured to detect an operation of choosing, by the user, to adjust the processing mode of the headset to the target mode.

In a possible implementation, when the target processing function is an ANC function, larger target processing intensity indicates a weaker ambient sound in an ear canal of the user, and a weaker sound that is perceived by the user and that is in an environment in which the user is currently located, when the target processing function is an HT function, larger target processing intensity indicates larger intensity of a sound that is perceived by the user and that is in an environment in which the user is currently located, or when the target processing function is an AH function, higher target processing intensity indicates a stronger event sound included in a sound that is perceived by the user and that is in an environment in which the user is currently located.

Figure 22:
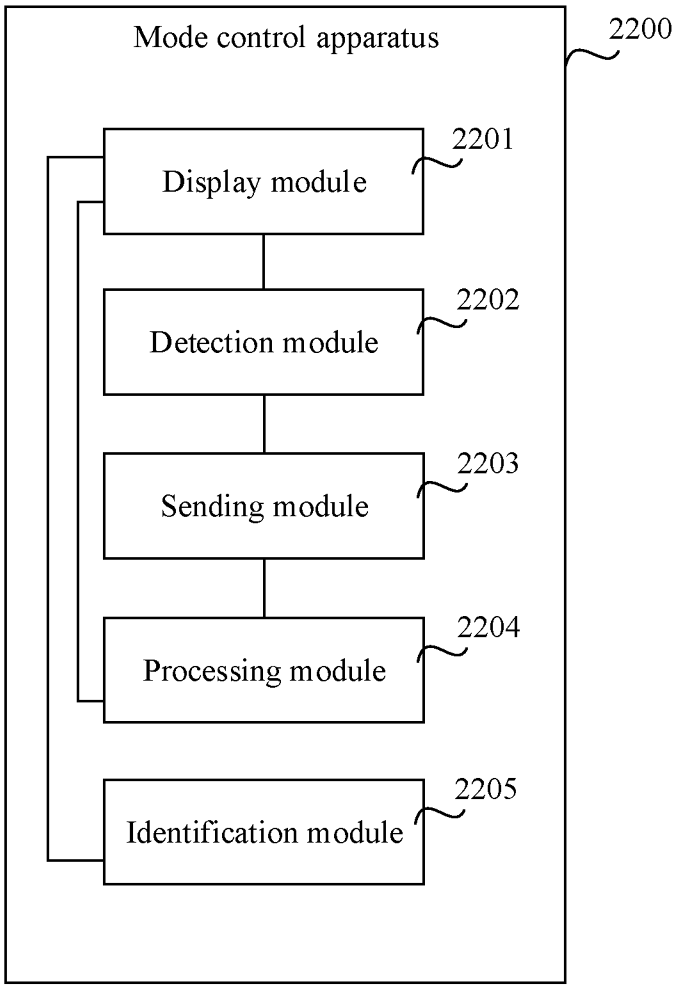
FIG. 22 is a schematic diagram of a structure of a mode control apparatus according to an embodiment of this disclosure.

Based on a same idea as the foregoing methods, as shown in FIG. 22, an embodiment of this disclosure further provides a mode control apparatus 2200. The mode control apparatus 2200 is used in the terminal device 100. The mode control apparatus 2200 may be configured to perform the functions of the terminal device in the foregoing method embodiments, and therefore can achieve the beneficial effects of the foregoing method embodiments. The mode control apparatus 2100 includes a display module 2201, a detection module 2202, a sending module 2203, a processing module 2204, and an identification module 2205.

The display module 2201 is configured to include a first selection control in the first interface, where the first selection control includes processing modes supported by a first target earphone and processing intensity corresponding to the processing modes supported by the first target earphone, and the processing modes of the first target earphone include at least two of the following modes: an ANC mode, an HT mode, or an AH mode.

The detection module 2202 is configured to detect a first operation performed by a user in the first interface, where the first operation is generated when the user selects, by using the first selection control, a first target mode from the processing modes supported by the first target earphone and selects processing intensity in the first target mode as first target processing intensity.

The sending module 2203 is configured to send the first target mode and the first target processing intensity to the first target earphone, where the first target mode indicates the first target earphone to perform a processing function corresponding to the first target mode, and the first target processing intensity indicates processing intensity at which the first target earphone performs the processing function corresponding to the first target mode.

In a possible implementation, the display module 2201 is further configured to display selection prompt information before displaying the first interface, where the selection prompt information is used by the user to choose whether to adjust a processing mode of the first target earphone.

The detection module 2202 is further configured to detect an operation of choosing, by the user, to adjust the processing mode of the first target earphone.

In a possible implementation, the identification module 2205 is configured to, before the display module 2201 displays the first interface, identify that a scene type of a current external environment is a target scene, where the target scene adapts to a scene type in which the processing mode of the first target earphone needs to be adjusted.

In a possible implementation, the identification module 2205 is configured to, before the display module 2201 displays the first interface, identify that the terminal device triggers the first target earphone to play audio.

In a possible implementation, the detection module 2202 is further configured to, before the display module displays the first interface, detect that the terminal device establishes a connection to the first target earphone.

In a possible implementation, before the display module 2201 displays the first interface, when detecting that the terminal device establishes a connection to the first target earphone, the detection module 2202 detects a second operation performed by the user on the home screen.

The home screen includes an icon of a first application, the second operation is generated when the user touches and controls the icon of the first application, and the first interface is a display interface of the first application.

In a possible implementation, the first selection control includes a first control and a second control, and any two different positions of the second control on the first control indicate two different processing modes of the first target earphone, or any two different positions of the second control on the first control indicate different processing intensity of the first target earphone in a same processing mode, and the first operation is generated when the user moves the second control to a first position in a region that corresponds to the first target mode and that is on the first control, where the first position corresponds to first target processing intensity in the first target mode.

In a possible implementation, the first control is of a ring shape, a ring includes at least two arc segments, and the second control is located in different arc segments to indicate different processing modes of the first target earphone, or the second control is located in different positions of a same arc segment to indicate different processing intensity of the first target earphone in a same processing mode, or the first control is of a bar shape, a bar includes at least two bar-shaped segments, and the second control is located in different bar-shaped segments to indicate different processing modes of the first target earphone, or the second control is located in different positions of a same bar-shaped segment to indicate different processing intensity of the first target earphone in a same processing mode.

In a possible implementation, the detection module 2202 is further configured to detect a third operation performed by the user in the first interface. The first interface further includes a second selection control, the second selection control includes processing modes supported by a second target earphone and processing intensity corresponding to the processing modes supported by the second target earphone, the processing modes supported by the first target earphone include at least two of the following modes: an ANC mode, an HT mode, or an AH mode, the third operation is generated when the user selects a second target mode from the processing modes of the second target earphone by using the second selection control, and selects processing intensity in the second target mode as second target processing intensity, and the second target earphone is a right earphone when the first target earphone is a left earphone, or the first target earphone is a right earphone and the second target earphone is a left earphone.

The sending module 2203 is further configured to send the second target mode and the second target processing intensity to the second target earphone. The second target mode indicates the second target earphone to perform a processing function corresponding to the second target mode, and the second target processing intensity indicates processing intensity at which the second target earphone performs the processing function corresponding to the second target mode.

Figure 23:
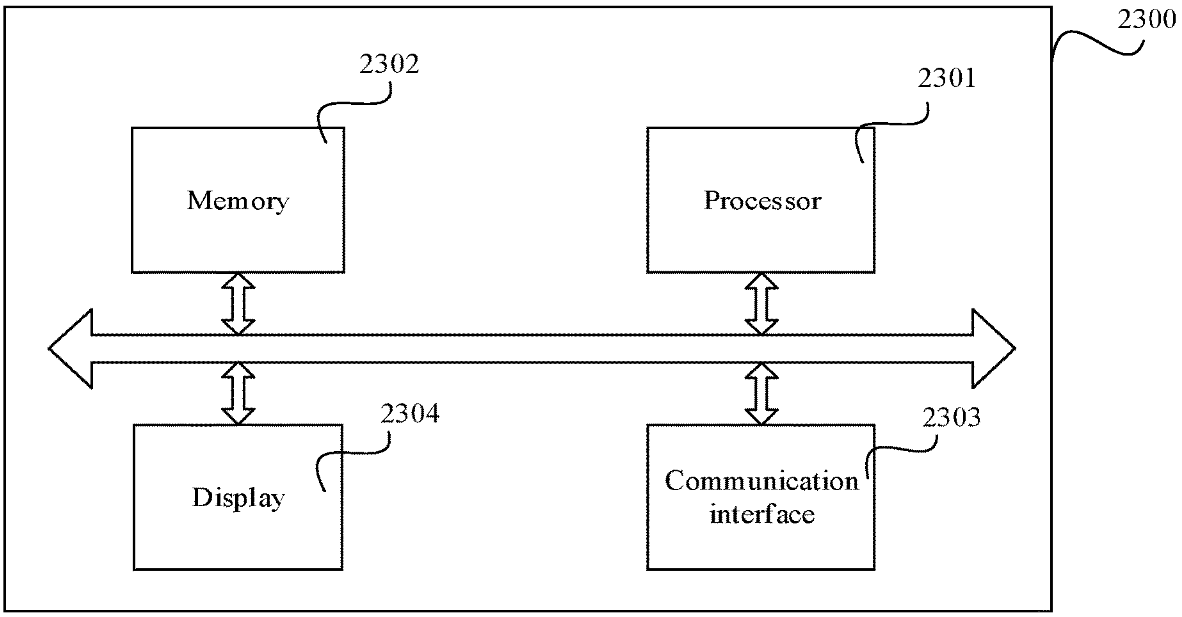
FIG. 23 is a schematic diagram of a structure of a terminal device according to an embodiment of this disclosure.

Based on this, an embodiment of this disclosure further provides a terminal device. Refer to FIG. 23. The terminal device includes a processor 2301, a memory 2302, a communication interface 2303, and a display 2304. The memory 2302 is configured to store instructions or a program executed by the processor 2301, store input data required by the processor 2301 to run instructions or a program, or store data generated after the processor 2301 runs instructions or a program. The processor 2301 is configured to run the instructions or the program stored in the memory 2302 to perform the functions performed by the terminal device in the foregoing methods.

In a possible scenario, the processor 2301 is configured to perform functions of the first detection module 2001, the sending module 2002, the display module 2003, and the second detection module 2004. Alternatively, the processor 2301 is configured to perform functions of the first detection module 2001 and the second detection module 2004. A function of the sending module 2002 is implemented by the communication interface 2303, and a function of the display module 2003 may be implemented by the display 2304.

In another possible scenario, the processing module 2101, the sending module 2102, the receiving module 2103, the display module 2104, and the detection module 2105 may be implemented by the processor 2301. Alternatively, the processor 2301 may be configured to perform functions of the processing module 2101 and the detection module 2105, functions of the sending module 2102 and the receiving module 2103 may be implemented by the communication interface 2303, and a function of the display module 2104 may be implemented by the display 2304.

In still another possible scenario, the display module 2201, the detection module 2202, the sending module 2203, the processing module 2204, and the identification module 2205 may be implemented by the processor 2301. Alternatively, functions of the processing module 2204, the detection module 2202, and the identification module 2205 may all be implemented by the processor 2301. A function of the sending module 2203 may be implemented by the communication interface 2303, and a function of the display module 2201 may be implemented by the display 2304.

It should be understood that the processor mentioned in embodiments of this disclosure may be a CPU, or the processor may be another general-purpose processor, a DSP, an application-specific integrated circuit (ASIC), a field-programmable gate array (FPGA) or another programmable logic device, a transistor logic device, a hardware component, or any combination thereof. The general purpose processor may be a microprocessor or any regular processor or the like.

With reference to the optional implementations in the foregoing embodiments, this disclosure describes some optional headset use embodiments and signal processing embodiments with reference to some specific application scenarios. A user may use a terminal together with a headset. The headset may support at least one of the following functions: an ANC function, an HT function, or an AH function, and certainly may further include a null mode. An ultimate objective of the ANC function is to eliminate actually heard noise. An ultimate objective of the HT function is to eliminate impact of the headset on an external sound entering a human ear, so that effect of an external ambient signal heard by the user by using the headset is equivalent to effect of a sound in a current external environment heard by the user by using a naked ear, where equivalent may mean same or approximate effect.

The following method may be performed for a terminal.

S3001: A terminal device establishes a communication connection to a headset.

Figure 24:
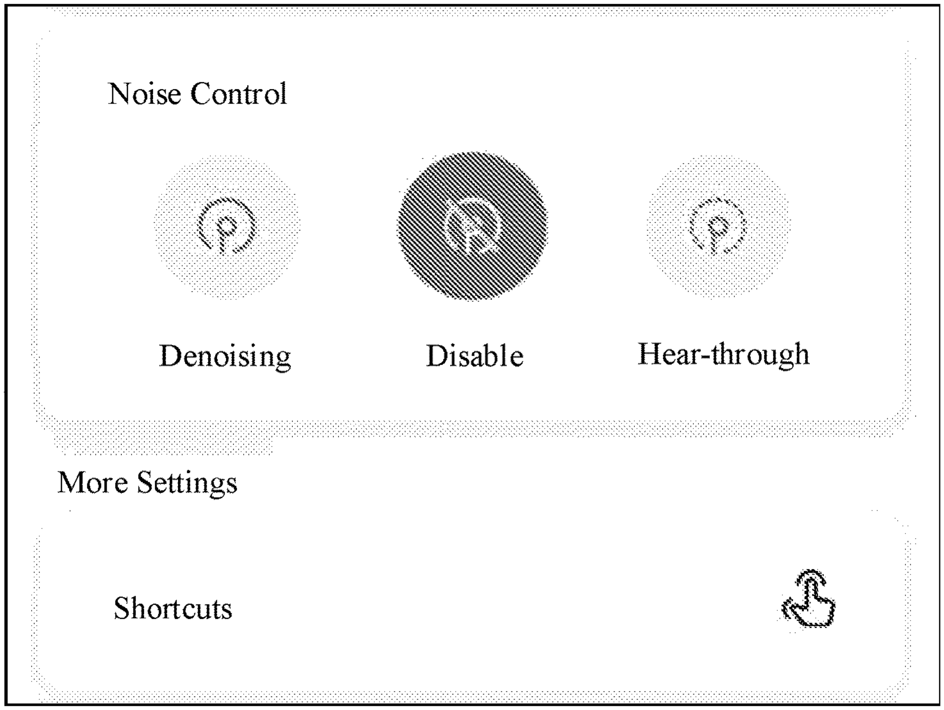
FIG. 24 is a schematic diagram of a headset control interface of a terminal device according to an embodiment of this disclosure.

S3002: Display a first interface, where the first interface is used to set functions of the headset, and the first interface may include an option for enabling or disabling an ANC function, an HT function, an AH function, or a null mode. FIG. 24 shows a possible example of the first interface. A noise control mode supported by the headset may include options of a null mode (disable), an ANC function (denoising), and an HT function. It should be understood that the first interface may further include more settings or options, but not all of them are shown in the accompanying drawings in this disclosure.

S3003: Activate the HT function of the headset when the option for the HT function is enabled.

Optionally, hear-through intensity of the HT function may be further obtained, and the HT function of the headset is controlled based on the obtained hear-through intensity.

S3004: Add an option for enhancing an event sound to the first interface. It should be noted that, optionally, this option may not exist before the HT option is enabled. The event sound is a sound that meets a preset event condition and that is in an external environment. The event sound may include a human voice or another sound that meets a preset spectral characteristic. For details, refer to related descriptions in the foregoing embodiments.

Figure 25:
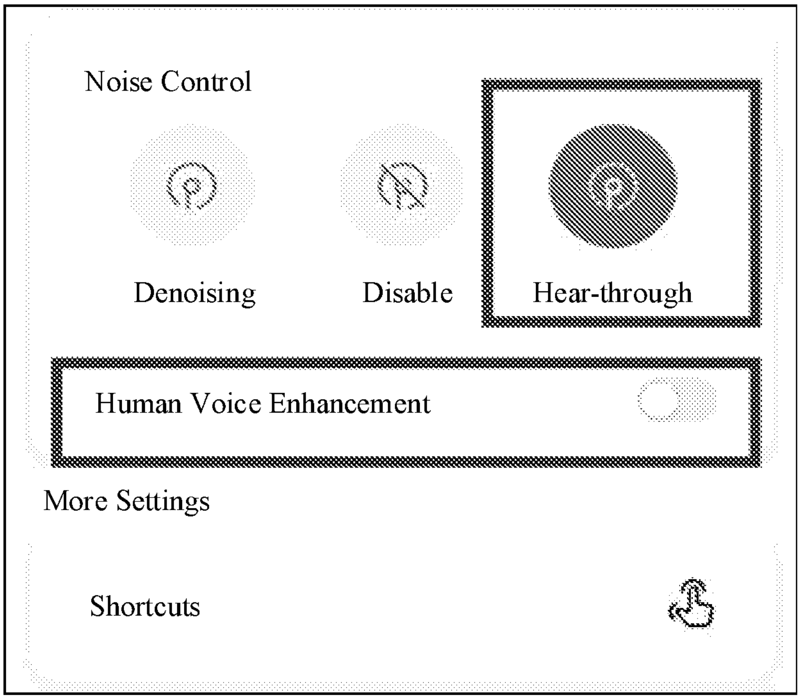
FIG. 25 is a schematic diagram of a headset control interface of a terminal device according to an embodiment of this disclosure.

For a possible implementation form, compared with FIG. 24, in FIG. 25, an option for human voice enhancement (which belongs to event sound enhancement) is added to the interface when the HT function is enabled. It should be noted that black boxes in the figure in this disclosure are merely added for ease of description, but do not constitute any limitation on a real form of the interface.

S3005: When the option for the event sound enhancement function in S3004 is enabled or the option for the AH function in S3002 is enabled, the terminal device may control the headset to increase a signal-to-noise ratio of an event sound in a signal collected by the headset, where a higher signal-to-noise ratio of the event sound indicates a higher energy ratio of the event sound in the signal. In this embodiment of the present disclosure, two methods for increasing the signal-to-noise ratio of the event sound in the signal collected by the headset are described in detail in the following examples. For details, refer to S4001 to S4005 and S5001 to S5005.

Figure 26:
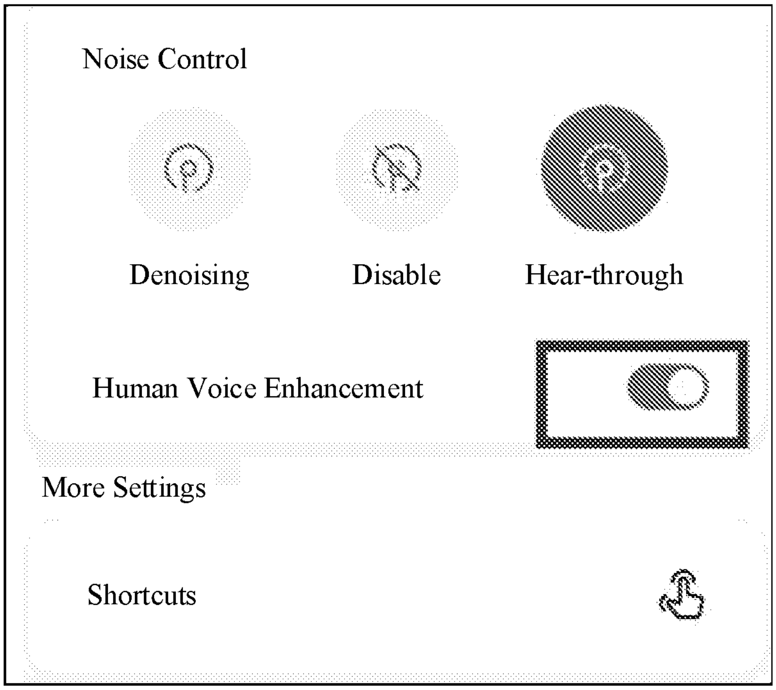
FIG. 26 is a schematic diagram of a headset control interface of a terminal device according to an embodiment of this disclosure.

For a possible implementation form, compared with FIG. 25, in FIG. 26, after the HT function is enabled, a tap-to-select instruction of a user may be received or a preset human voice enhancement enabling instruction may be obtained, to enable the option for human voice enhancement on the interface.

Optionally, in this case, the terminal may control both the ANC function and the HT function of the headset to be enabled. Further, the ANC function of the headset may be activated when the HT function is maintained enabled. The ANC function and the HT function are jointly enabled to process a sound signal in an external environment collected by the headset, and processing includes increasing a signal-to-noise ratio of an event sound in the collected signal.

Optionally, in this case, the terminal may enable the ANC function of the headset, and control the headset to increase, according to some enhancement and denoising algorithms, the signal-to-noise ratio of the event sound in the signal collected by the headset.

Optionally, event sound enhancement intensity may be further obtained, and the event sound enhancement function of the headset is controlled based on the obtained event sound enhancement intensity. Higher event sound enhancement intensity indicates a higher signal-to-noise ratio of the event sound.

S3006: Activate the ANC function of the headset when the option for the ANC function is enabled.

S3007: Add an intensity option of the ANC function to the first interface. It should be noted that, optionally, this option may not appear in the first interface before the ANC option is enabled, or may appear in the first interface together with the ANC function option and the HT function option. The intensity option of the ANC function includes at least a first steady-state ANC intensity option, a second steady-state ANC intensity option, and an adaptive ANC intensity option, the first steady-state ANC intensity option and the second steady-state ANC intensity option correspond to a first scene and a second scene respectively, and correspond to different steady ANC function intensity, ANC function intensity corresponding to the adaptive ANC intensity option is related to a scene type of a current environment in which the terminal device or the headset is located, and different scene types of the current environment correspond to different ANC intensity. Optionally, different scene types of the current environment may include a first scene and a second scene.

Figure 27:
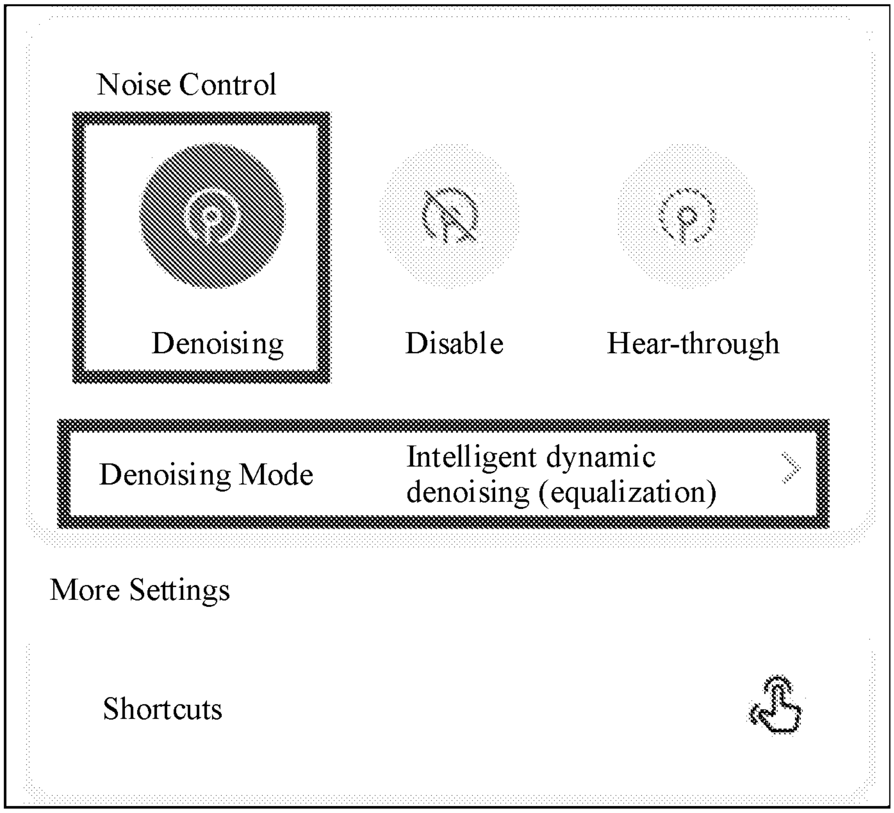
FIG. 27 is a schematic diagram of a headset control interface of a terminal device according to an embodiment of this disclosure.
Figure 28:
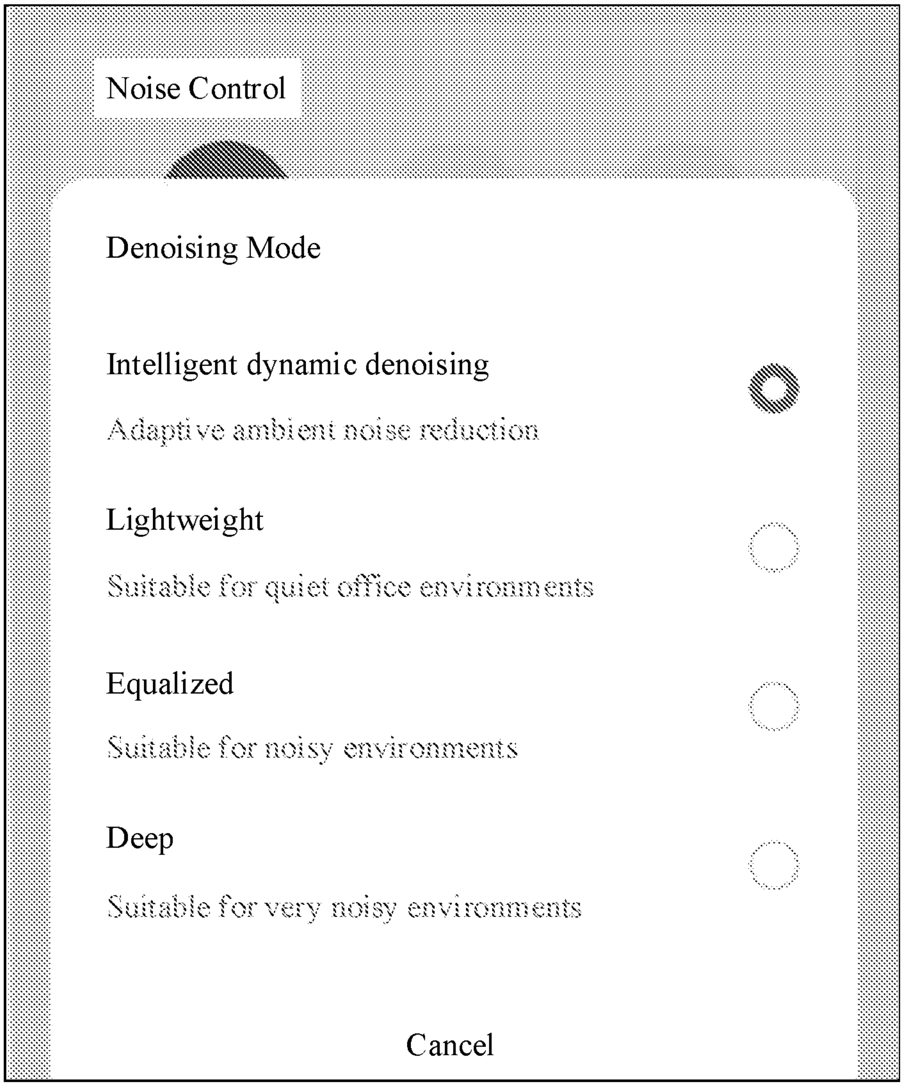
FIG. 28 is a schematic diagram of a headset control interface of a terminal device according to an embodiment of this disclosure.

For a possible implementation form, compared with FIG. 24, in FIG. 27, an option for ANC function intensity (denoising manner) is added to the interface when an ANC function (denoising) function is enabled. Further, the option for the ANC function intensity (denoising manner) may further include a plurality of options. Refer to FIG. 28, the options include but are not limited to denoising manners such as lightweight, equalized, deep, and intelligent dynamic denoising. The lightweight level is applicable to a quiet environment, and the deep level is applicable to a very noisy environment. In other words, a scene that neither belongs to the lightweight level nor belongs to the deep level may be classified as an equalized level, that is, a common scene.

S3008: Perform ANC based on an intensity option enabling result.

Further, when the user selects the lightweight level, denoising intensity of the ANC function of the headset is controlled to correspond to the lightweight level, when the user selects the equalized level, denoising intensity of the ANC function of the headset is controlled to correspond to a medium level, or when the user selects the deep level, denoising intensity of the ANC function of the headset is controlled to correspond to the deep level. It should be understood that denoising intensity of ANC corresponding to the lightweight level, the equalized level, and the deep level increases successively, and each of the three levels has steady-state or stable denoising intensity. When the user selects the lightweight level, the denoising intensity of the ANC function of the headset corresponds to the lightweight level regardless of how an environment in which the terminal or the headset is located changes. Similarly, when the user selects the equalized level, the denoising intensity of the ANC function of the headset corresponds to the medium level regardless of how the environment in which the terminal or the headset is located changes. In addition, when the user selects the deep level, the denoising intensity of the ANC function of the headset corresponds to the deep level regardless of how the environment in which the terminal or the headset is located changes.

Optionally, for example, an ANC depth corresponding to the lightweight level may include 20-28 dB, an ANC depth corresponding to the equalized level may include 30-36 dB, and an ANC depth corresponding to the deep level may be greater than 40 dB.

For example, an environment scene corresponding to the lightweight level may include but is not limited to an office, a bedroom, a quiet living room, or the like, an environment scene corresponding to the equalized level may include but is not limited to a supermarket, a square, a waiting room, a road, a cafe, a shopping mall, or the like, an environment scene corresponding to the deep level may include but is not limited to a subway, a high-speed railway, a taxi, an airplane, or the like.

In addition, this embodiment of this disclosure further includes smart dynamic noise reduction, that is, adaptive ambient noise reduction. To be specific, a scene type of an environment in which the terminal or the headset is located may be obtained, ANC intensity may be determined based on the scene type of the current environment, and the ANC function may be controlled based on the determined ANC intensity.

Optionally, the adaptive ambient noise reduction may include but is not limited to at least one of the following levels: the lightweight level, the equalized level, and the deep level. For example, in adaptive ambient noise reduction, ANC at a corresponding level in the lightweight level, the equalized level, and the deep level may be performed based on a state of an environment in which the terminal is located. The headset or the terminal may detect whether the current environment belongs to the lightweight level, the equalized level, or the deep level. Compared with the foregoing steady-state ANC, adaptive ambient noise reduction may make the user perform different levels of denoising adaptively based on an environment change without a manual operation. This improves user experience.

Optionally, for signal processing performed by the headset, refer to S6001 to S6005.

S3009: The user may enable a "Disable" option on the interface wen the user wants to use ANC, HT, or human voice enhancement.

It should be understood that the foregoing method for enabling ANC, HT, event sound enhancement, a denoising mode, or the Disable option includes but is not limited to receiving a tap-to-select operation performed for a corresponding function option by a user, performing adaptive switching by the terminal, performing adaptive switching by the headset, or performing triggering via a shortcut. For example, a selection operation performed by the user on the option for the event sound enhancement function, a selection operation on the option for the HT function, or a selection operation on the option for the ANC function is received, it is identified that a current environment is a scene corresponding to the event sound enhancement function, and the option for the event sound enhancement function is activated, it is identified that a current environment is a scene corresponding to the HT function, and the option for the HT function is activated, it is identified that a current environment is a scene corresponding to the ANC function, and the option for the ANC function is activated, or a response is made to a pressing operation performed by the user on the headset, where the pressing operation is performed to switch between at least two of the following functions the event sound enhancement function, the HT function, or the ANC function. For example, the headset may include a pressure sensor, and the pressure sensor may predefine some shortcut operations, for example, switching between denoising modes.

It should be understood that the ANC function intensity mentioned in this disclosure may be understood as ANC intensity, or denoising intensity, the HT function intensity may be understood as hear-through intensity, the AH function intensity may be understood as enhancement intensity. Different intensity affects related filter coefficients. For details, refer to related descriptions in the foregoing embodiments. Details are not described herein again.

For possible signal processing on a headset side, refer to the following two examples.

The headset includes a first microphone (reference microphone), a second microphone (error microphone), and a speaker. With reference to a possible implementation form of the headset in the foregoing embodiment, the headset may perform the following method:

S4001: Collect a first signal by using the first microphone, where the first signal is used to represent a sound in a current external environment. In a conventional technology, the signal collected by the reference microphone is also referred to as a reference signal.

S4002: Collect a second signal by using the second microphone, where the second signal is used to represent an ambient sound in an ear canal of a user wearing the headset. In the conventional technology, the signal collected by the error microphone is also referred to as an error signal.

The ambient sound in the ear canal may be understood as a comprehensive sound perceived on an ambient sound with reference to factors such as a sound that may be played by the headset, an algorithm (for example, denoising or hear through) that is being used by the headset, and an ear environment of a human body after the user wears the headset.

For example, if the headset neither plays audio nor enables an algorithm, the ambient sound in the ear canal may be understood as, but is not limited to, a representation of a comprehensive sound, in combination with the ear environment of the human body, of an ambient sound collected by the error microphone.

For example, if the headset plays audio but does not enable an algorithm, the ambient sound in the ear canal may be understood as, but is not limited to, a representation of a comprehensive sound, in combination with the ear environment of the human body and a sound played by a headset microphone, of an ambient sound collected by the error microphone.

For example, if the headset plays audio and enables an algorithm, the ambient sound in the ear canal may be understood as, but is not limited to, a representation of a comprehensive sound, in combination with the ear environment of the human body and a sound played by a headset microphone and processed by an algorithm, of an ambient sound collected by the error microphone.

It should be understood that specific signal components of the reference signal and the error signal are related to an environment, and there are many variation factors. Therefore, the signal component is difficult to describe in detail by using a quantization concept, but is clear to a person skilled in the art.

S4003: Receive an instruction for enhancing an event sound, where the event sound is a sound that meets a preset event condition and that is in the external environment.

S4004: Control both an ANC function and an HT function to be in an enabled state, and perform target processing on the first signal and the second signal by using at least the HT function and the ANC function, to obtain a target signal, where a signal-to-noise ratio of an event sound in the target signal is greater than a signal-to-noise ratio of an event sound in the first signal.

Further, refer to FIG. 8B or FIG. 8C. The first signal collected by the reference microphone is transmitted via hear through by using the HT function to obtain a restored signal C1, an event sound signal (for example, a human voice) in the restored signal C1 is enhanced, and a non event sound signal in the restored signal C1 is weakened to obtain an event sound enhanced signal C2.

The first signal C1, the signal collected by the error microphone, and the event sound enhanced signal C2 are processed by using the ANC function, to obtain the target signal.

Optionally, for related enhancement processing, refer to, not limited to, the implementation in FIG. 9.

S4005: Play the target signal by using the speaker. It should be understood that, from a perspective of an auditory sense of the user, the target signal played by the speaker can almost cancel out an ambient noise that can be originally heard by the user when the user wears the headset, to obtain a higher signal-to-noise ratio of an event sound that can be finally heard by the user.

Optionally, the headset may alternatively perform the following method.

S5001: Collect a first signal by using a first microphone, where the first signal is used to represent a sound in a current external environment.

S5002: Collect a second signal by using a second microphone, where the second signal is used to represent an ambient sound in an ear canal of a user wearing the headset.

S5003: Receive an instruction for enhancing an event sound, where the event sound is a sound that meets a preset event condition and that is in the external environment.

S5004: Enable an ANC function, enhance an event sound signal in the first signal, and weaken a non event sound signal in the first signal, to obtain an event sound enhanced signal, and process the first signal, the second signal, and the event sound enhanced signal by using the ANC function, to obtain a target signal, where a signal-to-noise ratio of an event sound in the target signal is greater than a signal-to-noise ratio of an event sound in the first signal, and a higher signal-to-noise ratio of the event sound in the signal indicates a higher energy ratio of the event sound in the signal.

Optionally, for related enhancement processing, refer to, not limited to, the implementation in FIG. 9.

S5005: Play the target signal by using a speaker.

For adjustment of ANC intensity, the headset supports at least an ANC function, and the headset includes a first microphone and a third microphone. The first microphone herein may be understood as the reference microphone in the foregoing embodiments, and focuses more on collection of a sound in a current external environment, and the third microphone focuses more on sound pickup. When a user wears the headset, the third microphone is closer to the mouth of the user than the first microphone. Therefore, the third microphone can pick up a clearer voice signal of the user than the first microphone. The headset may further perform the following method.

S6001: The headset enables the ANC function.

S6002: Collect a first signal for the current environment by using the first microphone.

S6003: Collect a second signal for the current environment by using the third microphone.

S6004: Determine a noise level of a current scene based on the first signal and the second signal, where different noise levels correspond to different ANC intensity.

Optionally, voice activity detection may be performed by using a feature of correlation between the first signal and the second signal, and noise of a non voice signal is tracked, and the current scene is determined as a quiet scene if energy of the noise is less than a first threshold, the current scene is determined as a heavy-noise scene if spectra of the noise are mainly in a low frequency band and energy of the noise is greater than a second threshold, or the current scene is determined as a common scene if the current scene is neither a quiet scene nor a heavy-noise scene, where the second threshold (for example, but not limited to a value in [−80 dB, −65 dB]) is greater than the first threshold (for example, but not limited to a value in [−40 dB, −30 dB]). ANC intensity corresponding to the quiet scene, the common scene, and the heavy-noise scene increases successively.

S6005: Control the ANC function based on the current noise level.

Optionally, a plurality of intensity adjustment modes may be preset for ANC intensity.

Optionally, the ANC function can be controlled by adjusting an ANC algorithm filter based on ANC intensity corresponding to a corresponding noise level after the noise level is determined.

An ANC intensity adjustment instruction sent by the terminal may be accepted, and the ANC function is controlled by adjusting the ANC algorithm filter based on the ANC intensity adjustment instruction. Optionally, a manner of controlling the ANC function may further include the method for controlling the ANC intensity in S3007 and S3008. Details are not described herein again.

Optionally, there may be some policies for switching between ANC scenes: if it is detected that the current scene is at a new noise level and lasts for preset duration, obtaining ANC intensity corresponding to the new noise level, and controlling an ANC function based on the ANC intensity corresponding to the new noise level.

For example, (1) switching is allowed only after the threshold is met for 1 second, that is, switching to a new noise level is performed only when a newly detected noise level lasts for preset duration, (2) switching to a next scene is allowed only when a current denoising level is maintained for at least 10 seconds, that is, a newly switched state is maintained for at least second preset duration, and (3) when a heavy-noise level, a normal level, or a quiet level may be switched back and forth. Discomfort may occur if switching is performed excessively fast. Therefore, a switching frequency within a period of time may be monitored, and a threshold of a determining level is increased if an exception occurs. For example, if a quantity of switching times exceeds a preset quantity of times (for example, four times in two minutes) within the preset duration, a threshold close to a threshold of the normal mode is increased, to reduce frequent mode switching and improve user experience.

It should be understood that there is a large quantity of embodiments of the present disclosure, same terms, expressions, or signal processing may be mutually referenced or reused, and signal processing procedures in the solutions may be freely combined without violating a natural law. Details are not listed one by one in this disclosure.

Correspondingly, an embodiment of this disclosure further provides a headset control apparatus. The apparatus is used in a terminal device, the terminal device establishes a communication connection to a headset, and the headset supports an ANC function and an HT function. The apparatus includes a display module and a processing module.

The display module is configured to display a first interface, where the first interface is used to set functions of the headset, the first interface includes an option for an event sound enhancement function, and an event sound is a sound that meets a preset event condition and that is in an external environment.

Optionally, the first interface includes an option for controlling the HT function of the headset, when the option for the HT function is enabled, the processing module is configured to activate the HT function of the headset, and the display module is further configured to add the option for enhancing the event sound to the first interface.

The processing module is configured to, when the option for the event sound enhancement function is enabled, control both the ANC function and the HT function of the headset to be in an enabled state.

Optionally, when the option for the ANC function is enabled, the processing module is further configured to activate the ANC function of the headset.

Correspondingly, an embodiment of this disclosure further provides a headset control apparatus. The apparatus is used in a terminal device, the terminal device establishes a communication connection to a headset, and the headset supports at least an ANC function. The apparatus includes a display module configured to display a first interface, where the first interface is used to set functions of the headset, and the first interface includes an option for controlling the ANC function of the headset, and a processing module configured to activate the ANC function of the headset when the option for the ANC function is enabled.

The display module is further configured to add an intensity option of the ANC function to the first interface after the option for the ANC function is enabled.

The processing module is further configured to perform ANC based on a result of enabling the intensity option of the ANC function.

The intensity option of the ANC function includes at least a first steady-state ANC intensity option, a second steady-state ANC intensity option, and an adaptive ANC intensity option, the first steady-state ANC intensity option and the second steady-state ANC intensity option correspond to a first scene and a second scene respectively, and correspond to different steady ANC function intensity, ANC function intensity corresponding to the adaptive ANC intensity option is related to a scene type of a current environment in which the terminal device or the headset is located, and different scene types of the current environment correspond to different ANC intensity.

The processing module is further configured to, when the first steady-state ANC intensity option is enabled, obtain first ANC function intensity corresponding to the first steady-state ANC intensity option, and control the ANC function based on the first ANC function intensity, when the second steady-state ANC intensity option is enabled, obtain second ANC function intensity corresponding to the second steady-state ANC intensity option, and control the ANC function based on the second ANC function intensity, or when the adaptive ANC intensity option is enabled, obtain the scene type of the current environment in which the terminal device or the headset is located, determine ANC intensity based on the scene type of the current environment, and control the ANC function based on the determined ANC intensity.

Correspondingly, an embodiment of this disclosure further provides a headset control apparatus. The apparatus is used in a terminal device, the terminal device establishes a communication connection to a headset, and the headset supports at least an HT function. The apparatus includes a display module configured to display a first interface, where the first interface is used to set functions of the headset, and the first interface includes an option for controlling the HT function of the headset, and a processing module configured to activate the HT function of the headset when the option for the HT function is enabled.

The display module is further configured to, after the option for the HT function is enabled, add an option for enhancing the event sound to the first interface, where the event sound is a sound that meets a preset event condition and that is in an external environment.

The processing module is further configured to, when the option for an event sound enhancement function is enabled, control the headset to increase a signal-to-noise ratio of the event sound in a signal collected by the headset, where a higher signal-to-noise ratio of the event sound indicates a higher energy ratio of the event sound in the signal. The processing module is further configured to obtain first intensity of the ANC function, and control the ANC function of the headset based on the first intensity, obtain second intensity of the HT function, and control the HT function of the headset based on the second intensity, or obtain third intensity of event sound enhancement, and control the event sound enhancement function of the headset based on the third intensity.

Correspondingly, an embodiment of this disclosure further provides a denoising apparatus. The apparatus is used in a headset, the headset supports at least an ANC function and an HT function, and the headset includes a first microphone, a second microphone, and a speaker. The apparatus includes a collection module configured to collect a first signal by using the first microphone, where the first signal is used to represent a sound in a current external environment, and further configured to collect a second signal by using the second microphone, where the second signal is used to represent an ambient sound in an ear canal of a user wearing the headset, a receiving module configured to receive an instruction for enhancing an event sound, where the event sound is a sound that meets a preset event condition and that is in the external environment, a processing module configured to control both the ANC function and the HT function to be in an enabled state, and perform target processing on the first signal and the second signal by using at least the HT function and the ANC function, to obtain a target signal, where a signal-to-noise ratio of an event sound in the target signal is greater than a signal-to-noise ratio of an event sound in the first signal, and the processing module is further configured to transmit the first signal via hear through by using the HT function, to obtain a restored signal, enhance an event sound signal in the restored signal, and weaken a non event sound signal in the restored signal, to obtain an event sound enhanced signal, and process the first signal, the second signal, and the event sound enhanced signal by using the ANC function, to obtain the target signal, and a playing module configured to play the target signal by using the speaker.

Correspondingly, an embodiment of this disclosure further provides a denoising apparatus. The apparatus is used in a headset, the headset supports at least an ANC function, and the headset includes a first microphone, a second microphone, and a speaker. The apparatus includes a collection module configured to collect a first signal by using the first microphone, where the first signal is used to represent a sound in a current external environment, and further configured to collect a second signal by using the second microphone, where the second signal is used to represent an ambient sound in an ear canal of a user wearing the headset, a receiving module configured to receive an instruction for enhancing an event sound, where the event sound is a sound that meets a preset event condition and that is in the external environment, a processing module configured to enable the ANC function, enhance an event sound signal in the first signal, and weaken a non event sound signal in the first signal, to obtain an event sound enhanced signal, and process the first signal, the second signal, and the event sound enhanced signal by using the ANC function, to obtain the target signal, where a signal-to-noise ratio of the event sound in the target signal is greater than a signal-to-noise ratio of the event sound in the first signal, and a higher signal-to-noise ratio of the event sound in the signal indicates a higher energy ratio of the event sound in the signal, and a playing module configured to play the target signal by using the speaker.

Correspondingly, an embodiment of this disclosure further provides a signal processing apparatus. The apparatus is used in a headset, the headset supports at least an ANC function, an HT function, and an AH function, and the headset includes an HT filter bank, a feedback filter bank, and a feedforward filter bank. The apparatus includes an obtaining module configured to obtain an operating mode of the headset, and an invoking module configured to, when the operating mode is the ANC function, invoke the feedback filter bank and the feedforward filter bank to perform the ANC function, when the operating mode is the HT function, invoke the HT filter bank and the feedback filter bank to perform the HT function, and when the operating mode is the AH function, invoke the HT filter bank, the feedforward filter bank, and the feedback filter bank to perform the AH function.

Correspondingly, an embodiment of this disclosure further provides an ANC intensity adjustment apparatus. The apparatus is used in a headset, the headset supports at least an ANC function, the headset includes a first microphone and a third microphone, the first microphone focuses more on collection of a sound in a current external environment, and the third microphone focuses more on sound pickup.

A collection module is configured to, when the headset enables the ANC function, collect a first signal for the current environment by using the first microphone, and collect a second signal for the current environment by using the third microphone.

An identification module is configured to determine a noise level of the current scene based on the first signal and the second signal, where different noise levels correspond to different ANC intensity. Optionally, the identification module is further configured to perform voice activity detection by using a feature of correlation between the first signal and the second signal, track noise of a non voice signal, and determine the current scene as a quiet scene if energy of the noise is less than a first threshold, determine the current scene as a heavy-noise scene if spectra of the noise are mainly in a low frequency band and energy of the noise is greater than a second threshold, or determine the current scene as a common scene if the current scene is neither the quiet scene nor the heavy-noise scene, where the second threshold is greater than the first threshold.

A processing module is configured to control the ANC function based on a current noise level. Optionally, the processing module is further configured to, if it is detected that the current scene is at a new noise level and lasts for preset duration, obtain ANC intensity corresponding to the new noise level, and control the ANC function based on the ANC intensity corresponding to the new noise level.

It should be understood that there are many embodiments of the present disclosure, and some processing methods, nouns, and optional examples may be reused in different embodiments. Details are not described in this disclosure.

The method steps in embodiments of this disclosure may be implemented in a hardware manner, or may be implemented in a manner of executing software instructions by the processor. The software instructions may include a corresponding software module. The software module may be stored in a RAM, a flash memory, a ROM, a PROM, an EPROM, an EEPROM, a register, a hard disk, a removable hard disk, a CD-ROM, or any other form of storage medium well known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a terminal device. Certainly, the processor and the storage medium may exist in the terminal device as discrete components.

All or a part of the foregoing embodiments may be implemented by using software, hardware, firmware, or any combination thereof. When software is used to implement embodiments, all or a part of embodiments may be implemented in a form of a computer program product. The computer program product includes one or more computer programs or instructions. When the computer programs or the instructions are loaded and executed on a computer, the procedures or the functions according to embodiments of this disclosure are all or partially implemented. The computer may be a general-purpose computer, a dedicated computer, a computer network, user equipment, or another programmable apparatus. The computer programs or the instructions may be stored in a computer-readable storage medium, or may be transmitted from one computer-readable storage medium to another computer-readable storage medium. For example, the computer programs or the instructions may be transmitted from one website, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a DIGITAL VERSATILE DISC (DVD), or may be a semiconductor medium, for example, a solid-state drive (SSD).

In embodiments of this disclosure, unless otherwise stated or there is a logic conflict, terms and/or descriptions between different embodiments are consistent and may be mutually referenced, and technical features in different embodiments may be combined based on an internal logical relationship thereof, to form a new embodiment. In addition, the terms "include", "comprise", or any other variant thereof are intended to cover a non-exclusive inclusion, for example, a series of steps or units. Methods, systems, products, or devices are not necessarily limited to those steps or units that are literally listed, but may include other steps or units that are not literally listed or that are inherent to such processes, methods, products, or devices.

Although this disclosure is described with reference to specific features and embodiments thereof, it is clear that various modifications and combinations may be made to them without departing from the spirit and scope of this disclosure. Correspondingly, the specification and accompanying drawings are merely examples for description of the solutions defined by the appended claims, and are considered as any of or all modifications, variations, combinations or equivalents that cover the scope of this disclosure.

It is clear that a person skilled in the art can make various modifications and variations to this disclosure without departing from the scope of this disclosure. This disclosure is intended to cover these modifications and variations provided that they fall within the scope of protection defined by the following claims and their equivalent technologies of this disclosure.

What is claimed is:

1. A method implemented by a terminal device, wherein the method comprises:

determining a target mode based on a target scene when a scene type of a current external environment is the target scene, wherein the target mode is one of a plurality of processing modes supported by a headset, wherein different processing modes correspond to different scene types, and wherein the processing modes comprise at least two of the following modes:
an active noise control (ANC) mode;
a hear-through (HT) mode; or
an augmented hearing (AH) mode;

determining a target processing intensity in the target mode based on the target scene, wherein different target scenes correspond to different processing intensities within a same processing mode, and wherein determining the target processing intensity comprises obtaining at least one of a feedforward (FF) filtering coefficient, a feedback (FB) filtering coefficient, or a hear-through (HT) filtering coefficient that corresponds to the target scene; and sending, to the headset, the target mode and the target processing intensity to instruct the headset to perform a processing function corresponding to the target mode at the target processing intensity.

2. The method of claim 1, wherein before sending, to the headset, the target mode, the method further comprises:

displaying selection prompt information indicating to a user whether to adjust a processing mode of the headset to the target mode; and detecting, from the user, an operation of selecting the processing mode as the target mode.

3. The method of claim 2, further comprising:

displaying a first control and a second control, wherein different positions of the second control on the first control indicate the different processing intensities in the target mode, wherein before sending, to the headset, the target mode, the method further comprises:

responding to touching and controlling, by the user, the second control to move to a first position on the first control, wherein the first position indicates the target processing intensity at which the headset performs the processing function in the target mode; and sending, to the headset, the target processing intensity.

4. The method of claim 3, wherein the first control is of a ring shape, wherein the method further comprises obtaining, from the user, an operation that touches and controls the second control to move on the first control in a clockwise direction or an anticlockwise direction, and wherein the target processing intensity changes in an ascending order.

5. The method of claim 3, wherein the first control is of a bar shape, wherein the method further comprises obtaining, from the user, an operation that touches and controls the second control to move on the first control from top to bottom, bottom to top, left to right, or right to left, and wherein the target processing intensity changes in an ascending order.

6. The method of claim 3, wherein a first higher target processing intensity indicates a weaker ambient sound in an ear canal of the user and indicates a weaker sound that is perceived by the user and that is in an environment in which the user is currently located when the processing function is an ANC function, wherein a second higher target processing intensity indicates a higher intensity of a first sound that is perceived by the user and that is in the environment in which the user is currently located when the processing function is an HT function, and wherein a third higher target processing intensity indicates a stronger event sound comprised in the first sound when the processing function is an AH function.

7. A method implemented by a terminal device, wherein the method comprises:

obtaining a target mode, wherein the target mode is one of a plurality of processing modes supported by a headset, and wherein the processing modes comprise at least two of the following modes:
an active noise control (ANC) mode;
a hear-through (HT) mode; or
an augmented hearing (AH) mode;

determining a target processing intensity in the target mode based on a scene type of a current external environment, wherein different scene types correspond to different processing intensities within a same processing mode, wherein the target processing intensity indicates a processing intensity at which the headset performs a processing function corresponding to the target mode, and wherein determining the target processing intensity comprises obtaining at least one of a feedforward (FF) filtering coefficient, a feedback (FB) filtering coefficient, or a hear-through (HT) filtering coefficient that corresponds to the target scene; and sending, to the headset, the target processing intensity.

8. The method of claim 7, wherein obtaining the target mode comprises:

receiving, from the headset, the target mode; or displaying a selection control comprising the processing modes and detecting an operation of selecting, by a user, the target mode from the processing modes using the selection control.

9. The method of claim 7, wherein before determining the target processing intensity, the method further comprises:

displaying selection prompt information when receiving the target mode from the headset, wherein the selection prompt information indicates to a user whether to adjust a processing mode of the headset to the target mode; and detecting, from the user, a choosing operation to adjust the processing mode to the target mode.

10. The method of claim 7, wherein a first higher target processing intensity indicates a weaker ambient sound in an ear canal of a user and indicates a weaker sound that is perceived by the user and that is in an environment in which the user is currently located when the processing function is an ANC function, wherein a second higher target processing intensity indicates a higher intensity of a first sound that is perceived by the user and that is in the environment when the processing function is an HT function, and wherein a third higher target processing intensity indicates a stronger event sound comprised in the first sound when the processing function is an AH function.

11. A method implemented by a terminal device, wherein the method comprises:

establishing a communication connection to a headset that supports an active noise control (ANC) function and a hear-through (HT) function;

displaying an interface that sets functions of the headset, wherein the interface comprises a first option for an event sound enhancement function, and wherein an event sound meets a preset event condition and is in an external environment;

determining a target processing intensity of the event sound enhancement function based on a scene type of the external environment; wherein different scene types correspond to different processing intensities within a same processing mode, wherein determining the target processing intensity comprises obtaining at least one of a feedforward (FF) filtering coefficient, a feedback (FB) filtering coefficient, or a hear-through (HT) filtering coefficient that corresponds to the scene type;

controlling both the ANC function and the HT function to be in an enabled state when the first option is enabled; and sending, to the headset, the at least one filtering coefficient to instruct the headset to perform the event sound enhancement function at the target processing intensity.

12. The method of claim 11, wherein the interface further comprises a second option for controlling the HT function, and wherein after displaying the interface, the method further comprises:

activating the HT function when the second option is enabled; and adding the first option to the interface.

13. The method of claim 11, wherein the interface further comprises a second option for controlling the ANC function, and wherein the method further comprises activating the ANC function when the second option is enabled.

14. The method of claim 11, wherein the interface further comprises a second option for disabling the ANC function or a third option for disabling the HT function.

15. The method of claim 11, wherein the event sound comprises a human voice or a sound that meets a preset spectral characteristic.

16. The method of claim 11, wherein the ANC function and the HT function are jointly enabled to process a sound signal of the external environment, wherein the method further comprises increasing a signal-to-noise ratio of the event sound, and wherein a higher signal-to-noise ratio indicates a higher energy ratio of the event sound.

17. A method implemented by a terminal device, wherein the method comprises:

establishing a communication connection to a headset that supports a hear-through (HT) function;

displaying an interface that sets functions of the headset, wherein the interface comprises a first option for controlling the HT function;

activating the HT function when the first option is enabled;

adding, to the interface, a second option for enhancing an event sound using an event sound enhancement function, wherein the event sound meets a preset event condition and is in an external environment;

determining a target processing intensity of the event sound enhancement function based on a scene type of the external environment, wherein different scene types correspond to different processing intensities within a same processing mode, wherein determining the target processing intensity comprises obtaining at least one of a feedforward (FF) filtering coefficient, a feedback (FB) filtering coefficient, or a hear-through (HT) filtering coefficient that corresponds to the scene type; and controlling the headset to increase a signal-to-noise ratio of the event sound based on the target processing intensity when the second option is enabled, wherein a higher signal-to-noise ratio of the event sound indicates a higher energy ratio of the event sound.

18. The method of claim 17, wherein the event sound comprises a human voice or a sound that meets a preset spectral characteristic.

19. The method of claim 17, wherein the interface further comprises a third option for controlling an active noise control (ANC) function of the headset, a fourth option for disabling the ANC function, or a fifth option for disabling the HT function.

20. The method of claim 19, further comprising:

obtaining a first intensity of the ANC function and controlling the ANC function based on the first intensity;

obtaining a second intensity of the HT function and controlling the HT function based on the second intensity; or obtaining a third intensity of the event sound enhancement function and controlling the event sound enhancement function based on the third intensity.

* * * * *